(12) United States Patent
Cheng et al.

(10) Patent No.: US 6,724,128 B2
(45) Date of Patent: Apr. 20, 2004

(54) SMART SONIC BEARINGS FOR FRICTIONAL FORCE REDUCTION AND SWITCHING

(75) Inventors: Jack Cheng, Danville, CA (US); Christopher Damien Carruno, Livermore, CA (US)

(73) Assignee: GRQ Instruments, Inc., Livermore, CA (US)

( * ) Notice: Subject to any disclaimer, the term of this patent is extended or adjusted under 35 U.S.C. 154(b) by 0 days.

(21) Appl. No.: 10/137,502

(22) Filed: May 1, 2002

(65) Prior Publication Data

US 2002/0126922 A1 Sep. 12, 2002

Related U.S. Application Data

(62) Division of application No. 09/723,615, filed on Nov. 27, 2000.

(51) Int. Cl.[7] .............................................. H01L 41/08
(52) U.S. Cl. .............. 310/328; 310/323.04; 310/323.02
(58) Field of Search ..................... 384/1; 310/328, 310/323.02, 323.03, 323.04

(56) References Cited

U.S. PATENT DOCUMENTS

| | | | |
|---|---|---|---|
| 2,278,966 A | 4/1942 | Williams | 171/327 |
| 2,746,813 A | 5/1956 | Massa | 308/1 |
| 3,171,696 A | 3/1965 | Houghton | 308/1 |
| 3,683,476 A | 8/1972 | Lea et al. | 29/149.5 |
| 3,756,105 A | 9/1973 | Balamuth et al. | 83/14 |
| 3,774,923 A | 11/1973 | Suroff | 280/11.13 R |
| 3,867,014 A | 2/1975 | Kemp | 350/149 |
| 3,937,148 A | 2/1976 | Simpson | 104/148 MS |
| 4,453,103 A | 6/1984 | Vishnevsky et al. | 310/323 |
| 4,482,421 A | 11/1984 | Gurak | 156/580.1 |
| 4,523,120 A | 6/1985 | Assard et al. | 310/323 |
| 4,530,021 A | 7/1985 | Cameron | 360/97 |
| 4,560,263 A | * 12/1985 | Katsuma et al. | 396/133 |
| 4,562,374 A | 12/1985 | Sashida | 310/328 |
| 4,644,199 A | 2/1987 | Langley | 310/12 |
| 4,666,315 A | 5/1987 | Scranton | 384/1 |

(List continued on next page.)

OTHER PUBLICATIONS

Scott Chou, et al. "Miniature Ultrasonic Motor" Horological Journal Article of the month Feb. 1999, 13 pages.
"Piezo–Electric Ultrasonic Motors" Piezo Systems, Inc., Cambridge, Massachusetts, U.S.A. pp. 1–3, Sep. 12, 2000.
Calvin F. Quate et al., "Acoustic Microscopy with Mechanical Scanning–A Review" pp. 482–504.

(List continued on next page.)

Primary Examiner—Mark Budd
(74) Attorney, Agent, or Firm—Haverstock & Owens LLP

(57) ABSTRACT

An ultrastiff precision sonic bearing assembly and method thereof for controlling an effective coefficient of friction between two elements in slidable contact configured along an interface under a force sufficient to maintain contact and having static friction therebetween, by inducing a repetitive motion in one of the elements parallel to the interface thereby altering the effective coefficient of friction therebetween. The bearing assembly also provides for additional and independent electronic control over the average thickness thereof and senses the force thereon to allow the bearing assembly stiffness to be altered.

46 Claims, 36 Drawing Sheets

U.S. PATENT DOCUMENTS

| | | | | |
|---|---|---|---|---|
| 4,736,129 | A | 4/1988 | Endo et al. | 310/323 |
| 4,785,177 | A | 11/1988 | Besocke | 250/442.1 |
| 4,824,262 | A | 4/1989 | Kamigaito et al. | 384/42 |
| 4,866,690 | A | 9/1989 | Tamaru et al. | 369/45 |
| 4,874,979 | A | 10/1989 | Rapp | 310/328 |
| 4,884,002 | A | 11/1989 | Eusemann et al. | 310/323 |
| 4,894,579 | A | 1/1990 | Higuchi et al. | 318/328 |
| 4,944,606 | A | 7/1990 | Lindsey et al. | 384/42 |
| RE33,390 | E | 10/1990 | Sashida | 310/328 |
| 4,968,914 | A | 11/1990 | West et al. | 310/328 |
| 4,987,334 | A | 1/1991 | Jungwirth | 310/333 |
| 5,001,404 | A | 3/1991 | Kataoku | 318/116 |
| 5,013,945 | A | 5/1991 | Adolfeson | 310/26 |
| 5,036,245 | A | 7/1991 | Ohnishi et al. | 310/323 |
| 5,039,894 | A | 8/1991 | Teter et al. | 310/26 |
| 5,043,621 | A | 8/1991 | Culp | 310/316 |
| 5,070,571 | A | 12/1991 | Arai | 15/250 R |
| 5,073,739 | A * | 12/1991 | Iijima et al. | 310/323.02 |
| 5,099,166 | A | 3/1992 | Hirano et al. | 310/323 |
| 5,140,215 | A | 8/1992 | Yamaguchi | 310/323 |
| 5,162,692 | A | 11/1992 | Fujimura | 310/323 |
| 5,180,940 | A | 1/1993 | Paratte et al. | 310/40 MM |
| 5,186,378 | A | 2/1993 | Alfaro | 228/110 |
| 5,221,146 | A | 6/1993 | Maruyama | 384/447 |
| 5,244,140 | A | 9/1993 | Ramsey et al. | 228/110.1 |
| 5,332,941 | A | 7/1994 | Honda | 310/323 |
| 5,332,942 | A | 7/1994 | Rennex | 310/328 |
| 5,345,137 | A | 9/1994 | Funakubo et al. | 310/323 |
| 5,376,858 | A | 12/1994 | Imabayashi et al. | 310/333 |
| 5,410,206 | A | 4/1995 | Luecke et al. | 310/328 |
| 5,416,375 | A | 5/1995 | Funakubo et al. | 310/323 |
| 5,441,305 | A | 8/1995 | Tabar | 280/809 |
| 5,446,331 | A | 8/1995 | Watanabe et al. | 310/323 |
| 5,448,129 | A | 9/1995 | Sumibara et al. | 310/323 |
| 5,563,456 | A | 10/1996 | Berger | 310/328 |
| 5,589,723 | A | 12/1996 | Yoshida et al. | 310/328 |
| 5,637,948 | A | 6/1997 | Suganuma | 310/323 |
| 5,712,524 | A | 1/1998 | Suga | 310/328 |
| 5,770,913 | A | 6/1998 | Mizzi | 310/328 |
| 5,783,899 | A | 7/1998 | Okazaki | 310/317 |
| 5,786,654 | A | 7/1998 | Yoshida et al. | 310/328 |
| 5,911,514 | A | 6/1999 | Davies et al. | 384/300 |
| 5,917,268 | A * | 6/1999 | Takagi | 310/317 |
| 5,936,328 | A * | 8/1999 | Takano et al. | 310/323.02 |
| 5,994,820 | A | 11/1999 | Kleindiek | 310/329 |
| 6,002,549 | A | 12/1999 | Berman et al. | 360/104 |
| 6,040,643 | A | 3/2000 | Bruns | 310/26 |
| 6,064,140 | A * | 5/2000 | Zumeris | 310/323.02 |
| 6,066,911 | A * | 5/2000 | Lindemann et al. | 310/323.02 |
| 6,081,063 | A * | 6/2000 | Kasuga et al. | 310/323.02 |
| 6,211,603 | B1 * | 4/2001 | Iino et al. | 310/323.02 |
| 6,218,767 | B1 * | 4/2001 | Akada et al. | 310/323.02 |
| 6,242,846 | B1 * | 6/2001 | Ashizawa et al. | 310/323.02 |

OTHER PUBLICATIONS

Piezoelectric Acousto–Isolators, 4 pgs.

Paul Atherton, "Technology Trends Micropositioning using Piezoelectric Translators" Dec. 1987, Photonics Spectra, pp. 51–53 & p. 84.

"CVD Diamond Films Open New Vistas" 1989 Trends Optics, 9 pgs.

Peter J. Blau, "Friction Science and Technology" Marcel Dekke, Inc., New York, 3 pgs.

Kenneth C. Ludema "Friction Wear, Lubrication" A text book in tribology, pp. 830–833.

Karl F. Graff, "Wave Motion in Elastic Solids" Dover Pub., Inc., New York.

"An Acoustic Transformer Powered Super–High Isolation Amplifier" 4 pgs.

"Guide To Modern Piezoelectric Ceramics" Morgan Matroc, Inc., Electro Ceramics Divsion, 27 pgs.

"Channel Industris, Inc." Piezoelectric Ceramics, 16 pgs.

"Piezoelectric Ceramics" EDO Corp. Western Division, 30 pgs.

"Multilayer Piezoelectric Actuators : User's Manual" Tokio, 25 pgs.

Kutomi, H. et al., "Development of Friction Controller (Application to Turning Lathe Guideway)", 1997, Department of Mechanical and System Engineering, Gifu University.

Sase, Naoki et al., "Control of Friction Coefficient Between Metal Surfaces (Effect of stress waves induced by super–sonic impactor)", 1997, Department of Mechanical and Systems Engineering, Gifu University.

* cited by examiner

SMART SONIC BEARINGS FOR FRICTIONAL FORCE REDUCTION AND SWITCHING

RELATED APPLICATION

This Patent Application is a divisional of co-pending U.S. patent application Ser. No. 09/723,615, the contents of which are hereby incorporated by reference, filed Nov. 27, 2000, entitled "Smart Sonic Bearings and Method for Frictional Force Reduction and Switching".

BACKGROUND—FIELD OF THE INVENTION

This invention relates to plain bearing-like devices and more particularly to precision, ultrastiff plain bearing-like structures both macroscopic and microscopic with frictional and structural properties that can be electronically controlled and which contain a built-in ultrastiff force sensing mechanism.

Precision bearings, specifically designed to translate or rotate a mechanical load with submicron accuracy have become increasingly important in the optics, semiconductor manufacturing, and micromachining industries. Unlike regular bearings that are used, for example in automobiles, these precision bearings have unique primary and secondary characteristics. Among the most important primary characteristics are (1) extremely high stiffness, (2) controllable frictional characteristics, (3) enhanced smoothness-of-travel, and (4) superior accuracy-of-travel. Some of the secondary features are (a) high damage threshold, (b) high reliability, (c) low maintenance, (d) low external support requirements, and of course (e) low cost.

A common bearing, found in many semi-precision, mechanisms, is the sliding bearing or plain bearing which coincidentally also exhibits many of the primary and secondary characteristics of a precision bearing. As used herein, the term "plain bearing" simply means that the bearing's load is supported through sliding motion between two solid surfaces. FIG. 1A illustrates a lubricated planar configuration of a simple plain bearing, which consists of a flat bar-shaped upper slide-plate 50 and a similar lower slide-plate 54 sliding against each other with a lubricant 52, such as oil, between the sliding surfaces. FIG. 1B shows two forces acting on the upper slide-plate of the simple plain bearing of FIG. 1A. The force, $F_{APP}$ 45, is an applied force sufficient to maintain contact along an interface between the surfaces of the two slide-plates. The other force is an applied sliding force 46, which, along with the component of the force 45 parallel to the interface, can be used to translate the two slide-plates relative to each other.

A plain bearing is characterized by (1) its inherent simplicity, having a minimum number of moving parts; (2) its superior runout or off-axis error characteristic which is obtained by averaging any local smoothness imperfections over the entire sliding surface area; (3) its high shock-loading or damage threshold which is the result of spreading the shock force on the bearing over a large surface area, and (4) its extremely high compressive stiffness since the bearing has large direct material to material sliding contacts.

However, despite all of these advantages, a lubricated plain bearing is not generally used in precision applications for several reasons. The first reason is because of the bearing's relatively high frictional forces generated by the component $[F_{APP}]_Z$ of the force 45 which is perpendicular to the interface. These frictional forces are a direct result of its high coefficient of friction, which can be ten to one hundred times larger than an equivalent ball or air bearing. The second reason is because of stiction, an extra frictional holding phenomenon, above the "normal" static friction, that occurs when two extremely smooth and lubricated contacting surfaces that were stationary, start to slide. The third reason is because of a phenomenon known as stick-slip which results in fluctuations in the frictional forces while the bearing is in motion. The cumulative effects from all three phenomena associated with a plain bearing, will usually render an instrument equipped with this type of bearing unable to perform precise and microscopic movements.

In prior art, there are three general methods used to change the frictional forces between two sliding surfaces. First, the actual coefficient of friction between the sliding surfaces can be modified by very thin films or coatings with good tribological properties. This is generally accomplished by using some combination of a solid, liquid or gas as reviewed in U.S. Pat. No. 4,944,606 of Lindsey et al., (1990) and U.S. Pat. No. 5,911,514 of Davies et al., (1999). Second, if one or more operating parameters between the two sliding surfaces can be altered, the frictional characteristics can be changed. Some common operating parameters that can be readily controlled to produce a relatively small variation in frictional behavior are surface temperature, as described in U.S. Pat. No. 5,441,305 of Tabar (1995) and sliding speed, as shown in U.S. Pat. No. 5,043,621 issued to Culp (1991). Finally, if the compressive force between the two sliding surfaces is minimized, or time-modulated as revealed in U.S. Pat. No. 3,774,923 of Suroff (1973), U.S. Pat. No. 3,756,105 of Balamuth et al., (1973), and U.S. Pat. No. 4,334,602 of Armour et al., (1982), or even totally eliminated by, for example, magnetic levitation as shown in U.S. Pat. No. 3,937,148 issued to Simpson (1976), then the frictional force generated between these two surfaces is correspondingly minimized.

All these techniques of friction reduction can be used individually or possibly, in some cases, in combination. Examples are air bearings, like those described in U.S. Pat. No. 3,683,476 of Lea et al., (1972), used in precision translational stages where a combination of an air film and levitation techniques are employed to reduce friction.

Solutions to the stiction phenomenon were revealed in applications related to magnetic disk storage. U.S. Pat. No. 4,530,021 issued to Cameron (1985) and U.S. Pat. No. 6,002,549 issued to Berman et al., (1999), teach that vibrational techniques, which dither the slider head also free it from the force of stiction. Further solutions to the stiction problem involve surface texturing techniques, as illustrated by U.S. Pat. No. 5,079,657 of Aronoff et al., (1991), which allow a slider head to leave a surface smoothly.

Similarly, the stick-slip problem has also been successfully addressed in diverse fields, such as those including focusing mechanisms used in optical disk storage and wiping mechanisms for automotive windshields. Their solutions, like the stiction case, are also based upon oscillation methods as revealed in U.S. Pat. No. 4,866,690 issued to Tamura et al., (1989) and U.S. Pat. No. 5,070,571 issued to Masuru (1991).

However, all these prior art techniques suffer from one or more drawbacks which render their benefits, in a plain bearing-like device application, individually insufficient and in some cases, incompatible with precision. For example, simply adding a lubricant between the two surfaces of a plain bearing does not minimize either stiction or stick-slip behavior which are required for smooth microscopic motion as well as positioning accuracy. Controlling the aforementioned operating parameters does not reduce the coefficient of friction enough for most applications. Changing the compressive force by periodic or continuous levitation compromises bearing compressive stiffness, produces changes in the bearing position depending upon whether the bearing is levitated or not, and may require substantial external facility support such as, in the case of air bearings, a continuous supply of clean, dry air delivered at a regulated pressure. Furthermore, U.S. Pat. No. 4,648,725 of Takahashi (1987), teaches that positioning devices employing bearings with only a fixed, very low coefficient of friction, such as an air bearing, tend to have an extended settling time even after moving at relatively low velocity to a particular position of interest.

Also, prior art examples using vibrational or oscillation techniques to minimize stiction or stick-slip make no effort to separate the vibrational motion from the ideally desired motion of the load. Separation of the two motions is paramount in precision bearings where maintaining the integrity of the slidable path, continuously contacting surfaces, and vibrational insensitivity are all desired properties. Furthermore, prior techniques that use the vibrational motion only prior to moving the load along its desired path do not remove any stick-slip problem from occurring during travel.

Therefore, in order for any plain bearing-like devices to be successfully employed for precision and microscopic movement applications, simultaneous solutions to the high friction, short settling time, stiction, and stick-slip issues must be implemented utilizing techniques obtained from many different technical areas.

Furthermore, in order to utilize such a plain bearing-like device as "real" ultrastiff bearing, an important additional bearing characteristic must be addressed. In prior art, when bearings are incorporated into a stage for example, there is generally an incompatibility between the ultrastiff requirement and the bearing's mechanical tolerances. Ideally, for a stage to be truly ultrastiff in one or more axes orthogonal to the direction of travel, all the components of the stage must have essentially zero mechanical tolerance or "play" in these orthogonal directions. In prior art, the solutions to this problem are (1) to simply minimize these mechanical tolerances by manufacturing mechanical components to nearly exact specifications, or (2) to compensate for the mechanical variations by incorporating elastic members between moving surfaces, or (3) to maintain an equivalent "zero tolerance" condition by dynamically adjusting one or more mechanical components. Of these heretofore mentioned solutions, only the actively servoed technique of dynamic compensation approaches the ideal mechanical stiffness requirements and this dynamic adjustment technique has been successfully implemented in the form of an air bearings, like those described in U.S. Pat. No. 3,683,476 of Lea et al., (1972). Therefore, for success in ultrastiff applications, a plain bearing-like device must also contain a solution to this incompatibility between mechanical tolerance and stiffness.

To complete the prior art survey, a seemingly unrelated device known as the ultrasonic bonder should also be included.

The ultrasonic bonder or wire bonder is commonly used in the semiconductor industry to electrically connect the integrated circuit chip to the leadframe pins. Ultrasonic bonding, also known as welding or friction-fusion bonding, is a process for joining two materials by means of a bonding tool which exerts a normally directed clamping, mashing, or applied force on two juxtaposed contacting surface areas while vibrating one parallel to the other at an ultrasonic frequency. As a result, local plastic deformation takes place in the interfacing materials and a metallurgical bond is formed between the two materials. The original thermosonic bonder, as described in U.S. Pat. No. 3,054,309 of Elmore (1962), and its many descendants, typified by U.S. Pat. No. 5,186,378 issued to Alfaro (1993), generally requires not only a clamping or mashing pressure (around 200 MPa) and ultrasonic vibrations (around 60 kHz) but also high temperatures (around 175° C. to 300° C.) to obtain near 100 percent intermetallic coverage. Recent advances include an ambient temperature (around 27° C.) ultrasonic wire bonder, as revealed in U.S. Pat. No. 5,244,140 of Ramsey et al., (1993), and a thermoplastic welding apparatus described in U.S. Pat. No. 4,482,421 issued to Gurak (1984).

SUMMARY OF THE INVENTION

An ultrastiff precision sonic bearing assembly and method thereof for controlling an effective coefficient of friction between two elements in slidable contact configured along an interface under a force sufficient to maintain contact and having static friction therebetween, by inducing a sinusoidal oscillatory sliding motion in one of the elements parallel to the interface thereby altering the effective coefficient of friction therebetween. The bearing assembly also provides for additional and independent electronic control over the average thickness thereof and senses the component of the force perpendicular to the interface thereon.

A simple implementation of this method is in a planar form of a linear sonic bearing, comprising of a moveable load member having a load sliding surface for translating along any slidable path direction on a bearing element's bearing sliding surface. A lower stationary base member supports both the bearing element and the load member. The bearing element resonates in response to an applied energizing means which reduces the effective coefficient of friction $\mu_{SB}$ between the load and the bearing sliding surfaces. The effective coefficient of friction can be smoothly and rapidly changed by controlling the amplitude of the oscillatory sliding motion. The effective static and dynamic stiffness of the sonic bearing can also be independently and smoothly controlled by applying a bias to the bearing element which modulates the thickness of the bearing element. Applications of the invention can be found in such devices as ultrastiff, precision bearings and sensors.

The primary steps used to optimally achieve the apparent frictional reduction are to: (a) preselect the surface materials for the contacting surfaces to minimize ultrasonic induced bonding, (b) pre-texture the contacting surfaces to minimize stiction, (c) pre-coat the contacting surfaces with a film to reduce the actual coefficient of friction and to serve as an anti-bonding agent, and (d) induce into the bearing sliding surface, a sinusoidal oscillatory sliding motion whose resulting frictional forces are balanced and whose oscillation level can be controlled. Furthermore, in order to provide ultrastiffness, each slidable contact between bearing components should be a direct material to material contact with large surface area so that the inherent bearing stiffness is determined primarily by the material compressibility. To enhance this ultrastiff aspect of the invention, the thickness of one or more components in the bearing assembly can be altered in response to a variation in the force in order to provide an additional stiffness servo mechanism by: (a) preselecting the material in a portion of the bearing assembly subject to the same force as the sliding surfaces to have electromechanical properties which facilitate the desired dimensional change, (b) sensing the magnitude of the normal component of the force on the bearing element to determine the value of a high voltage signal, and (c) applying that high voltage signal to that portion of the bearing assembly in such a manner as to maintain a constant perpendicular component of the force by producing the desired dimensional change.

It is accordingly a primary object of the present invention to provide a sonic bearing assembly that retains all the desirable properties of a plain-type bearing such as high compressive stiffness, low sensitivity to shock-loading, and minimal off-axis error while maintaining a very low effective coefficient of friction $\mu_{SB}$.

It is accordingly another primary objective of the present invention to provide an electronic controlling means which allows the effective coefficient of friction of the bearing assembly to be easily and rapidly changed between its high and low states. This characteristic enables a stage equipped with sonic bearings to minimize the settling time after the load has reached the designated coordinate while minimizing positional error in one or more axes orthogonal to the slidable path.

It is accordingly a further primary objective of the present invention to provide an electronic controlling means for dimensionally altering one or more components in the bearing assembly to allow for attributes such as variable thickness, position modulation, temperature coefficient compensation, low frequency vibrational damping, damping of variations in compressive force, bearing wear compensation, and relaxation of manufacturing and/or alignment tolerances while still being able to achieve the equivalence of the "zero tolerance" criteria as required for use in precision and ultrastiff instruments.

Furthermore, another primary object is to provide a sensing means for measuring the magnitude of the normal component of the force on the bearing assembly so that a signal representing that magnitude can be provided for use in a feedback mechanism to enhance the stiffness of the sonic bearing assembly.

It is another object of the present invention to provide a bearing assembly that exhibits minimal stiction and stick-slip properties which, in combination, will improve the ability of a stage using sonic bearings to move a load with increased smoothness and precision.

A further object of the present invention is to provide a bearing assembly which maintains its high effective coefficient of friction $\mu_{SB}$ with or without using any electrical energy. This characteristic enables a stage equipped with sonic bearings to "lock" its position.

A still further object of the present invention to provide bearings with high reliability by using only solid state components with very few moving parts.

An additional object of the invention is to provide bearings with diversified geometries which can accommodate application specific requirements such as microscopic dimensions, or translational, rotational, or multi-axial movements.

Furthermore, according to one aspect of the present invention, another object is to provide bearings with wear resistance, hence long operational life, by using extremely hard, laminated, or customized materials, or any combination thereof as the sliding surfaces with surface treatments including ion implantation.

In other preferred forms of the present invention, the bearing can be operated in environments with harsh conditions which may include high vacuum, cryogenic temperatures, ionizing radiation, corrosive vapor, high magnetic fields or any combination thereof.

Further objects and advantages are to capitalize on existing optical polishing and quality control technologies used to manufacture high precision surfaces for very hard materials at low costs. Still further objects and advantages will become apparent from considerations of the ensuing descriptions and drawings.

DRAWING FIGURES

Figure 17:
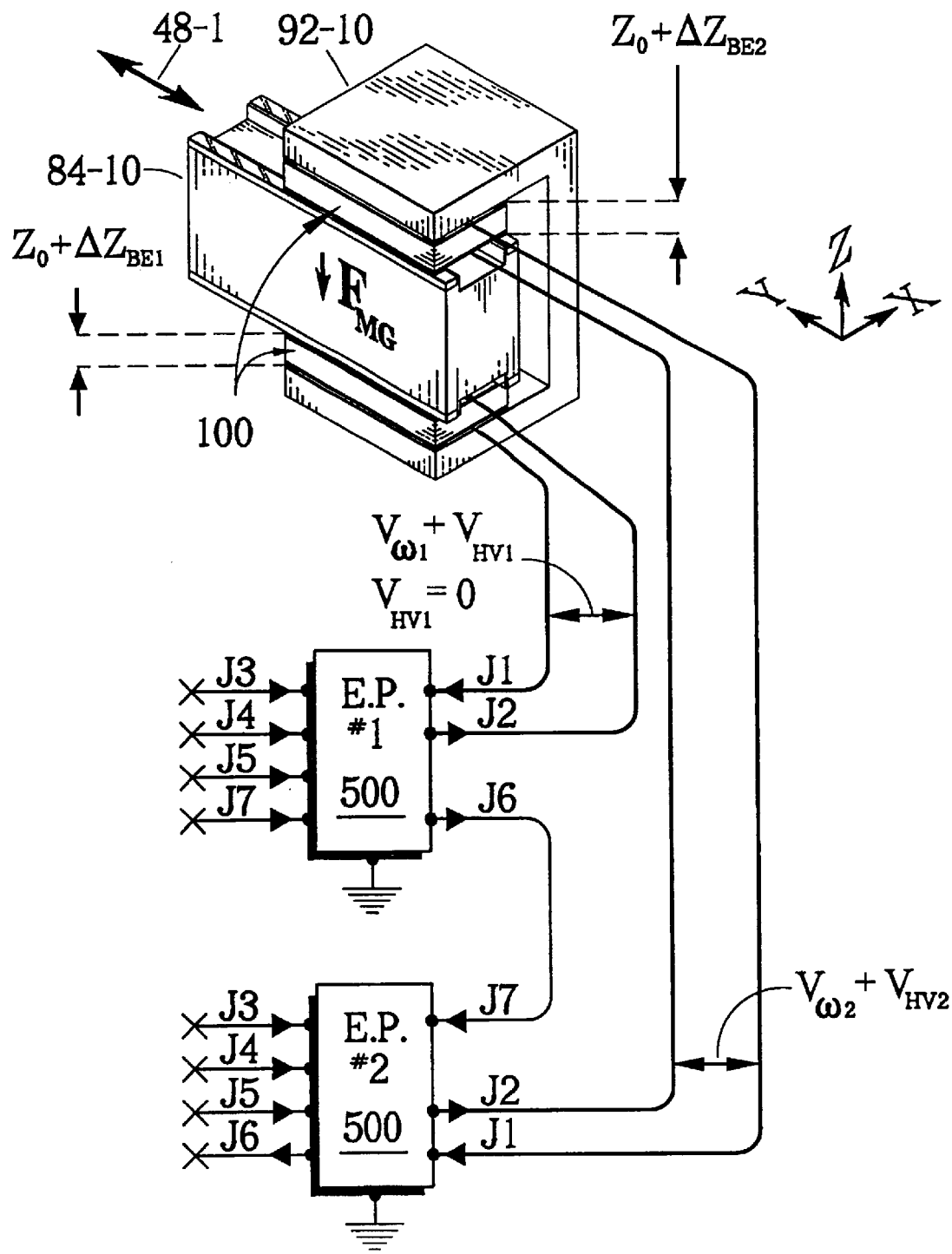
Figure 18:
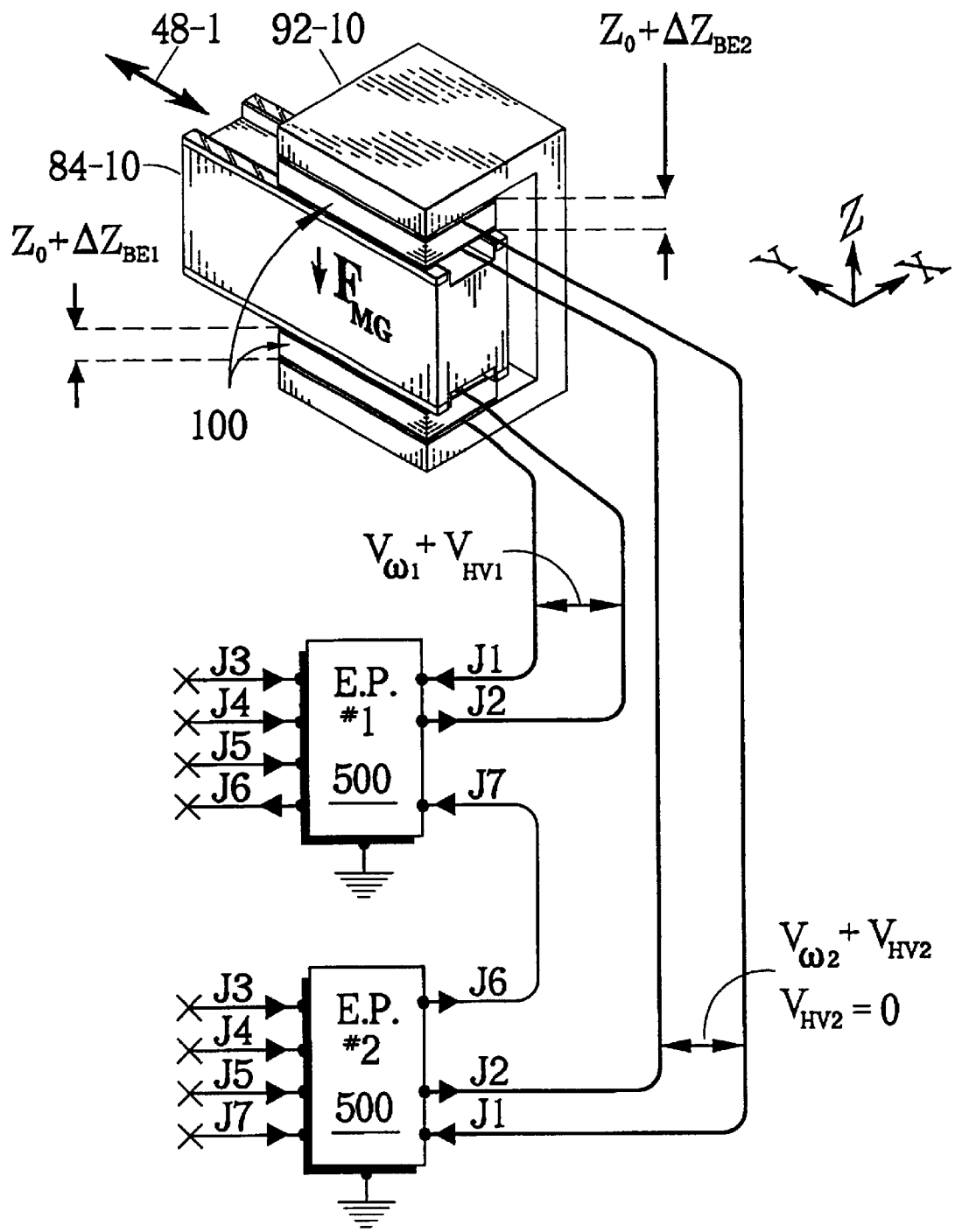
Figure 19:
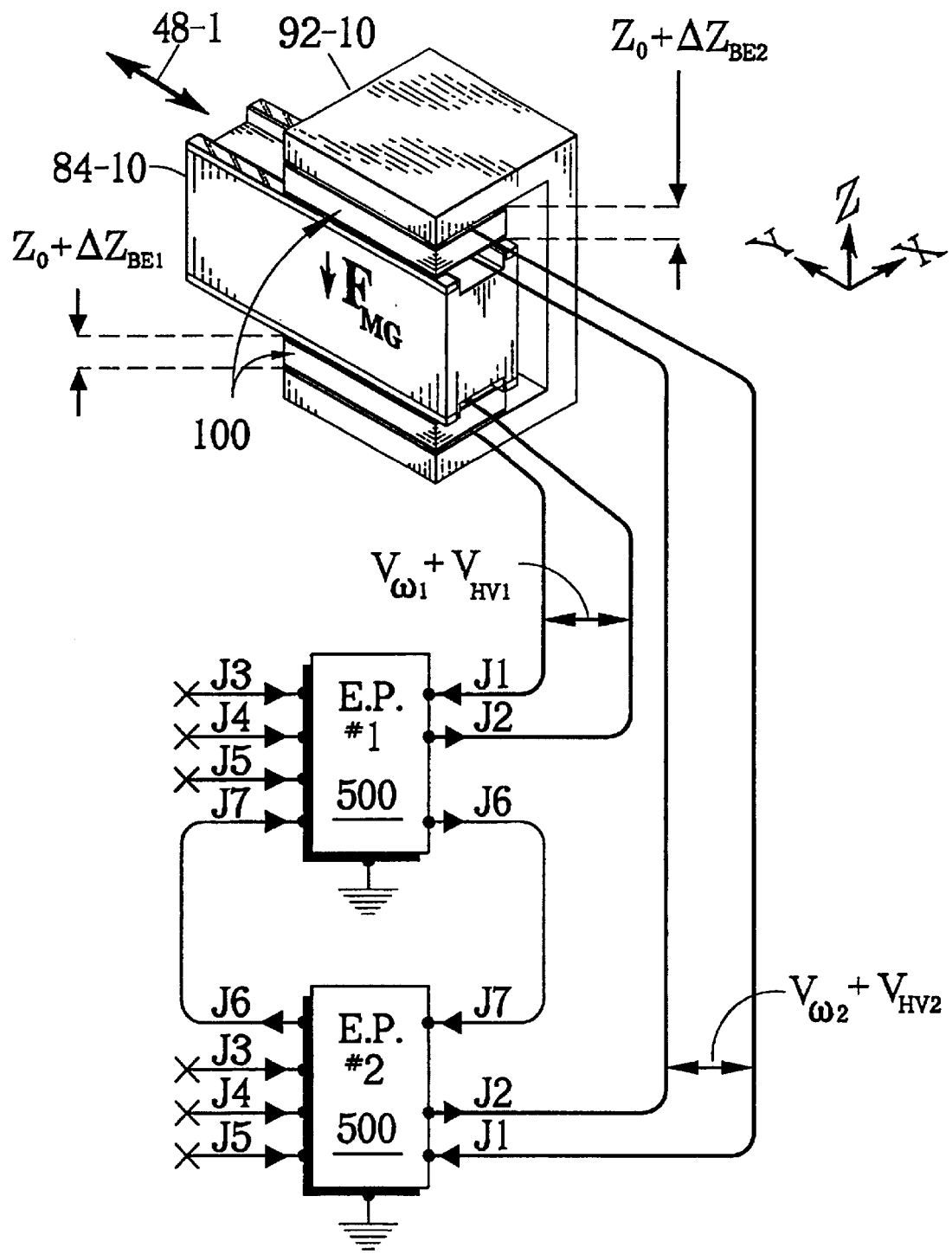

FIGS. 17 to 19 each show an isometric view of a simplified, multi-bearing element, sonic bearing assembly employing a pair of opposing ultrastiff direct-drive bearing elements sandwiching a load member with different force servo mechanism configurations between bearing elements.

Figure 22:
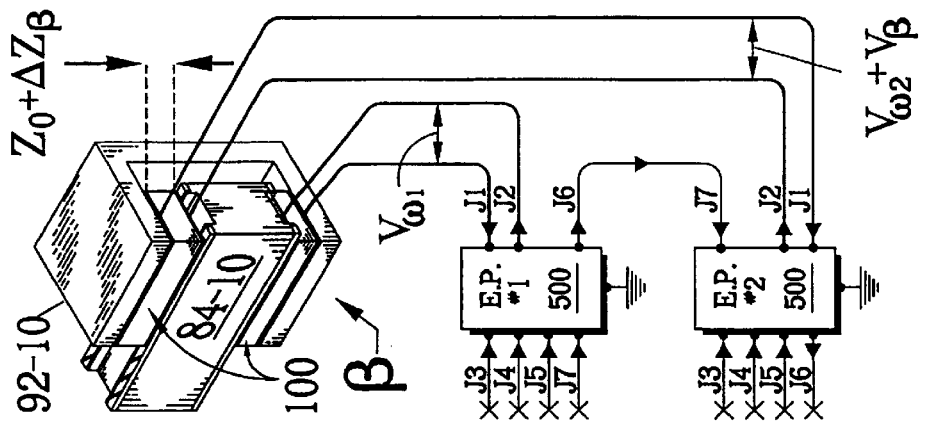
Figure 21:
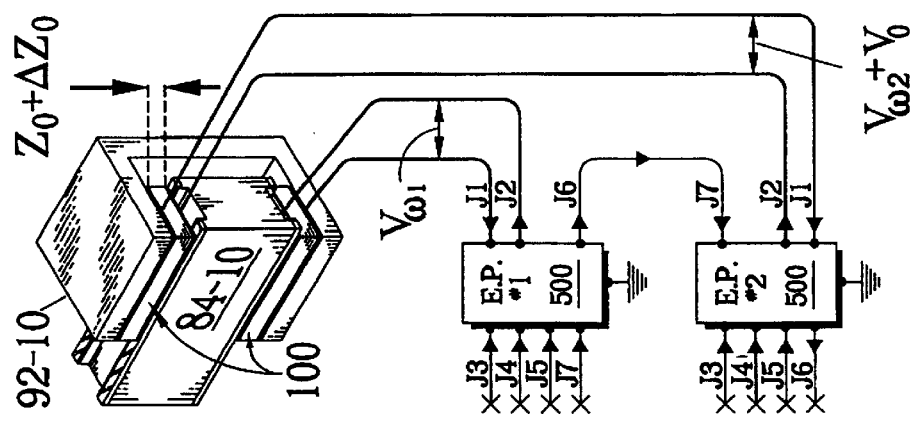
Figure 20:
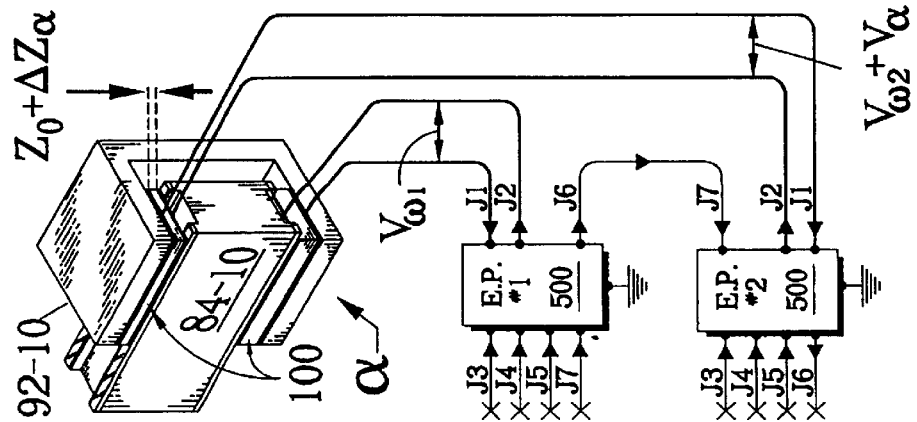

FIGS. 20 to 22 show isometric views of the sonic bearing assembly configuration of FIG. 17 illustrating the effect of the force feedback for the case when the load member undergoes a dimensional change.

Figure 23B:
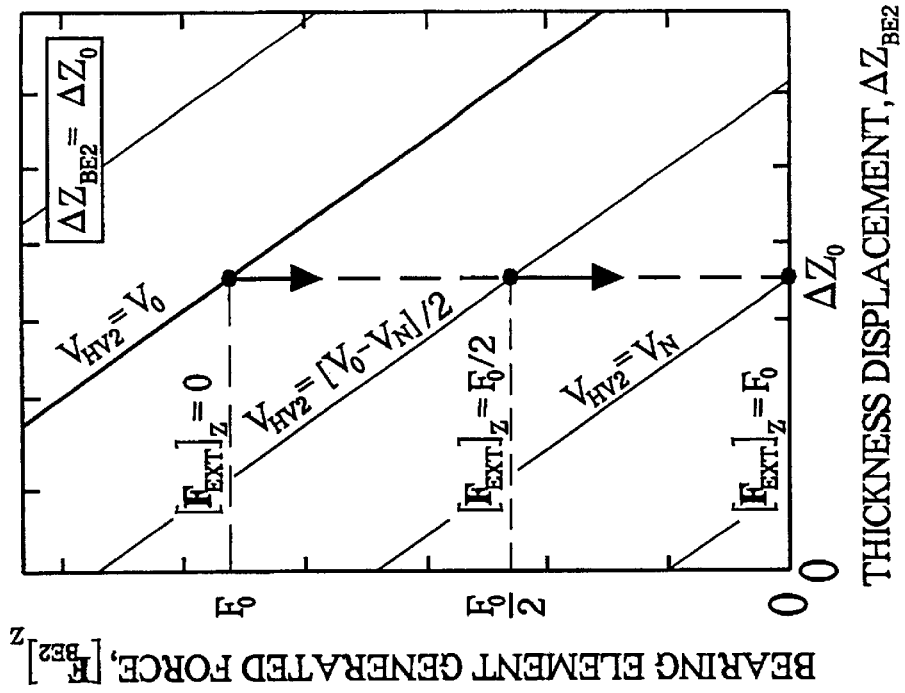
Figure 23A:
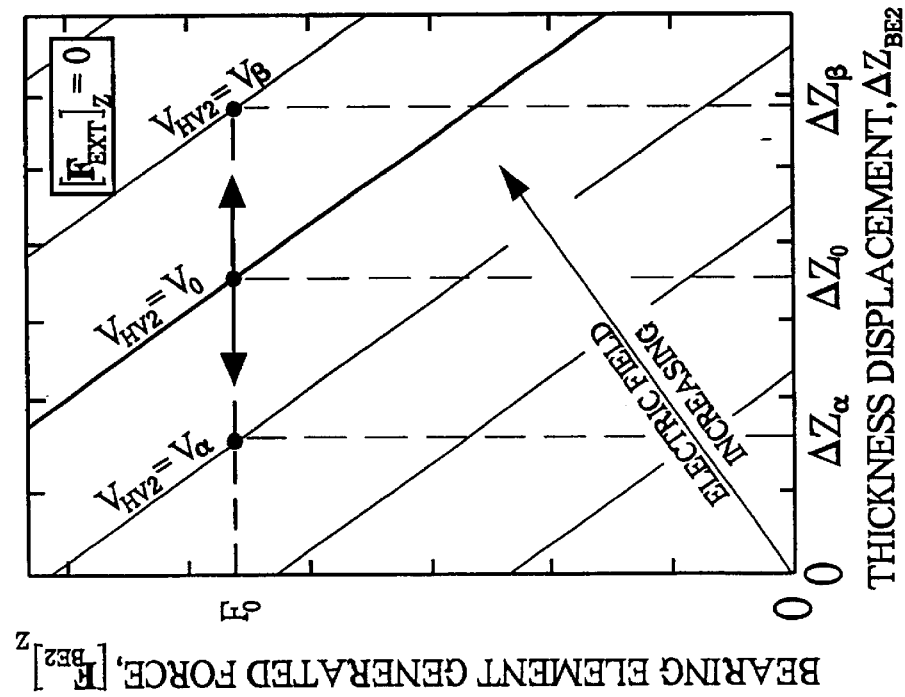

FIG. 23A is a plot showing the change in the upper bearing element thickness $\Delta Z_{BE2}$ as a result of changing the applied adjustable high voltage $V_{HV2}$ in order to maintain a constant force $[F_{APP}]_Z$ on the lower bearing element for each of the states described in FIGS. 20 to 22.

FIG. 23B is a plot showing the change in the upper bearing element generated force $[F_{BE2}]_Z$ as a result of changing the applied adjustable high voltage $V_{HV2}$ in order to maintain a constant force $[F_{APP}]_Z$ on the lower bearing element when a unidirectional external force $[F_{EXT}]_Z$ is applied to the lower bearing element for the sonic bearing assembly configuration of FIG. 17.

Figure 24A:
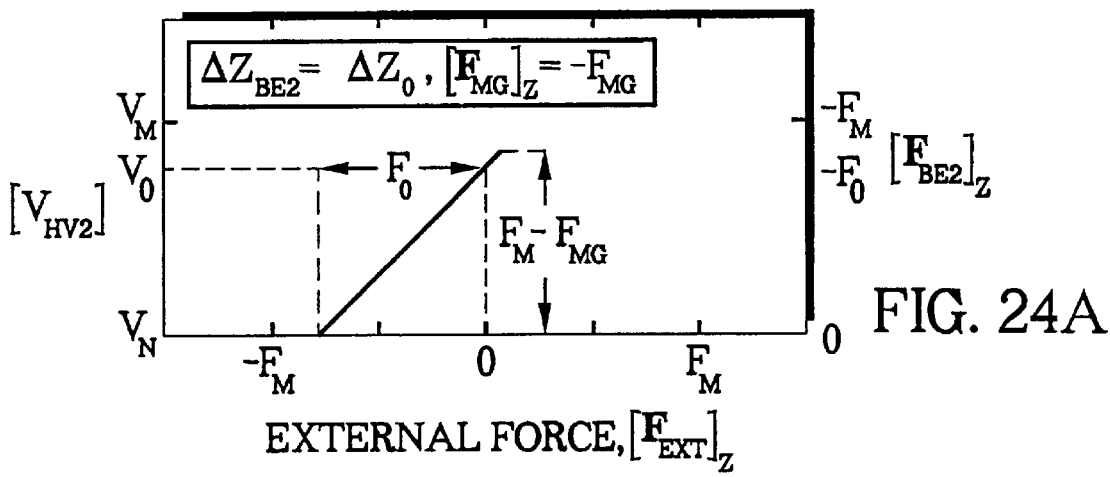
Figure 24B:
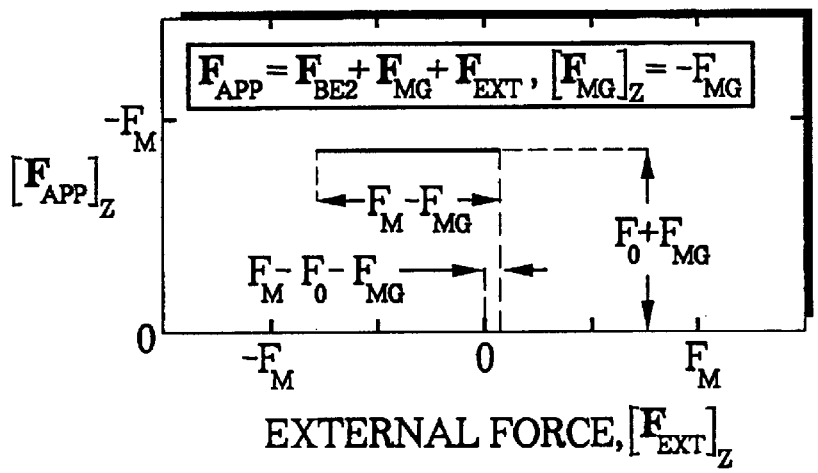
Figure 24C:
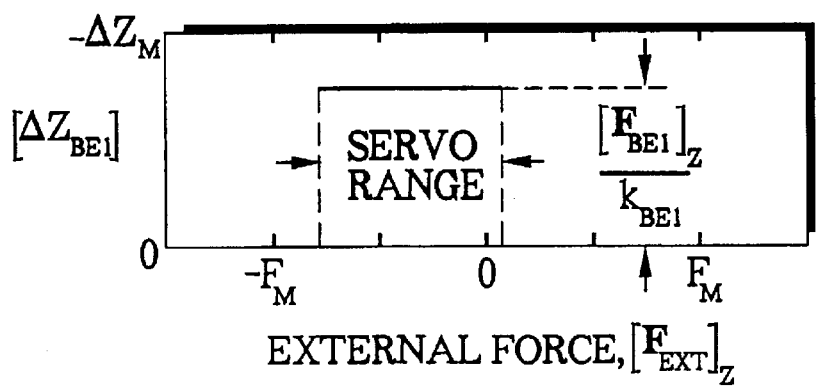

FIGS. 24A to 24C graphically illustrate the relationship of the stiffness of the sonic bearing assembly configuration of FIG. 17 with an external force $[F_{EXT}]_Z$ of arbitrary magnitude is applied to it.

Figure 25A:
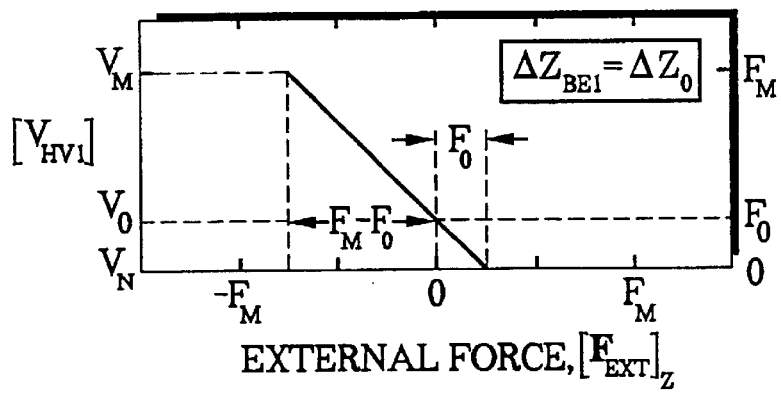
Figure 25B:
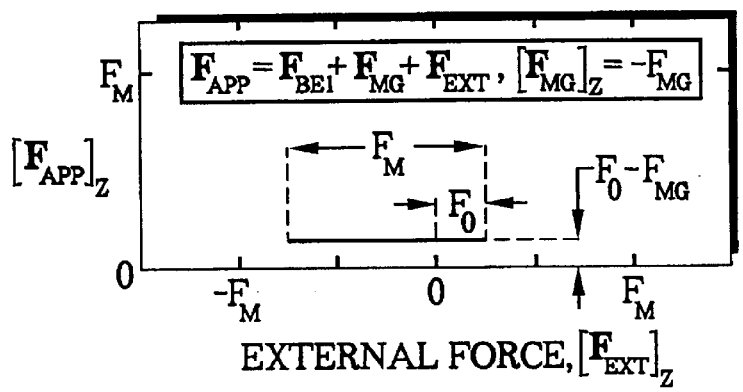
Figure 25C:
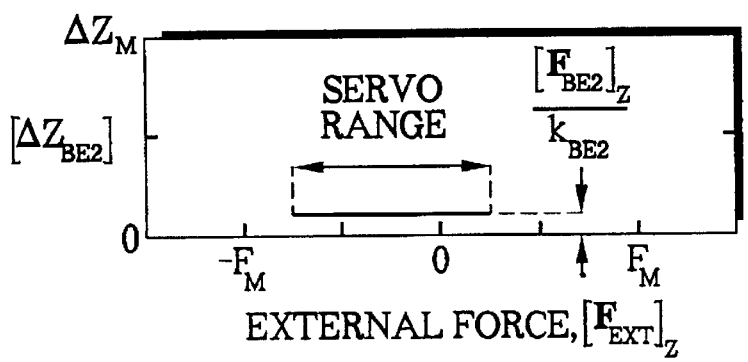

FIGS. 25A to 25C graphically illustrate the relationship of the stiffness of the sonic bearing assembly configuration of FIG. 18 with an external force $[F_{EXT}]_Z$ of arbitrary magnitude is applied to it.

Figure 26A:
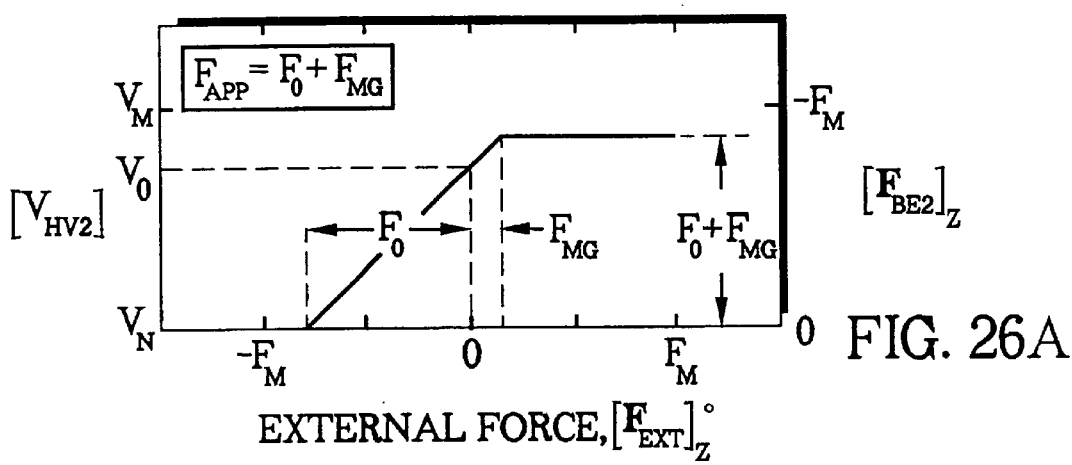
Figure 26B:
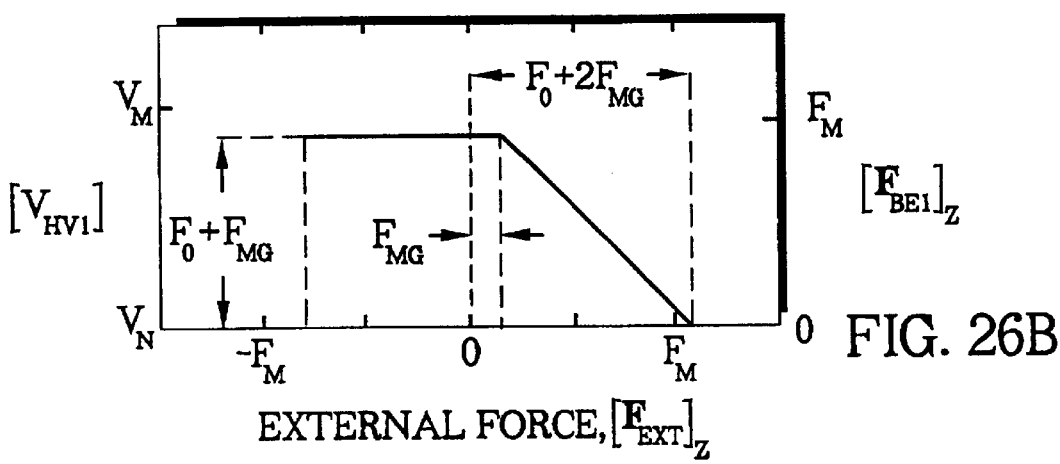
Figure 26C:
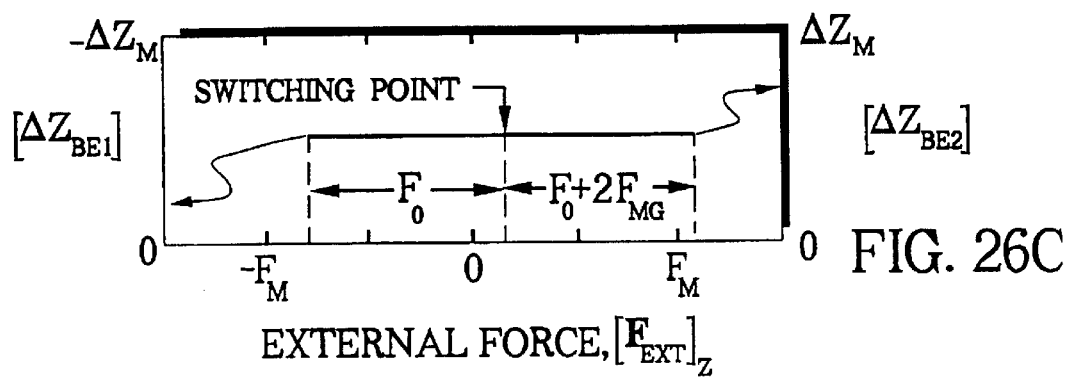

FIGS. 26A to 26C graphically illustrate the relationship of how the stiffness of the sonic bearing assembly configuration of FIG. 19 is maintained when an external force $[F_{EXT}]_Z$ of arbitrary magnitude is applied to it.

Figure 27:
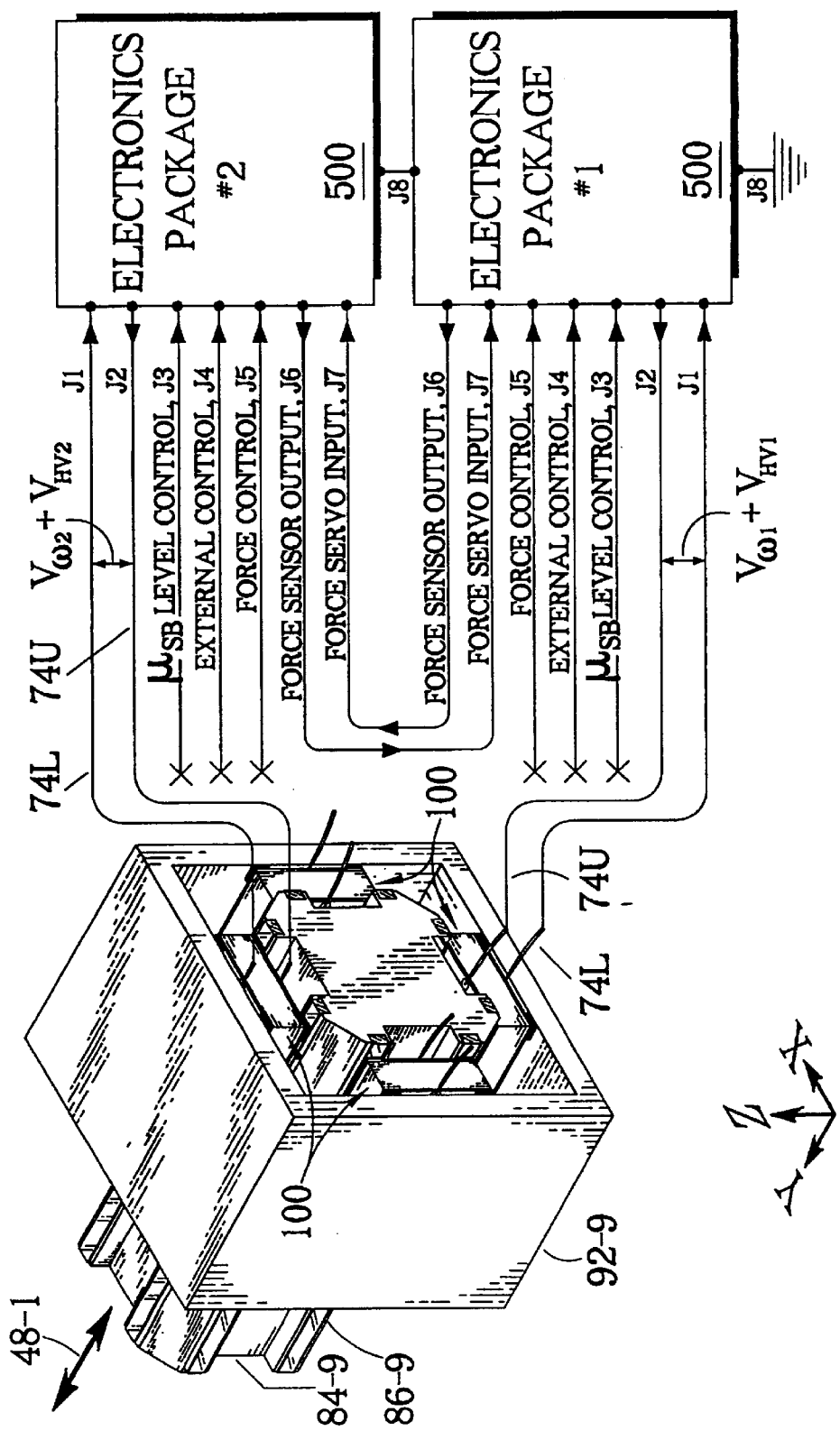

FIG. 27 contains an isometric view of a simplified multi-bearing element sonic bearing assembly employing two pairs of opposing ultrastiff direct-drive bearing elements and also shows an external configuration for the drive electronics package of each bearing element in one opposing pair.

DETAILED DESCRIPTION OF THE INVENTION

One of the fundamental objectives of all friction reduction devices is to minimize the applied sliding force necessary to initiate and sustain a sliding motion between the contacting surfaces of two objects. In prior techniques, such as those that use lubricants, balls, or variations in operating parameters, this goal was achieved by actually reducing the actual coefficients of friction. Other prior methods, such as magnetic and vibrational levitation techniques, do not reduce the coefficients of friction itself, but minimize the compressive or normal component of the force between the two sliding surfaces which in turn, will minimize the required applied sliding force.

The present invention uses a different approach to reach the same goal by externally supplying most of the energy that is dissipated by the frictional sliding process in a manner that does not, on the average, interfere with the original load sliding motion. If this technique is implemented on two sliding surfaces, there will be an apparent reduction of the coefficient of friction, hereinafter referred to as a reduction in the "effective coefficient of friction" $\mu_{SB}$, since the energy drain normally associated with frictional sliding is now primarily supplied by an independent source, and only secondarily from the kinetic energy of the moving load itself. The sliding load will, for the most part, maintain its original velocity and therefore have the appearance of sliding on a surface with very low friction. This reduction of the effective coefficient of friction is achieved in a mechanical structure called a sonic bearing.

In its most simplistic form, the adhesion theory of friction indicates that for very hard and very smooth surfaces, sliding friction is the result of energy losses from the severing of chemical bonds between the tips of microscopic asperities (i.e., high peaks) at the interface of two sliding surfaces. Specifically, the severing of chemical bonds occurs when the asperities that are constantly being formed to connect the two surfaces, are non-elastically or plastically deformed and sheared. In a normal sliding process, the energies dissipated by the frictional forces are usually extracted from the kinetic energy of the sliding load itself, hence as an unaided load slides along a level frictional surface, it slows and eventually stops. Hereinafter, the motion of a load sliding on a surface will be referred to as the load sliding motion.

Therefore, without imposing any limitations on the scope of the claims, we propose that the friction reduction aspect of the invention is based upon the following concepts: (1) most of the bond deforming and shearing energy due to friction can be supplied by an external source rather than by extracting it from the kinetic energy of the sliding load itself; (2) the external energy can be supplied via techniques that do not significantly interfere with the original load sliding motion; (3) the sliding surfaces' material properties and surface properties can be selected to inhibit the bonding of these surfaces due to the abrupt release of stored chemical energy associated with the bond's nonelastic deformation and shearing; and (4) severance of the bond releases the load to move in any path that is slidable. Assuming that these concepts are valid and appropriate hardware implemented, then the kinetic energy of the unaided sliding load will be held nearly constant during sliding and the moving load will slow down only very gradually. We have therefore obtained very low effective coefficient of friction between the two sliding surfaces, even though the actual coefficient of friction between these surfaces can be relatively large and remain unaltered.

The basic principles of the adhesion theory of friction, also known as the Adhesion, Junction-growth, and Shear (AJS) model, are well known in the art and are described in detail in the literature. See for example, Ludema, K. C., "Friction, Wear, Lubrication", CRC Press, Boca Raton, New York, 1996, pp. 72–81 and Blau, P. J., "Friction Science and Technology", Mercel Dekker, New York, 1995, pp. 138–147.

Preferred Embodiments

In the preferred embodiment of the invention, a load member having a load sliding surface is sliding on a bearing element having a bearing sliding surface, where the asperities at the interface are repetitively deformed and sheared to allow the load member to slide in a load sliding motion when acted on by an applied sliding force. An energizing means is used for inducing a symmetrical, oscillatory sliding motion into the bearing element by way of a transducer, and this oscillatory sliding motion is totally separate from any load sliding motion of the load member. The main characteristics of this oscillatory sliding motion are that: (1) the root-mean-square (r.m.s.) velocity $v_{SB}^{rms}$ of this motion is substantially larger than the translational speed of the load sliding motion $v_{LOAD}$; (2) the direction of this motion is along any slidable path associated with the load sliding motion, but not necessarily along the same slidable path as the load sliding motion; and (3) the distance versus time profile of any one point on the bearing sliding surface from its equilibrium position is substantially the same for each one-half cycle of the oscillation.

A simple and efficient method of inducing the required oscillatory sliding motion with all the heretofore mentioned characteristics into a bearing sliding surface is to produce a longitudinal resonance in a solid, substantially rigid elastic object that has the bearing sliding surface. This resonance can be achieved by driving the transducer at one of its longitudinal resonant frequencies and coupling the resulting acoustic resonant waves constructively throughout the body of that object. In this way, the transducer motion is amplified, by a factor proportional to the quality factor or Q of the resonance, relative to the non-resonant motion, for the same oscillating transducer input drive voltage.

The oscillatory sliding motion has a further requirement which complements or is related to the topography of the load sliding surface. It is imperative that the load sliding surface topography does not change the path of the oscillatory sliding motion in the bearing element. Therefore, not only is the path of the oscillatory sliding motion along any slidable path, but the motion itself must also not impart a modulation to the force that holds the bearing sliding surface to the load sliding surface while interacting with the topography of the load sliding surface. The surface topographies may be of any configurations, including planar, cylindrical, or spherical.

Additionally, one of the main tasks of the invention is to design a sonic bearing to minimize the side effects associated with the introduction of this oscillatory sliding motion into the bearing sliding surface. Generally, these effects can be grouped into two opposing categories consisting of the motion-producing and the motion-inhibiting phenomena.

The motion-producing side effect is a phenomenon resulting from the transferring of the bearing sliding surface's oscillatory sliding motion, via frictional forces, to the load sliding surface, resulting in a composite motion of the load member, consisting of the original load sliding motion and the undesirable oscillatory sliding motion.

In the invention, three independent techniques are used to reduce this specific motion-producing side effect. The first, and of course the most obvious approach, is to directly reduce the oscillating frictional forces on the load sliding surface generated by the oscillating bearing sliding surface. Traditionally, this is accomplished by employing a lubricant, such as an oil film, between the two sliding surfaces. More recently however, a different approach based upon the adhesion theory of friction has been widely used. Basically, according to the theory, the coefficient of friction between two hard sliding surfaces can be substantially reduced if a softer intermediate solid film of a specific thickness is attached to one of the two hard surfaces. This reduction is achieved because the plastic deformation of the asperities between two sliding surfaces during sliding is limited only by the shear stress that can be sustained in the material of the soft surface film. Furthermore, this film can be modified by ion implantation to a predetermined number of ions/cm$^2$ whereby the film is subjected to implantation of a depth greater than the thickness of the film. This improves its wear characteristics without degrading the low actual coefficient of friction. This type of modification can be applied to any sliding surfaces in the present invention, including but not limited to the sliding surfaces belonging to load members, bearing elements, extension members, base members, contact pads, and load guideway members. Several very low friction designs using this technique are described in U.S. Pat. No. 4,824,262 issued to Kamigaito et al. (1989).

The second technique, called the temporally nulling method is based upon the temporal symmetry of the induced motion on the load sliding surface resulting from the symmetrical oscillatory sliding motion of the bearing sliding surface. Specifically, any displacement of the load sliding surface in the time period of the first one-half cycle has an equal and opposite displacement over the time period of the second one-half cycle. Thus, if the normal component of the force $F_{APP}$ between the load element and the bearing element is maintained to be constant, and if the surfaces are adapted to have an actual coefficient of friction substantially uniform along any slidable path between the load member and the bearing element, then the net displacement of the load sliding surface will therefore be minimized by the symmetry of the induced motion over a total time period of one full cycle. An example of a symmetrical oscillatory sliding motion in an elastic material is a sinusoidal motion. This net displacement of the load sliding surface can be further reduced by attaching a substantially large inertial mass to the load sliding surface to reduce the magnitude of the aforementioned displacement in each one-half cycle.

The third technique, called the spatially nulling method is predicated on the spatial symmetry of the oscillatory sliding motion of the bearing sliding surface. The general concept here is to mechanically arrange the bearing sliding surface to have two separate contacting regions or provide one contacting region on two different bearing sliding surfaces. Each region is designed to slide against the same load sliding surface along an interface having a uniform coefficient of friction and both regions have an oscillatory sliding motion with the same set frequency and similar set amplitudes. But each region has a set phase which is constantly 180 degrees out of phase from the other. Once these parameters are set, and the load member is configured to slide about these regions of the bearing element, the effect of these two oscillating regions sliding against a common load sliding surface is to simultaneously generate two substantially equal and opposite frictional forces on that surface. The net result of these two frictional forces on a rigid load sliding surface is to substantially cancel any bearing element induced movement on the load member at any given time. The optimum approach to minimizing this motion-producing side effect is, of course, to utilize all three techniques simultaneously as is done in the preferred embodiments of a sonic bearing.

Another very important side effect resulting from the introduction of an oscillatory sliding motion into the bearing sliding surface is the motion-inhibiting phenomenon. Basically, when two very smooth surfaces are subjected to a combination of ultrasonic oscillations, force applied between the surfaces and elevated temperature, welding or bonding of the two sliding surfaces may occur. An important aspect in the design of a sonic bearing is, of course, to prevent this bonding phenomenon from occurring.

In the present invention, various methods are employed to minimize this motion-inhibiting side effect. In order to fully determine the specific requirements for suppressing the motion-inhibiting side effect, it is instructive to review the bonding requirements of a commercially available ultrasonic bonder used in the semiconductor industry. Bonding is optimized when: (a) the two contacting materials used have the same crystalline structure, such as the case of Au and Al, which have face centered cube geometry; (b) the two melting point temperatures (e.g., Al is 660° C. and Au is 1064° C.) are less than or near the ultrasonically induced, equivalent local surface temperature rise of approximately 1000° C. (see F. Seits, Imperfection in Nearly Perfect Crystals, John Wiley, New York, 1952); (c) the contact pressure between the two surfaces is substantially high, like for the case of Au bonded to Al where it is approximately 200 MPa; (d) the ultrasonic frequency is in the range of 60 to 200 kHz; (e) the ultrasonic power is in the range of 100 to 300 mW; (f) the average surface temperature is as close to the materials' melting points as possible and for the case of Au bonding to Al, the practical temperature range is from 175° to 300° C.; (g) the surfaces are free of foreign contaminates such as an oil film; and (h) the sonic energy application time for the case of Au wire on Al pad is approximately 0.5 ms at 300° C.

These optimizations are categorized in three main groups comprising of selecting material properties, the operating parameters, and surface properties. Therefore, minimization of the motion-inhibiting side effect required for proper sonic bearing operations is optimized when the material properties, the operating parameters and the surface properties associated with the sonic bearing operation are individually optimized to inhibit bonding.

Examples of material property optimizations are (1) selecting materials of different crystalline structure for each sliding surface; (2) selecting the material of the sliding surfaces to have high melting temperatures; and (3) selecting at least one of the surfaces to have a large thermal conductivity value. As previously stated, the local ultrasonically induced equivalent temperature due to bond breaking at the asperities site is approximately 1000° C. Therefore, sliding surface materials of alumina and tungsten carbide with crystalline structures of rhombohedral and hexagonal respectively, having melting points of 2015° C. and 2800° C. respectively, in conjunction with tungsten carbide having a large thermal conductivity value, will satisfy the above requirements.

Optimizations of the operating parameters include selecting the lowest possible (1) contact pressure, (2) resonant frequency and (3) average operating temperatures for the sliding surfaces. Typically, the bonding pressure for Au on Al in ultrasonic bonding is one hundred times greater than the contact pressure of 0 to 1 MPa acting on the sliding surfaces of a sonic bearing. Generally, the operating frequency for ultrasonic bonding is higher than the typical operating frequency of a sonic bearing. Lastly, the ambient operating temperature for ultrasonic bonding is around five to ten times higher than the operating temperature of 50° C. or lower for a sonic bearing. Therefore, to minimize bonding, it is preferable that each sliding surfaces be controlled at a temperature between 0° C. and 50° C. It is also preferable that the contact pressure between the sliding surfaces be less than 1 MPa. Furthermore, it is preferable to select the frequency of motion in the bearing element to be a longitudinal acoustic resonant frequency. Lastly, it is preferred that the frequency of motion in the bearing element be in a range between 0 kHz and 120 kHz to minimize bonding between the sliding surfaces.

Finally, the sliding surface properties should be optimized by (1) polishing the sliding surfaces to a certain predetermined degree of flatness per unit area to ensure maximum straightness of travel, (2) texturing the sliding surfaces with microscopic recesses in accordance with a controlled and reproducible pattern to reduce stiction, and (3) coating all the sliding surfaces with a thin film of mineral oil saturated molybdenum disulfide to perform the dual functions of a lubricant and an anti-bonding agent.

Another important property of a bearing, besides low friction, is the bearing's stick-slip characteristic. This type of phenomenon can be commonly found in the squeaking of a door hinge or in the chatter of the aforementioned windshield wiper and is characterized by a semi-irregular oscillatory motion superimposed onto an otherwise smooth, sliding or rotational motion. This semi-irregular oscillatory motion is the result of fluctuations in the frictional forces along the sliding path. A necessary requirement for a sliding system to exhibit this stick-slip oscillatory behavior is to have a positive feedback mechanism driving the stick-slip relaxation-oscillation mechanism. For two sliding surfaces, this feedback mechanism can be, for example, the dependance of the sliding friction on its sliding speed. Specifically, positive feedback will occur when the sliding friction decreases with increasing sliding speeds.

For a bearing, the stick-slip property usually determines the ability of that bearing to perform precise, microscopic movements. In the case of the sonic bearings of the invention, the bearing's effective coefficient of friction $\mu_{SB}$, for a fixed value of the r.m.s. velocity $v_{SB}^{rms}$, increases as the speed of the load sliding motion increases, resulting in a negative feedback rather than a positive feedback to the stick-slip relaxation-oscillation mechanism. The "sonic bearing effect" therefore, not only lowers the bearing's effective coefficient of friction, but also inherently dampens and prevents the generation of the stick-slip oscillatory behavior. The stick-slip phenomenon is also well known in the art and are described in detail in the literature. See for example, Blau, P. J., "Friction Science and Technology", Mercel Dekker, New York, 1995, pp. 108–134.

The sonic bearings of the invention can be separated into two different groups depending on whether or not a base member is included. These groups form the two classes of stiff and ultrastiff sonic bearings, with the class having the base member being the ultrastiff sonic bearings. Within both of these classes, the sonic bearings can be further categorized by the composition of the sonic bearing element. Sonic bearings having a bearing element containing both an active transducer and an extension member are referred to as indirect-drive sonic bearings and those without an extension member are referred to as direct-drive sonic bearings.

The core of any sonic bearing based device is the bearing element which is used to produce the basic oscillatory sliding motions that deform and shear the contact asperities at the interface causing the apparent reduction of the effective coefficient of friction and friction switching properties. Typically, this element consists of several subcomponents including a transducer used to convert an electrical energy into microscopic mechanical displacements, extension members used to propagate and possibly amplify the amplitude of the acoustic waves from the transducer source to the sliding surface locations, and contact pad members which provide the actual sliding surfaces.

Figure 1A:
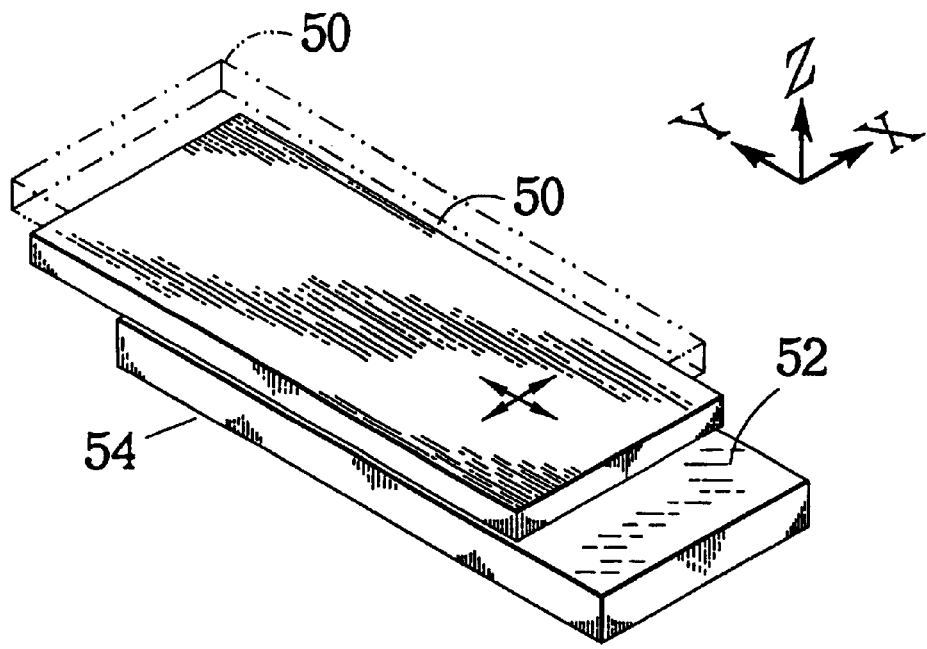
FIG. 1A is an isometric view of a prior art lubricated plain bearing having planar geometry.
Figure 1B:
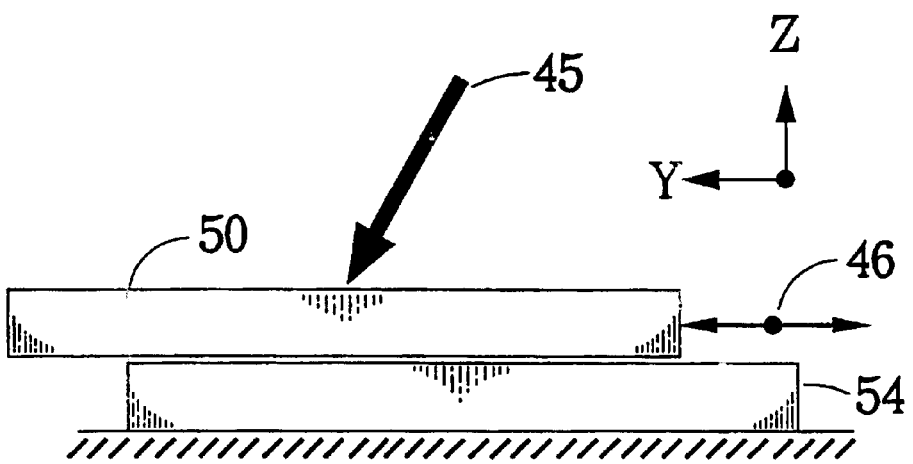
FIG. 1B is a side view of a prior art lubricated plain bearing having planar geometry with forces.
Figure 2A:
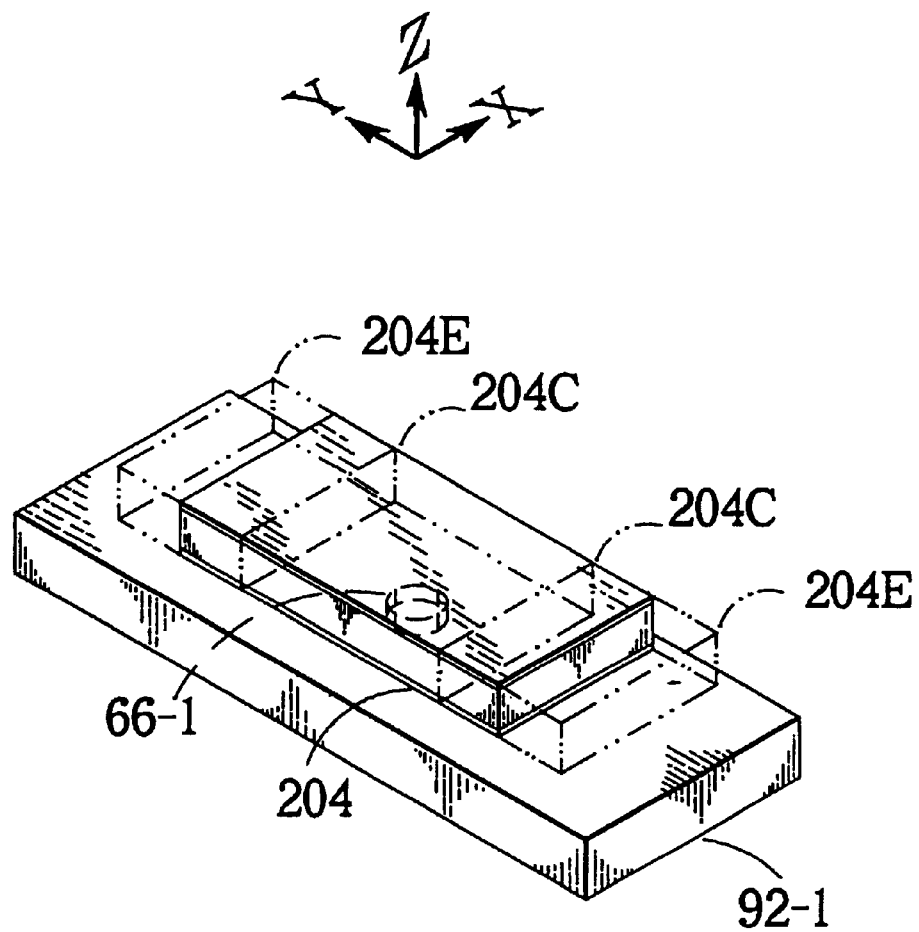
FIG. 2A is an isometric view of a piezoelectric transducer oscillating at its fundamental longitudinal frequency and subjected to the free-free boundary conditions.

FIG. 2A shows a typical transducer 204, which in this case, consists of a bar-shaped piezoelectric transducer with its resonance modes determined partly by the externally imposed boundary conditions. A set of coordinate axes are provided whose origin can be used as a stationary reference. FIG. 2A also shows one of the simplest mounting techniques and through it, the imposed acoustic boundary conditions on the oscillating structure. These boundary conditions can be generally grouped into the fixed-fixed, fixed-free and the free-free categories. FIG. 2A illustrates the free-free configuration where the transducer 204 is held rigidly to the base member 92-1 by a cylindrical support member 66-1 located at the nodal region (see FIG. 2B) of the transducer 204. This support member can be made from any solid material or in some cases, may comprise of an element having piezoelectric or magnetostrictive properties. The support member can also be made from insulation materials, such as —. However, it should be noted that other equivalent materials or materials with equivalent properties may be used as substitutes. The two end surfaces of the transducer, parallel to the XZ-plane, are free to move in a repetitive motion, hence the free-free boundary condition designation. FIG. 2A further illustrates both the symmetrical expanding 204E and the contracting 204C phases of the vibrating element. For clarity of illustration purposes, the magnitude of these microscopic expansions and contractions have been greatly exaggerated. Typically, the maximum amount of length or Y-axial displacement in both the extended and contracted states is less than 0.1 percent of its original non-oscillatory length. Again for clarity, the even smaller displacements associated with the width (X-axial displacements) and thickness (Z-axial displacements) dimensional changes of the transducer due to the Poisson effect are also not shown.

Figure 2B:
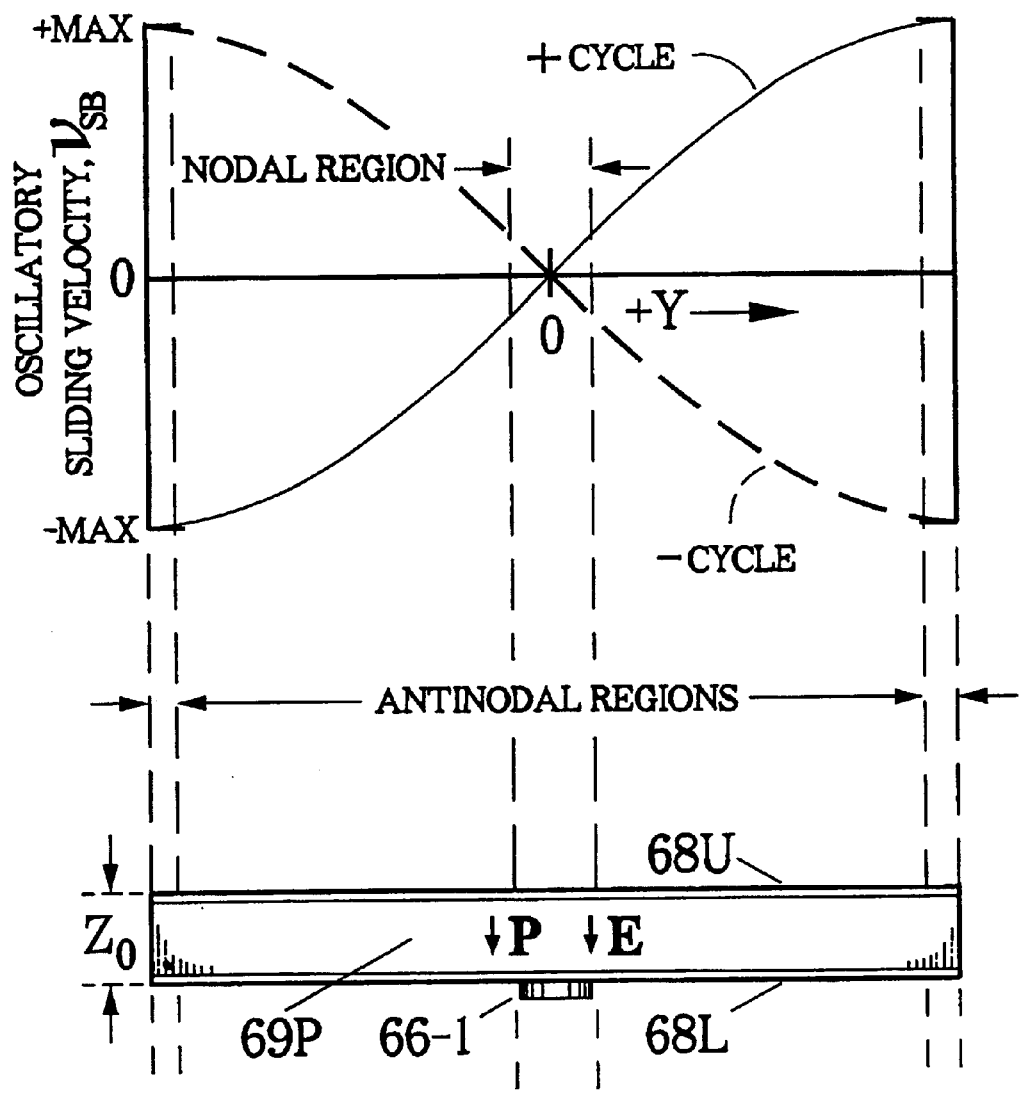
FIG. 2B is a plot of a piezoelectric transducer's surface oscillation velocity in the Y direction as a function along its length which is aligned in the Y direction and subjected to free-free boundary conditions.

FIG. 2B shows the oscillatory sliding velocities $v_{SB}$ associated with the points on the surface of the piezoelectric transducer having oscillatory sliding motions that are parallel to the length or the Y-axis, as a function of the position along the length. The velocities are generated by applying an oscillatory voltage to the transducer. Specifically the electric field, E resulting from the applied voltage to the upper 68U and lower 68L transducer electrodes interact with the sandwiched piezoelectric material's 69P permanent electric dipole moment, P to generate the symmetrical microscopic expansions and contractions of the piezoelectric material. The velocity profile labeled as "+CYCLE" corresponds to the expansion phase 204E of the oscillation cycle of the transducer 204 (see FIG. 2A). Similarly, the "–CYCLE" curve is the velocity profile associated with the contraction phase 204C (see FIG. 2A) of the oscillation. The "nodal region" on the transducer is located in close proximity to where the velocity $v_{SB}^{rms}$ due to resonant oscillation, is at zero value and conversely, the "anti-nodal regions" are locations near where the oscillatory sliding velocities are at their maximum values (i.e., both +MAX and –MAX value.)

Direct-drive Stiff Bearing Assembly

Figure 3A:
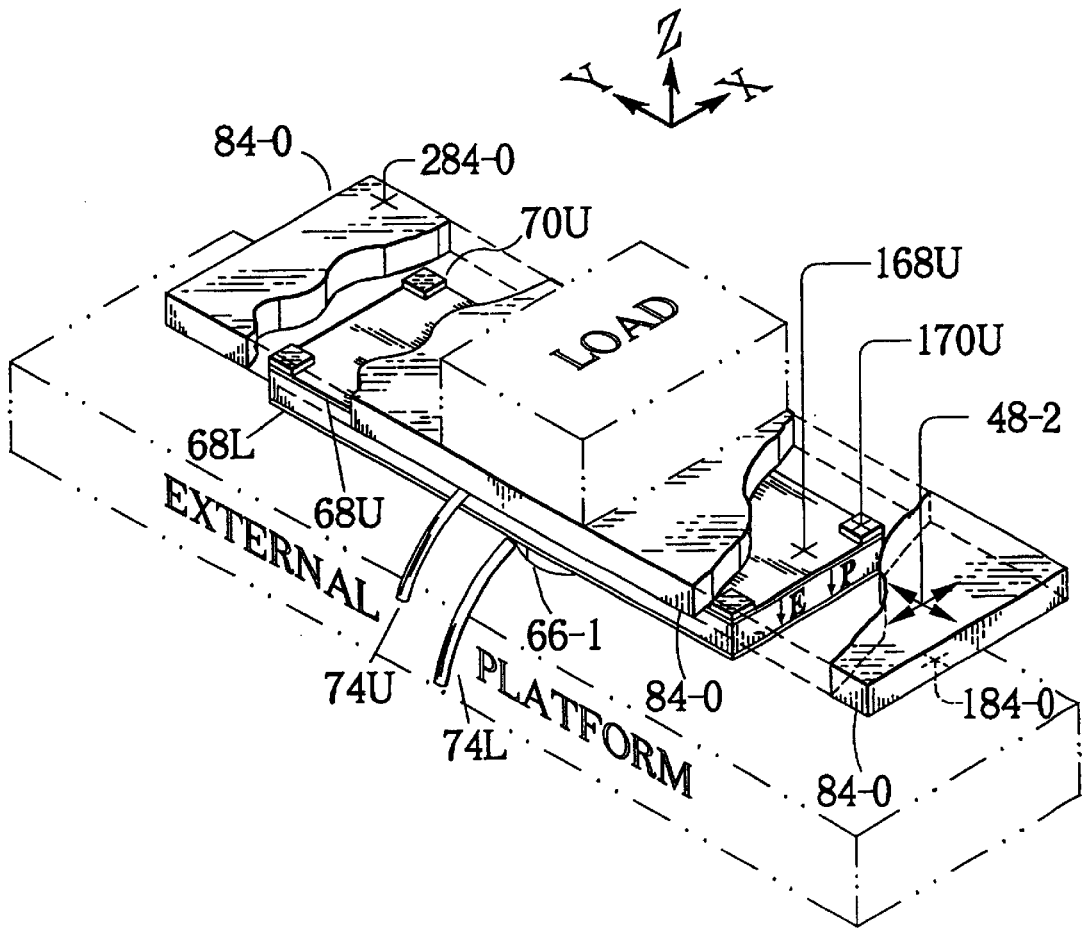
FIG. 3A is an isometric view of a two component direct-drive sonic bearing design comprising of a piezoelectric bearing element secured to a stationary external platform and supporting a load on a load member.

FIG. 3A shows one of the simplest possible sonic bearing designs which incorporates the previously mentioned transducer. This sonic bearing assembly has only two major components; a bottom, non translating section consisting of an active bearing element producing only oscillatory sliding motions and a moveable, passive, load member used to support an external load.

In order to optimize the sonic bearing effect which reduces the effective coefficient of friction between the bearing element and the load member, it is necessary to select the locations on the bearing sliding surface that are in direct contact with the load sliding surface 184-0 of the load member 84-0. In this example, this optimization process is accomplished by attaching additional low mass, very thin plate-shaped upper contact pad members 70U to designated sections of the bearing element where the sliding velocities are at or near their maximum values. Using the theoretical information from FIG. 2B, these maximum velocity locations or regions on the bar-shaped bearing element are the anti-nodal regions. The resulting modified geometry of the bearing element will now contact the planar load sliding surface 184-0 of the load member 84-0 only at the element's anti-nodal regions.

The bearing element in FIG. 3A consists of a bar-shaped piezoelectric transducer with four upper plate-shaped contact pad members 70U affixed, using an adhesive means, to the anti-nodal regions of the upper electrode surface 168U. The upper 68U and lower 68L transducer electrodes are electrically connected to an excitation driver (not shown) through two conventionally attached upper 74U and lower 74L excitation wires and produce an electric field, E. The interaction of the electric field, E with the electric dipole moment, P of the piezoelectric material generates microscopic oscillatory sliding motion having a specific root-mean-square velocity. The bearing element can resonate in its length dimension (parallel to the Y-axis) at its lowest longitudinal acoustic resonant frequency and can be supported at the nodal region of the lower transducer electrode 68L by a support member which in turn, can be rigidly secured to an external platform. However, an electronic signal of a predetermined frequency and magnitude maybe applied to the bearing element to cause the bearing element to oscillate at a different root-mean-square velocity.

The sonic bearing assembly also consists of a load member 84-0 having a planar load sliding surface 184-0 which is in direct slidable contact, defined as an interface, with the four symmetrically placed contact pad surfaces 170U. The bearing sliding surface, in this embodiment, comprises of the four contact pad surfaces 170U and the exposed upper electrode surface 168U. Although the bearing sliding surface comprise the surfaces of the four contact pad members 70U, it must be appreciated that the contact pad members 70U are not necessary to practice the invention. The load member 84-0, which supports an external load on the load accepting surface 284-0, can slide in any path direction 48-2 within the plane defined by the four contact pad surfaces 170U with an apparently reduced coefficient of friction or effective coefficient of friction. However, it must be noted that although the load accepting surface 284-0 is opposite to the load sliding surface 184-0 in this embodiment, the load accepting surface 284-0 does not necessarily have to be configured as such.

An equally viable and useful alternate sonic bearing design is the inverse of the sonic bearing described in FIG. 3A. For this inverse embodiment (not depicted), the sonic bearing configuration also has two major components, consisting of an upper movable component which contains the active bearing element that can slide on a lower passive, stationary, load member. However, unlike the design shown in FIG. 3A, where an external load can be placed on any part of the load accepting surface 284-0, the bearing element of this inverse configuration (not shown) supports an external load placed only at the bearing element's nodal region. In practical applications where only friction reduction, friction switching, and precision guidance are required, the design illustrated in FIG. 3A, its inverse and their equivalents are sufficient. However, because the stiffness characteristic of a bearing is of paramount importance in many other bearing applications, the rudimentary designs illustrated by these examples must be modified to increase stiffness in the bearing element to suit those other applications.

This lack of stiffness in these rudimentary sonic bearing designs can be directly traced to the method in which the bearing element and the external load are supported. For example, in the case where the external load is supported by the bearing element only at the nodal region and the bearing element itself is supported by the stationary load member at the anti-nodal regions, the cantilever-like structure formed by the distance between the nodal region and any anti-nodal support region is the root cause of the stiffness problem.

Indirect-drive Stiff Bearing Assembly

One solution to this stiffness problem is the indirect-drive configuration. Indirect-drives are composite bearing element structures where at least one active transducer and one or more extension members resonate at the same frequency and are mechanically coupled together near their individual respective minimum acoustic impedance locations. The physics of the selected acoustic mode and the coupling mechanism of these indirect-drive elements rely on the principle of sympathetic resonance which dictates the transfer of acoustic energy between an active transducer and each passive resonating extension member attached thereto.

Figure 3B:
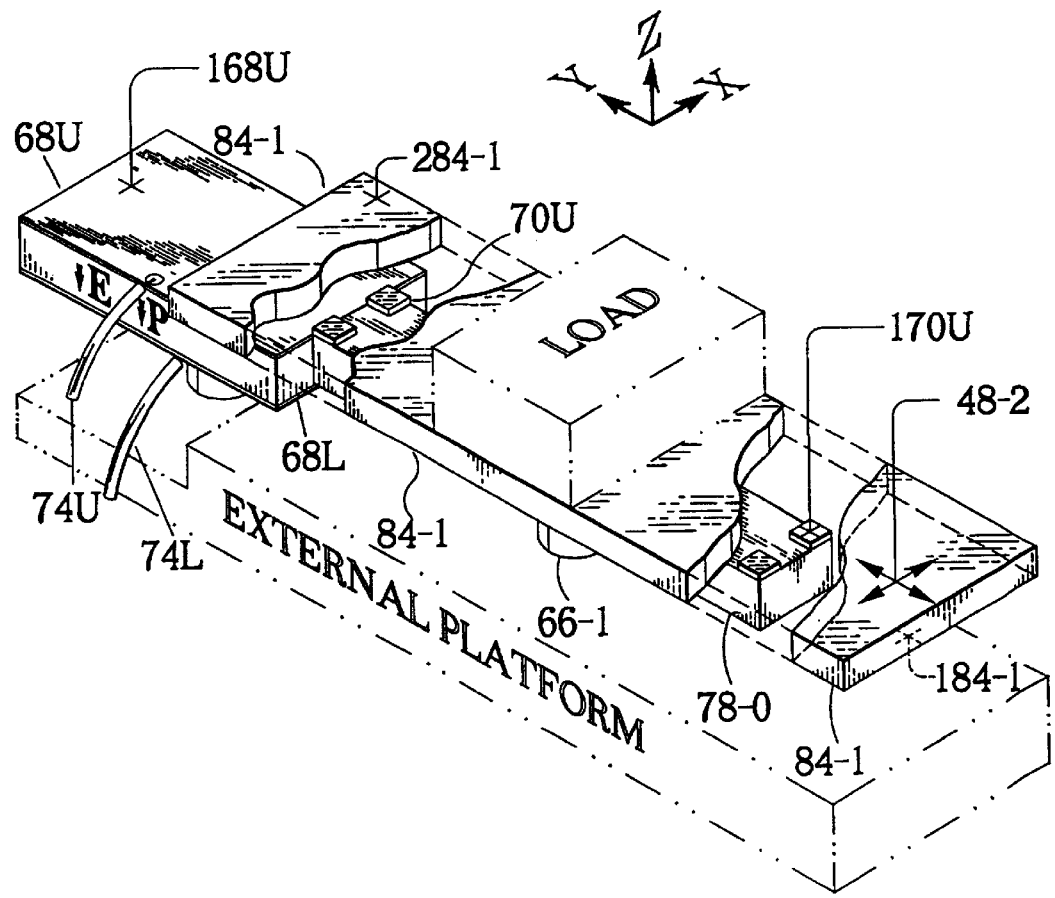
FIG. 3B is an isometric view of a two component indirect-drive sonic bearing design comprising of a composite bearing element having a piezoelectric transducer and an extension member secured to a stationary external platform and supporting a load on a load member.

One simple mechanical design of an indirect-drive sonic bearing is shown in FIG. 3B which is similar to the optical photoelastic modulator device described in U.S. Pat. No 3,867,014 issued to Kemp (1975). As shown, the transducer element, with upper and lower electrodes 68U and 68L having two conventionally connected excitation wires 74U and 74L respectively, is attached to an extension member 78-0 and both resonate at the same lowest longitudinal frequency. The load is supported by the load member 84-1 on the load accepting surface 284-1 and the load sliding surface 184-1 of the load member is in slidable contact with the upper contact pad surfaces 170U of the contact pad members 70U on the extension member 78-0 allowing load sliding motion along the path direction 48-2.

The advantage of this configuration is to be able to freely select a material for an extension member without consideration of its piezoelectric properties and use it as a stronger support for the entire bearing element and an external load. For example, because the stiffness of a cantilever is directly proportional to its Young's modulus, if a tungsten carbide material is used as the extension member, the stiffness of the cantilever-like structure of the bearing element can be increased by nearly ten times over the most common transducer material, lead zirconate titanate.

Indirect-drive bearings can be even further stiffened by attaching the nodal regions of each transducer and each extension member to the same external platform. By doing this, the cantilever-like structure is transformed into an arch-like structure which increases the bearing element stiffness by an additional factor of approximately sixteen.

Ultrastiff Bearing Assembly

A better and more straightforward solution to this stiffness problem is to modify the bearing element so that there are contact pad members on both the upper and lower surfaces. In this new ultrastiff bearing element configuration, the load can now be supported directly by the material in the cross section containing the contact pad members instead of through the cantilever between the nodal and anti-nodal regions. The stiffness of the sonic bearing assembly, with this modification, is then changed from the relatively low stiffness of a cantilever system to the very high compressive stiffness of the bearing element's materials.

To illustrate the improvement that this solution offers, we can calculate the theoretical intrinsic compressive stiffness of this bearing element configuration from the material stiffness equation derived from the basic equation for the modulus of elasticity $$[P_{APP}]_Z = (Y_{BE})(\Delta Z_{BE})/(Z_0),$$

where $[P_{APP}]_Z$ is the Z-axis component of the applied pressure on the material of the load bearing portion of the bearing element, $Y_{BE}$ is the modulus of elasticity or Young's modulus of that material, $Z_0$ is the thickness of that material, and $\Delta Z_{BE}$ is the change in the thickness of that material which is produced by the pressure $[P_{APP}]_Z$. Substituting the expression of the Z-axis component value of the force $[F_{APP}]_Z$ divided by the material surface area $A_{BE}$ for $[P_{APP}]_Z$ and rearranging the equation, we arrive at an expression equivalent to the well known spring-force equation $$[F_{APP}]_Z = (k_{BE})(\Delta Z_{BE}),$$

where $k_{BE}$ is the equivalent spring stiffness or rather, for this discussion, bearing element stiffness given by the following equation $$k_{BE} = (A_{BE})(Y_{BE})/(Z_0).$$

For a sonic bearing element operating at its lowest longitudinal acoustic resonant frequency mode with, for example, an operating frequency of motion of around 35 kHz, the area $A_{BE}$, which is the total area of the contact pad surfaces, is about $1 \times 10^{-4}$ m$^2$. The bearing element thickness $Z_0$ is typically around $3 \times 10^{-3}$ m and if an alloyed material of tungsten carbide and cobalt is used as the load bearing portion of the bearing element, Young's modulus $Y_{BE}$ can be as high as $6 \times 10^{11}$ N/m$^2$. Substituting these values into the bearing element stiffness equation above yields a theoretical intrinsic stiffness of about $2 \times 10^{10}$ N/m (114 lbs/µin).

This intrinsic, non-servoed compressive stiffness of the sonic bearing is already substantially larger than the stiffness of, for example, a servoed system such as a typical air bearing, which has a typical stiffness value of several million pound-force per inch or approximately $1 \times 10^9$ N/m. Furthermore, as it will be shown later, the stiffness of a sonic bearing assembly employing a "force servo mechanism" can easily be one thousand times larger than its own intrinsic value and by comparing these two servoed systems, it will become evident that a sonic bearing is substantially stiffer than an air bearing whereby use of the term "ultrastiff" for describing sonic bearings is clearly justifiable.

A typical embodiment of an ultrastiff sonic bearing assembly is a three-layered sandwich, plain bearing-like structure comprising a moveable load member with a load accepting surface and load sliding surfaces, a resonance-enhanced, longitudinal acoustic wave driven bearing element with upper and lower contact pad surfaces, and a stationary base member with a base sliding region. The load sliding surface is in continuous slidable contact, along an upper interface, with the upper contact pad surfaces of the bearing element and similarly, the lower contact pad surfaces of the bearing element are in continuous sliding contact, along a lower interface, with the base contact pad surfaces within the base sliding region. In this embodiment, the individual geometries of the load, base structures and the bearing element can all be bar-shaped parallelepiped with their sliding surfaces microscopically textured and polished optically flat. Also, as previously mentioned, the bearing stiffness and durability can be enhanced by choosing the materials for the load bearing portion of the bearing element from very hard and stiff substances such as diamond, tungsten carbide, alumina or stainless steel.

Furthermore, a multitude of these bearings can be used to construct a composite bearing structure, such as a linear stage where the individual bar-shaped structures for each bearing may be integrated into the stage's internal structures and may therefore lose their original parallelepiped geometry.

Direct-drive

Figure 4A:
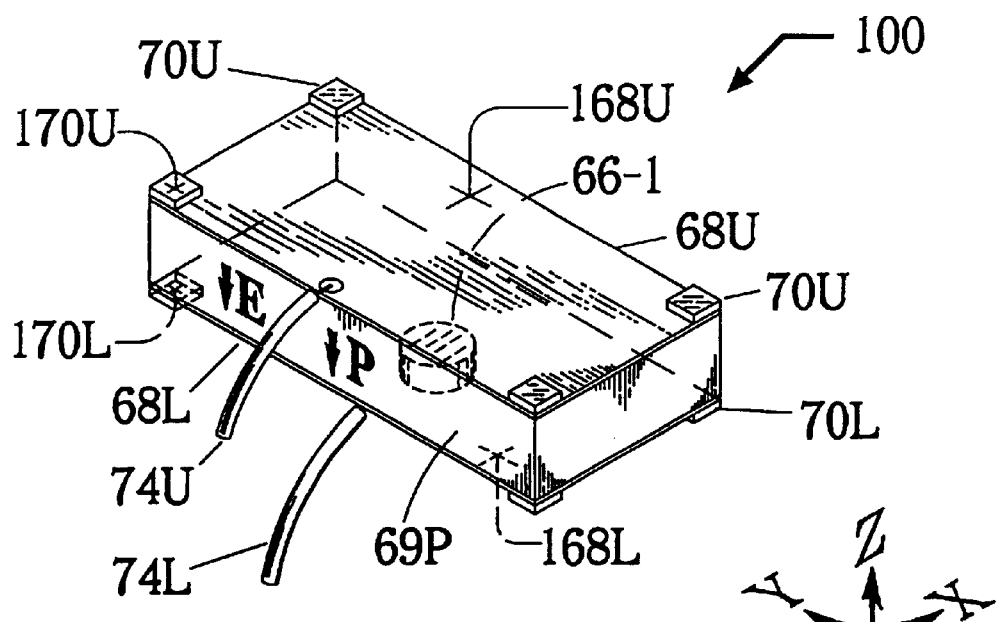
FIG. 4A is an isometric view of an ultrastiff direct-drive sonic bearing element comprising of a single, fundamental, longitudinal length resonant mode piezoelectric transducer equipped with contact pad members.

Ultrastiff direct-drive bearing assemblies contain some of the simplest possible ultrastiff bearing element configurations and an example of one such configuration is shown in FIG. 4A. This sonic bearing element consists of a bar-shaped parallelepiped piezoelectric transducer with eight attached plate-shaped parallelepiped contact pad members. Each contact pad member has a contact pad surface and an oppositely facing pad attachment surface, and both of these surfaces are parallel to the XY-plane. Both the transducer and the contact pad members have their longest dimension being defined as their length and are parallel to the Y-axis. The next largest dimension is their width which is parallel to the X-axis and the smallest dimensions is their thickness which is parallel to the Z-axis. In the case shown in FIG. 4A, the transducer is the bare piezoelectric transducer and the bearing element body is the mechanical body of the piezoelectric transducer itself. The bearing sliding surface of the bearing element 100 consists of the exposed portion of the upper electrode surface 168U and the contact pad surfaces 170U of the four upper contact pads 70U. The bearing support region of the bearing element 100 consists of the exposed portion of the lower electrode surface 168L and the contact pad surfaces 170L of the four lower contact pads 70L.

The electric dipole moment direction, P of the piezoelectric material 69P is perpendicular to the upper 168U and lower 168L electrode surfaces. The upper 68U and lower 68L transducer electrodes are electrically connected to an excitation means (not shown) through two conventionally attached upper 74U and lower 74L excitation wires.

The four pad attachment surfaces of the upper contact pad members 70U are glued to the transducer electrode surface 168U such that their contact pad surfaces opposite the pad attachment surfaces are the interface of the bearing sliding surface. Similarly, the contact pad surfaces of the four lower contact pad members 70L collectively form the interface of the bearing support region.

The bearing element 100 with a symmetrically positioned cylindrical support member 66-1 is operated at its lowest longitudinal acoustic resonant frequency mode (i.e., fundamental frequency or $\lambda/2$ mode) where the length-to-width ratio is selected to simultaneously obtain high electromechanical coupling coefficient $\kappa_{31}$ and a well-isolated longitudinal acoustic resonant frequency. The lowest resonant frequency is determined mainly by the longest dimension of the bearing element, which in this case, is its length. The axis parallel to the bearing element dimension, which mainly determines the selected resonance frequency, is also known as the resonant axis. For the length mode longitudinal resonance bearing element shown in FIG. 4A, the resonant axis is the Y-axis.

All the contact pad members are placed where in the root-mean-square velocity of the bearing element parallel to the Y-axis is within a predetermined range or percentage of the maximum of the root-mean-square velocity. In other words, the contact pad members are placed at locations where the oscillatory sliding motions of the transducer are at or near their maximum amplitudes and simultaneously the mechanical oscillations perpendicular to the Y-axis, due to the Poisson effect, are near their minimum values. The use of very low mass pads, along with symmetrical placements of these pads on the bearing element, ensures that the resulting direct-drive bearing element's oscillation mode is essentially identical to the original unmodified transducer mode. A general description of the resonant modes of piezoelectric transducer is given by R. Holland et al., "Design of Resonant Piezoelectric Devices", Research Monograph No 56, M.I.T. Press, Cambridge, Mass., 1969.

Figure 4B:
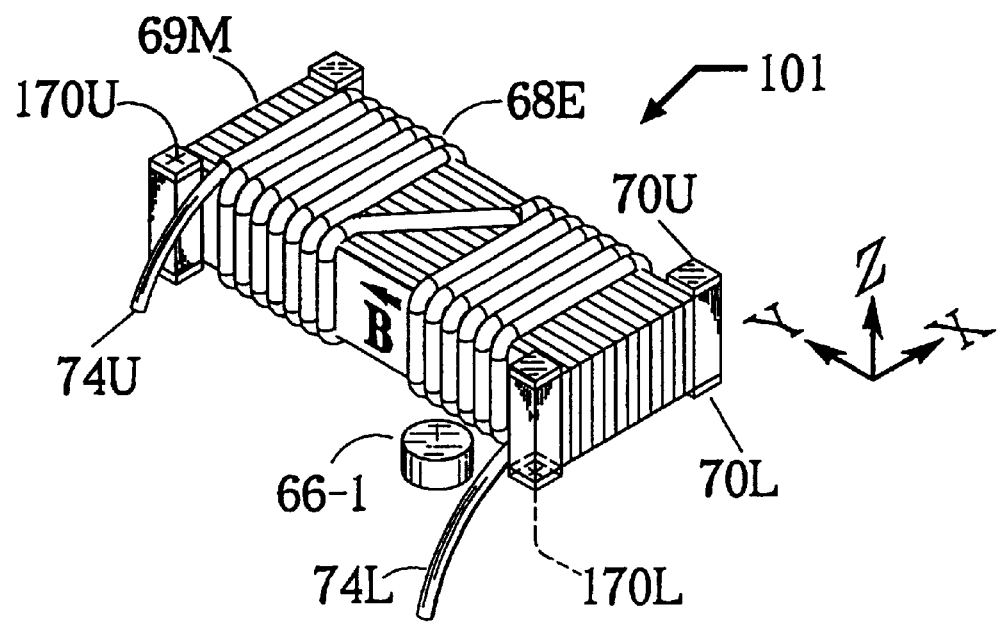
FIG. 4B is an isometric view of an ultrastiff direct-drive sonic bearing element comprising of a single, fundamental, longitudinal length resonant mode, laminated magnetostrictive transducer equipped with contact pad members.

Another type of electromechanical transducer that can be used in the direct-drive bearing element configuration may be of the type comprising a laminated core of magnetostrictive material, such as Terfenol available from Etrema Products Inc., Ames, Iowa, for example, as shown in FIG. 4B. In this example, an excitation coil 68E is wound around the magnetostrictive material 69M and is electrically connected to an alternating current source and a direct current source (both not shown) by the excitation wires 74U and 74L such that he resulting magnetic field B established by the excitation coil causes the magnetostrictive material to elongate and contract in accordance therewith. Like the design of FIG. 4A, the bearing element 101 of FIG. 4B has four upper contact pad surfaces 170U of the upper contact pad members 70U glued to the upper transducer surface to form the interface of the bearing sliding surface. Similarly, the lower contact pad surfaces 170L of the four lower contact pad members 70L collectively form the interface of the bearing support region. Also, the bearing element 101 has a symmetrically positioned cylindrical support member 66-1 and is operated at its lowest longitudinal acoustic resonant frequency mode (i.e., fundamental frequency or $\lambda/2$ mode) along the length dimension of the bearing element.

Figure 4C:
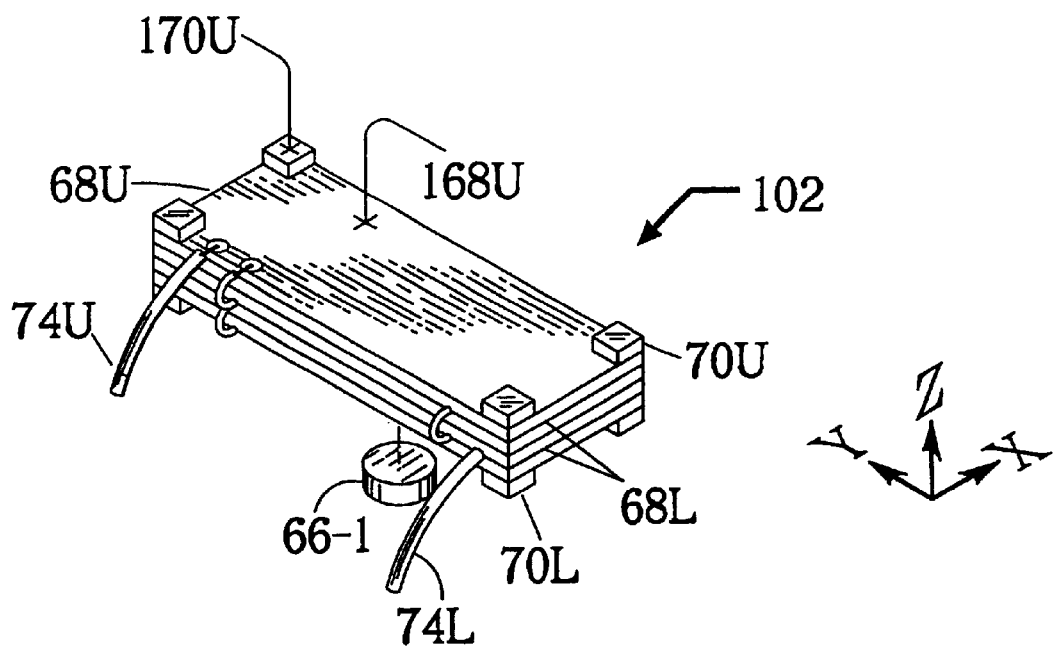
FIG. 4C is an isometric view of an ultrastiff direct-drive sonic bearing element comprising of a vertically stacked piezoelectric transducer equipped with contact pad members.
Figure 4D:
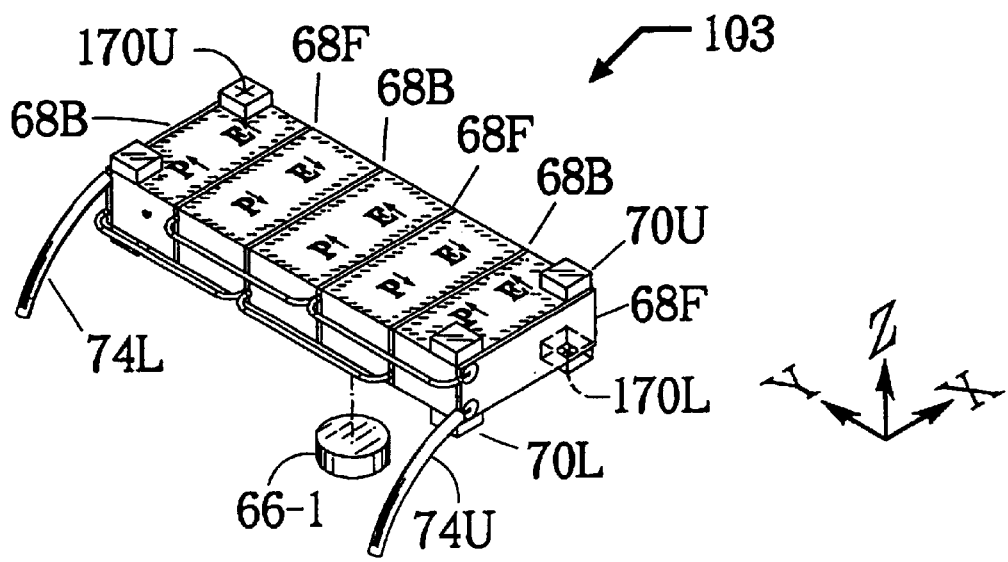
FIG. 4D is an isometric view of an ultrastiff direct-drive sonic bearing element comprising several piezoelectric transducers horizontally stacked in succession where the bearing element is equipped with contact pad members.

A bearing element with vertically (i.e., along the Z axis) or horizontally (i.e., along the X or the Y axis) stacked transducers in succession can also be used to construct a direct-drive ultrastiff bearing element and examples are shown in FIGS. 4C and 4D. FIG. 4C illustrates an ultrastiff direct drive sonic bearing element 102 with several piezoelectric transducers vertically stacked in succession. The bearing element is also shown to have an upper surface 168U with four contact pad members 70U attached to the corners of the XY-plane bearing faces resulting in the establishment of the four upper contact pad surfaces 170U. The bearing element 102 has an upper excitation wire 74U connected to the upper transducer electrode 68U and a lower excitation wire 74L connected to the lower transducer electrodes 68L.

In FIG. 4D, the horizontally (i.e., along the Y axis) stacked device consists of several piezoelectric transducers in succession with alternating dipole moment directions, P sandwiched by front 68F and back 68B transducer electrodes. All the front electrodes 68F are connected to a front excitation wire 74U and similarly, all the back electrodes 68B are conventionally attached to the back excitation wire 74L. The collective edge surfaces of the transducer materials and electrodes that are parallel to the XY-plane are upper and lower bearing faces. The four upper 70U and four lower 70L contact pad members are attached to the corners of the XY-plane bearing faces. The four upper contact pad surfaces 170U along with the exposed section of the upper bearing face is the bearing sliding surface and similarly, the exposed portion of the lower bearing face in conjunction with the lower contact pad surfaces 170L forms the bearing support region.

Like the design in FIG. 4A, the centrally positioned cylindrical support member 66-1 (shown in FIGS. 4C and 4D) is used to rigidly attach the longitudinal fundamental mode, stacked, direct-drive, ultrastiff bearing element to other components. The main purpose of this segmentation of the piezoelectric material is to reduce the magnitude of the applied A.C. oscillatory and/or D.C. excitation voltages necessary to obtain a predetermined level of transducer activity. This technique of stacked piezoelectric design as described in U.S. Pat. No. 1,860,529 of Cady (1932) and is old in the art.

The various standard definitions of the piezoelectric transducer related terms such as $\kappa_{31}$ and poling direction can be found in "Guide to Modem Piezoelectric Ceramics", published by Morgan Matroc, Inc., Bedford, Ohio or "Piezoelectric Ceramics", printed by Channel Industries, Inc., Santa Barbara, Calif., "Piezoelectric Ceramics", published by EDO Corp., Salt Lake City, Utah or "Multilayer Piezoelectric Actuators: User's Manual", Vol. 2, printed by Tokin America Inc., San Jose Calif.

Indirect-drive

Figure 5A:
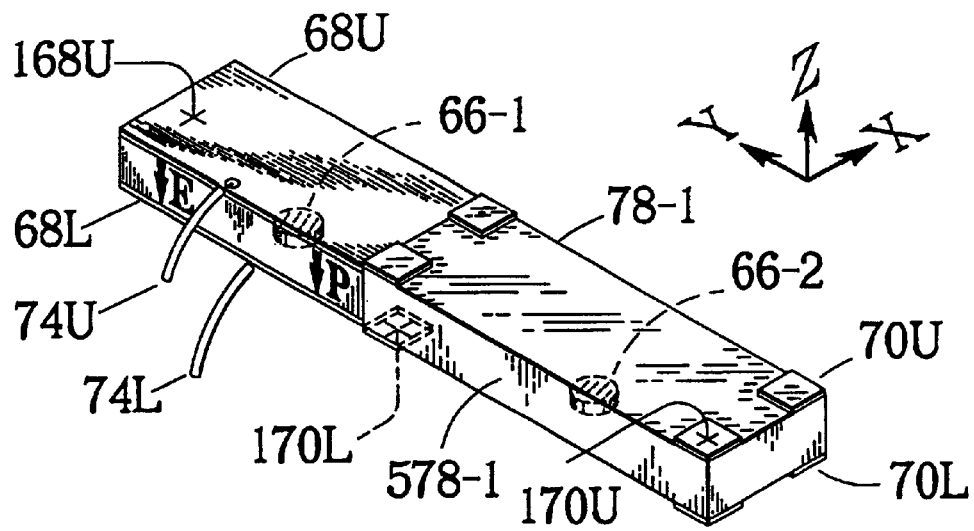
FIG. 5A is an isometric view of an ultrastiff indirect-drive sonic bearing element comprising of a single, fundamental, length resonant mode, piezoelectric transducer driving a single, fundamental, longitudinal length resonant mode, extension member.
Figure 5B:
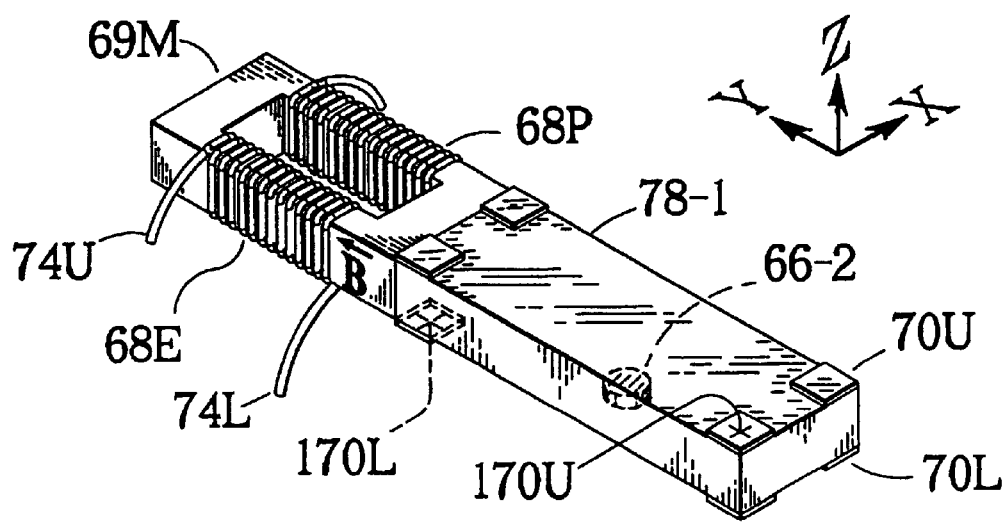
FIG. 5B is an isometric view of an ultrastiff indirect-drive sonic bearing element consisting of a single, fundamental, length resonant mode, magnetostrictive transducer driving a single, fundamental, longitudinal length resonant mode, extension member.
Figure 5C:
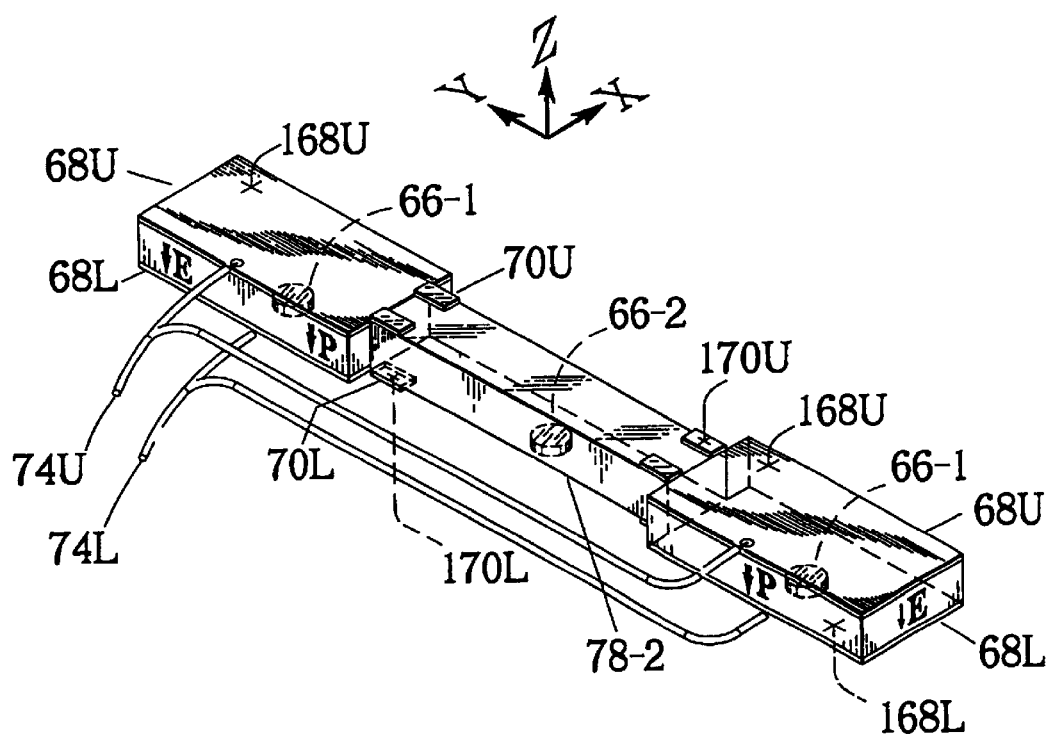
FIG. 5C is an isometric view of an ultrastiff indirect-drive sonic bearing element using two, fundamental, longitudinal length resonant mode, piezoelectric transducers driving a single, fundamental longitudinal length resonant mode, extension member.
Figure 5D:
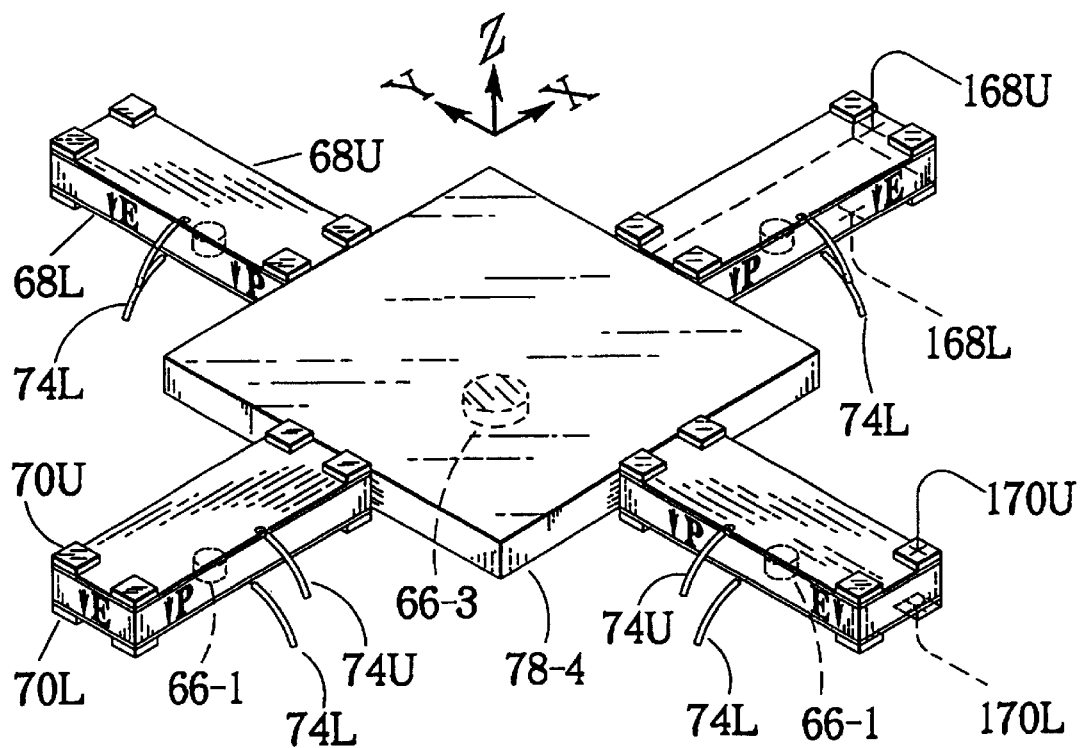
FIG. 5D is an isometric view of an ultrastiff indirect-drive sonic bearing element using four piezoelectric transducers driving a square extension member.
Figure 5E:
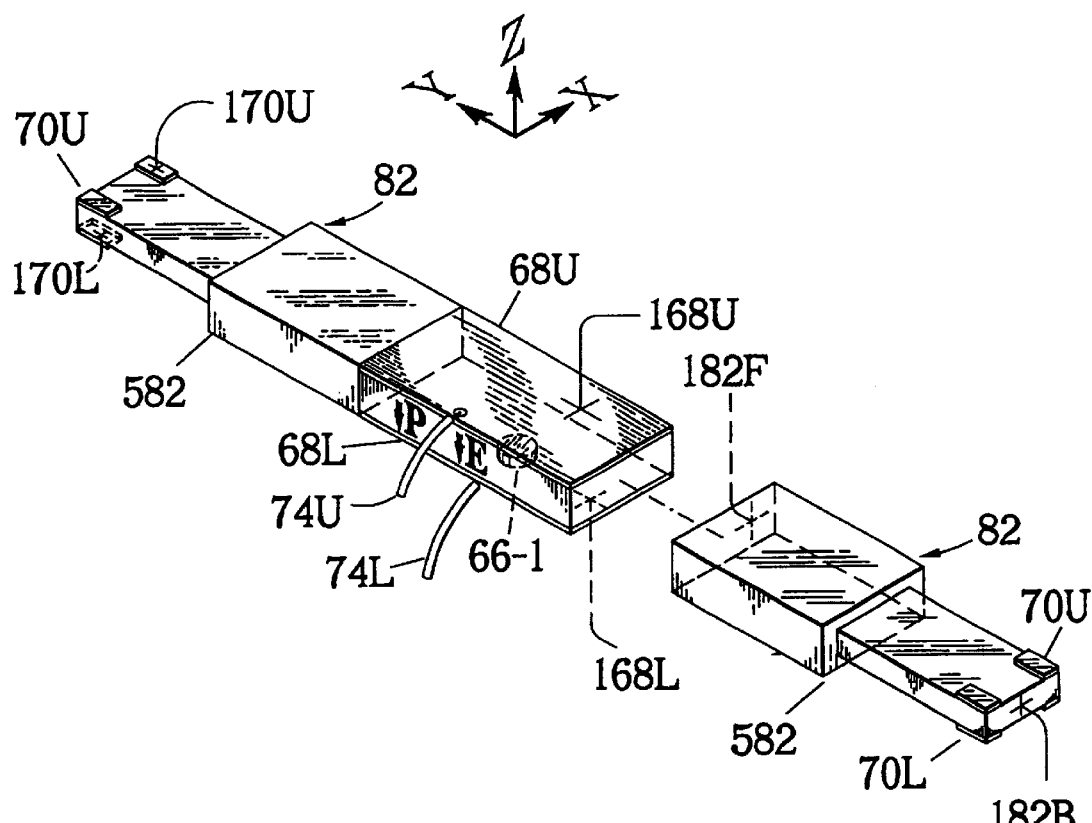
FIG. 5E is an isometric view of an ultrastiff indirect-drive sonic bearing element using a single piezoelectric transducer driving two identical stepped horn extension members.

Ultrastiff indirect-drive bearing assemblies contain bearing elements that are composite structures which also use the principle of sympathetic resonance to couple the acoustic energy between an active transducer and a resonating extension member. Examples of these types of elements are those illustrated in FIGS. 5A through 5E. The mechanical design of the ultrastiff indirect-drive bearing element in FIG. 5A is comparable to that of FIG. 3B with additional lower antinodal contact pad surfaces in the bearing support region. The design of FIG. 5B is similar to that of FIG. 5A but illustrates the use of a magnetostrictive transducer instead of a piezoelectric transducer. A dual transducer, ultrastiff indirect-drive sonic bearing element is illustrated in FIG. 5C, which shares many similarities with the mechanical structure of an Acoustic Transformer Powered Super-High Isolation Amplifier device described in National Semiconductor Application Note 285. The quad transducer, ultrastiff indirect-drive sonic bearing element illustrated in FIG. 5D can be seen as a simple extension of FIG. 5C. And, lastly, the indirect-drive stepped horn design shown in FIG. 5E is analogous to the wire bonder configuration as revealed in U.S. Pat. No. 5,244,140 of Ramsey et al., (1993). However, for the embodiment of FIG. 5E, two horns are driven simultaneously by a single transducer element.

The three main advantages of ultrastiff indirect-drive bearing element designs are (1) the separation of the electromechanical transducer processes from the purely mechanical bearing requirements, (2) the extension of the bearing element's length without lowering the bearing element's ultrasonic operating frequency into the audio range, and (3) the mechanical amplification of the transducer displacements which produce the oscillatory sliding motion of the bearing sliding surfaces.

The dimensions of an extension member body are variable and thus may be altered, such as along one or more dimensions to maximize energy coupling efficiency to the transducer, or in some cases, along its cross section, to dynamically configure the extension member to changes in force applied to the bearing assembly. Furthermore, it is desirable to minimize any motion-producing and motion-inhibiting phenomena between the load member and the extension member body. This is done by determining a common resonant frequency, an individual resonant phase, and an individual resonant amplitude for the motion of the contact points on the extension member. Then, the frequency of the motion is set to produce a resonance along the propagation direction in the extension member; whereby the propagation direction of the resonant wave is aligned substantially parallel to the extension sliding surface. Following, the phase and amplitude of the contact points in the extension member are set to the resonant phase and amplitude.

FIG. 5A shows one of the simplest ultrastiff indirect-drive bearing element configurations. A transducer consisting of a bar-shaped piezoelectric transducer with upper 68U and lower 68L transducer electrodes, upper 168U and lower 168L (not shown) electrode surfaces connected to corresponding upper 74U and lower 74L excitation wires. The piezoelectric transducer's electric dipole moment direction, P is parallel to the Z-axis. The transducer is joined end-to-end, in the ZX-plane, to a single bar-shaped $\lambda/2$ extension member 78-1 along the extension attachment face using a glue as the adhesive means. The extension member 78-1 has an extension member body 578-1, and two extension member faces of the extension member 78-1 which are parallel to the XY-plane. The extension member 78-1 is equipped with plate-shaped upper 70U and lower 70L contact pad members having corresponding upper 170U and lower 170L contact pad surfaces. As in the case of the direct drive sonic bearing configuration, the four upper contact pad surfaces 170U along with the exposed section of the upper extension member face collectively becomes the bearing sliding surface. Likewise, the lower contact pad surfaces 170L plus the uncovered portion of the lower extension member face make up the bearing support region. Both the transducer and the extension member are resonating in the $\lambda/2$ longitudinal acoustic mode with the cylindrical support members 66-1, 66-2 connected to their respective nodal regions. The transducer, the extension member and the associated contact pad members collectively form the ultrastiff indirect-drive bearing element.

As stated earlier, another type of electromechanical transducer that can be used may be of the type comprising a core of magnetostrictive material. An indirect-drive bearing element configuration using this type of transducer is shown in FIG. 5B which operates in a fashion similar to that of FIG. 4B. In FIG. 5B, however, an excitation coil 68E and a polarization coil 68P are wound through a rectangular slot in a core made of magnetostrictive material 69M. The excitation coil is electrically connected to an alternating current source (not shown) by the excitation wires 74U and 74L and the polarization coil is electrically connected to a direct current source (not shown). The resulting magnetic field, B established by the excitation coil and the polarization coil causes the core to elongate and contract in accordance therewith so as to produce a resonance. Also, in this design like that of FIG. 5A, there is an axially attached extension member 78-1 which also resonates at the same frequency.

FIG. 5C illustrates a variation of the indirect-drive bearing element design where two identical bar-shaped piezoelectric transducers are used to drive a single bar-shaped $\lambda/2$ extension member 78-2 equipped with upper 70U and lower 70L contact pad members on the upper and lower extension member faces respectively. All three elements are oscillating at the same frequency and in the same $\lambda/2$ longitudinal acoustic length resonant mode. The cylindrical support members 66-1, 66-2 are used to attach this dual indirect-drive bearing element to other components without damping the oscillatory sliding motion. The two upper 168U electrode surfaces, the upper $\lambda/2$ extension member's face parallel to the XY-plane and the four upper contact pad surfaces 170U collectively, form the bearing sliding surface. The bearing support region consists of the lower four contact pad surfaces 170L together with the exposed section of the lower extension member face. The main advantage of this configuration is that the sonic bearing can support a much heavier load.

An extension of the bearing element of FIG. 5C is an indirect-drive bearing element using a quad transducer drive. FIG. 5D shows such an indirect-drive design, consisting of four, length-resonant, $\lambda/2$ mode piezoelectric transducers, each having four upper 70U and four lower 70L contact pad members attached to the upper 168U and lower 168L electrode surfaces respectively, driving a frequency matched square extension member 78-4. In this configuration, the cross-shaped bearing element structure can be rigidly attached via the five cylindrical support members 66-1, 66-3 to a base member and can support a substantial load.

The resonant frequencies of any transducers and any coupled extension members should be matched to within 0.1 percent. When the transducer and the extension member frequencies are properly matched, the adhesive means used to join the two end surfaces together can be a very low tensile strength glue, such as a RTV silicone elastomer. The main advantage of the precision frequency matching and the use of very low tensile strength adhesive to join the active and passive elements is to prevent excitation of parasitic transverse oscillatory modes in the coupled system.

The acoustic coupling efficiency can also be optimized by matching the acoustic impedances of the transducer and the extension member as similarly described in the acoustic microscope method used by "C. F. Quate et al., "Acoustic Microscopy with Mechanical Scanning-A Review", Proc. IEEE, Vol 67, 1979, pp. 1092–1114. For example, if the coupling surface areas for both the transducer and the tungsten carbide extension member are identical as in FIG. 5A, the calculated longitudinal acoustic energy coupling efficiency between the transducer and the tungsten carbide extension member is approximately 70 percent. However, if the tungsten carbide extension member's surface area is reduced as shown in FIG. 5C, the acoustic coupling efficiency can now approach 100 percent.

The proper operation of the extension member in the longitudinal acoustic resonant mode or any other resonant mode can be directly viewed and verified by using a Fizeau interferometer with a 150 mm beam diameter available from Phase Shift Technology, Tucson Ariz. The interferometer is used to directly view the submicron-size thickness modulations in the transducer and the extension member's nodal locations due to the Poisson effect.

The bearing element design shown in FIG. 5E is a single bar-shaped piezoelectric transducer with upper 68U and lower 68L transducer electrodes and corresponding upper 74U and lower 74L excitation wires driving two extension members which are stepped horns 82 each located at one of the transducer's end faces. The electric dipole moment direction, P of the transducer material is perpendicular to the upper 168U and lower 168L electrode surfaces (i.e., parallel to the Z-axis). Both the transducer and the horns are tuned to the same longitudinal acoustic resonant frequency. In particular, in this case, all three elements are operated in their longitudinal fundamental length resonant modes (i.e., $\lambda/2$) with each horn's step located at their respective horn's mid-length or $\lambda/4$ position. The upper and lower faces on the horn are parallel to the XY-plane. Four upper 70U and four lower 70L, low mass, plate-shaped, contact pad members are placed near the output or back end of the two horns' faces to provide the four upper 170U and four lower 170L contact pad surfaces. The complete bearing assembly has a mechanical attachment via the cylindrical support member 66-1 position and is affixed to the transducer's nodal region.

The purpose of using a horn rather than a much simpler bar-shaped extension member is the ability of a passive horn body, 582 to mechanically amplify the microscopic ultrasonic oscillatory displacements produced by the transducer. Generally, all acoustic horns and in this case, stepped horns have a front end or input face with a larger input face area 182F, and a back end or output face having a smaller output face area 182B. Any XZ planar longitudinal ultrasonic waves with displacements along to the Y-axis at the input face can be amplified by the horn at the output face. Since the oscillation frequencies of both ends of the horn are identical, the r.m.s. velocity of the ultrasonic wave displacements at the output end is also correspondingly amplified. The amplification gain factor and the resonant frequency for a horn of a given length depend upon the detailed geometry of the taper (e.g., stepped, linear, conical, exponential or cantenoidal), the ratio of input/output cross sectional areas and other miscellaneous parameters, such as the velocity of sound in the horn material.

Figure 6A:
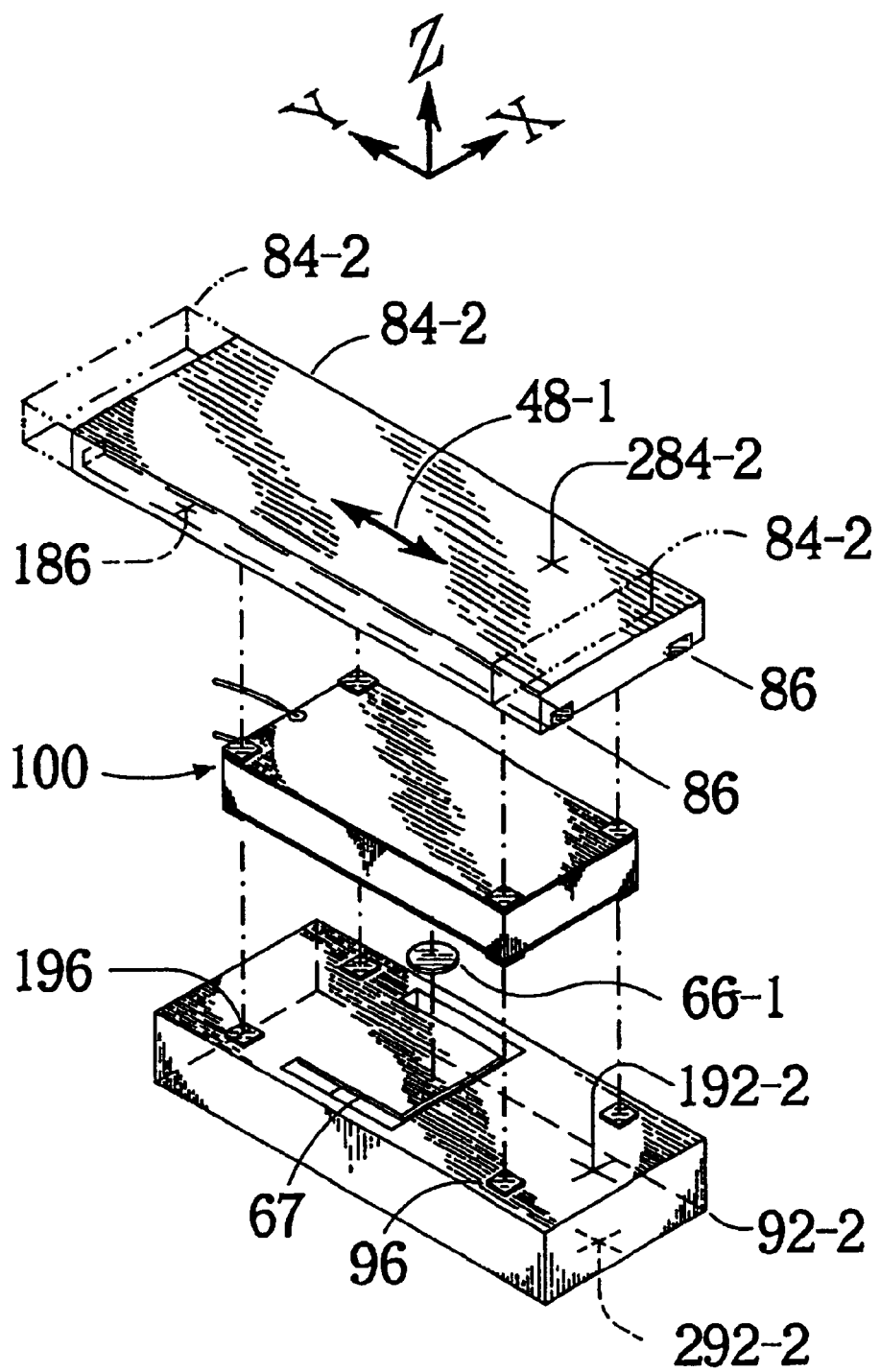
FIG. 6A is an exploded view of a simple ultrastiff linear sonic bearing assembly employing a direct-drive sonic bearing element, sandwiched between a load member and a base member.

FIG. 6A shows an exploded view of one of the simplest and therefore the lowest cost ultrastiff sonic bearing designs. The bearing element 100 (see FIG. 4A for the detailed definitions of the bearing element 100 such as the upper and lower contact pad members, the upper and lower transducer electrodes, and the upper and lower electrode surfaces) is a direct-drive structure operating in the $\lambda/2$ longitudinal resonant mode. The transducer element is selected for its high quality factor Q, and for the specific case of lead zirconate titanate types of transducers, such as PZT8 from Morgan Matroc, Ltic., Bedford Ohio, the maximum Q is around 1000. The bearing element of this sonic bearing design has dimensions of 46 mm long by 25 mm wide and 3 mm thick and will resonate in the longitudinal $\lambda/2$ mode at approximately 35 kHz. The eight microscopically textured and optically flat (to one-quarter wavelength of a red HeNe laser) tungsten carbide contact pad members, with dimensions of 5 mm by 5 mm by 0.5 mm thick, are secured by an adhesive means at the four corners of the two transducer electrode surfaces. The adhesive means is 50 to 100 microns thick layer of glue used to attach the four upper 70U and four lower 70L contact pad members to the corresponding upper 168U and lower 168L piezoelectric transducer's nickel electrode surfaces. The glue should have very high tensile strength such as Devcon 10760 Titanium Putty from ITW Devcon, Danvers Mass.

The load member 84-2 has a load accepting surface 284-2 and an oppositely facing load sliding surface 186. A portion of the load sliding surface is the microscopically textured, optically flat (to one-quarter wavelength of a red HeNe laser) 5 mm wide by 5 mm thick by 70 mm long ISO M20 grade tungsten carbide surfaces of the load guideway members 86. The base member 92-2 has a base sliding region 192-2 and an oppositely facing base platform region 292-2. Embedded in the base member are four 5 mm by 5 mm by 2 mm thick tungsten carbide base contact pad members 96. The sections of the base sliding region which are the contact pad surfaces 196 have been textured and polished optically flat to form a single plane. Both the load guideway members 86 and the base contact pad members 96 are attached to the load member 84-2 and the base member 92-2 respectively by an adhesive means such as glue.

The bearing element 100 is both aligned and fixedly mounted to the base member. The technique consists of securing the nodal region (not shown, but see FIG. 2B) on the lower transducer electrode surface 168L to a 6 mm diameter by 6 mm long cylindrical support member 66-1 made of an insulator material, such as $Al_2O_3$, using an adhesive means. The cylindrical support member 66-1 in turn, is aligned and glued to the lower base member 92-2 on the Z-axis compliant base support member region 67 such that the four lower contact pad surfaces 170L (not shown, but see FIG. 4A) are parallel to and in sliding contact with the four base contact pad surfaces 196 of the base sliding region. Similarly, the four upper contact pad surfaces 170U of the bearing sliding surface are parallel to and in slidable contact with the load guideway surfaces 186 of the load sliding surface. The directions of the sliding movements of this sonic bearing's load member 84-2 relative to the fixed base member are shown by the translational direction arrows 48-1.

Figure 6B:
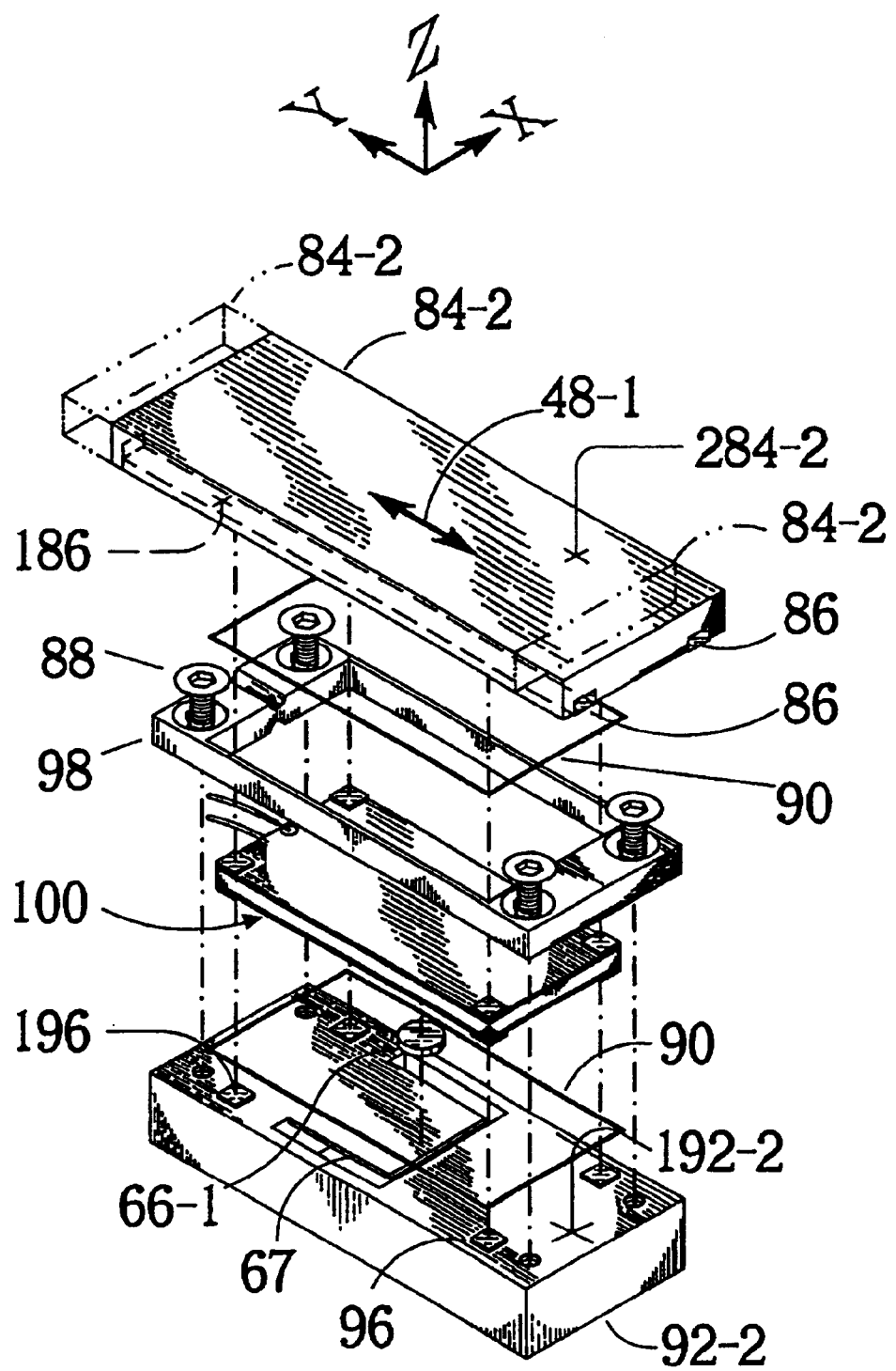
FIG. 6B is an exploded view of a simple ultrastiff linear sonic bearing assembly using a direct-drive sonic bearing element with an upper and lower lubricant reservoir.

The embodiment of FIG. 6B is similar to that of FIG. 6A except that all eight lower sliding surfaces comprising of the four lower bearing contact pad surfaces 170L (not shown, but see FIG. 4A) of the bearing support region and the four base contact pad surfaces 196 of the base sliding region are modified by the lower lubrication means. Specifically, this lower lubrication means consists of a molybdenum disulfide and mineral oil mixture which is held in a lower reservoir structure formed by the combined surfaces of the bearing support region, the base sliding region and the lower RTV silicone elastic seal 90. A spacer 98 attached by four screws 88 to the base member 92-2 is part of an upper oil reservoir structure which is used to lubricate the six upper sliding surfaces comprising of the four upper contact pad surfaces 170U of the bearing sliding surface and the two load guideway surfaces 186 of the load sliding surface. The surfaces which enclose the upper oil reservoir are the load sliding surface, the bearing sliding surface and a portion of the upper elastic seal 90 surface. This upper reservoir with its molybdenum disulfide and mineral oil mixture is the upper lubrication means for the sonic bearing.

It should be noted that the load sliding surface, the bearing sliding surface, bearing support region and base sliding region have a surface material which may be comprised of: diamond, diamond-like carbon materials, steel alloys, steel, cubic carbon nitrides, cubic boron nitrides, zirconium carbon nitrides, titanium carbon nitrides, titanium aluminum nitrides, aluminum alloys, aluminum, alumina, sapphire, W, Ni, Nb, Ti, Si, Zr, Cr, Hf, Y, oxides of Nb, oxides of Ti, oxides of Si, oxides of Zr, oxides of Cr, oxides of Hf, oxides of Y, carbides of W, carbides of Nb, carbides of Ti, carbides of Si, carbides of Zr, carbides of Cr, carbides of Ta, carbides of Hf, nitrides of Ti, nitrides of Si, nitrides of B, nitrides of Zr, borides of W, borides of Zr, borides of Ti, borides of Hf, borides of Cr, PTFE polymer, HDPE polymer, and UHMWPE polymer.

Figure 7A:
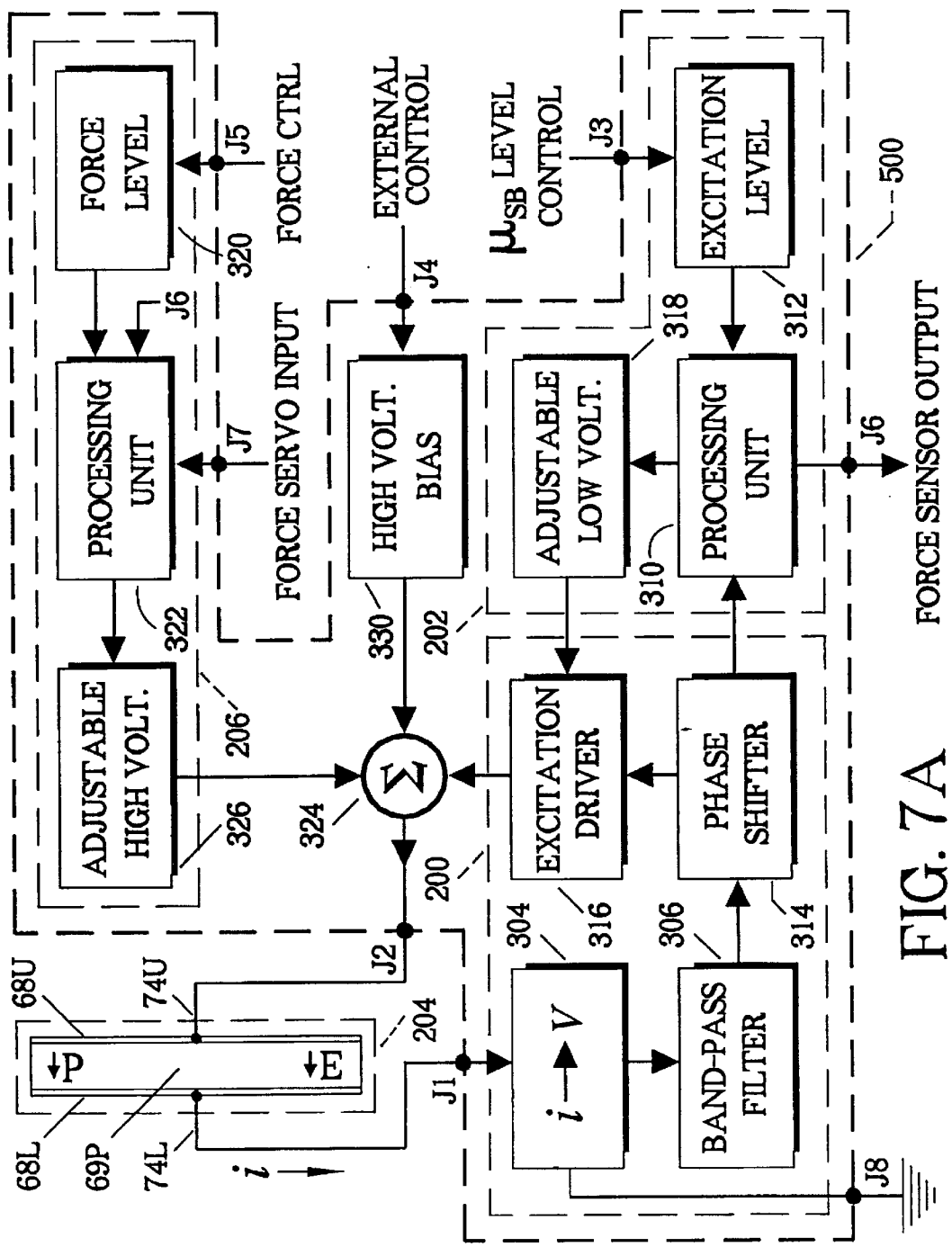
FIG. 7A is a simplified block diagram of an electronics package driving one ultrastiff bearing element.

FIG. 7A shows a block diagram of the drive electronics package 500 which can be used to oscillate any bearing elements equipped with at least one piezoelectric transducer 204. The basic drive electronics package contains an excitation means 200, which is designed to oscillate the piezoelectric transducer at any one of the transducer's minimum impedance frequencies. The basic package can be expanded to further include, in any quantity and combination, an oscillation level controlling means 202 which will allow for the control of the r.m.s. velocity of the oscillatory sliding motion, a cross section controlling means 206 which will allow for adjustments of the cross section along the length of the bearing element independent of the oscillation, and a high voltage bias means 330 which will establish an initial electric field, E in the transducer 204. Each of these components of the electronic package can be implemented entirely by using conventional analog electronic devices or in some combination with digital devices which may include one or more microprocessors.

The circuit of the excitation means 200 senses the current, i flowing through the transducer 204 at the lower transducer electrode 68L via the lower excitation wire 74L and converts that current into an equivalent voltage using a wide band current-to-voltage amplifier 304. The resulting voltage signal is sent through a high Q electronic band-pass filter 306 to select the correct transducer oscillation mode. Finally, the signal is appropriately phase shifted by a constant amplitude phase shifter circuit 314 to obtain the required zero phase positive feedback oscillatory condition for the selected frequency. The processed voltage signal from the phase shifter is then used as input to an excitation driver 316 which uses a fixed or variable D.C. low voltage supply to determine the maximum oscillation amplitude. This excitation driver 316 uses a "half-bridge" drive configuration whose square wave output is then available to excite the piezoelectric transducer's upper electrode 68U via the upper excitation wire 74U which completes the oscillator feedback loop. The unidirectional electric field, E generated by the driver's low voltage square wave interacts with the piezoelectric material 69P having a fixed electric dipole moment, P to convert a portion of the electrical energy into acoustic vibrations.

The transducer's oscillation level can be controlled by the circuit of the controlling means 202 which includes a processing unit 310 for dynamically changing the output of the adjustable D.C. low voltage supply 318 in order to maintain a constant r.m.s. value for transducer current, i. This processing unit 310 functions by comparing the r.m.s. value of the filtered and phase shifted signal representing the sensed transducer current, i from the phase shifter 314 with an externally programmed excitation level 312. Any difference between the r.m.s. value and the level value generates an error signal which is then used to change the amplitude of the low voltage square wave by changing the output level of the adjustable D.C. low voltage supply 318. There is also provided an effective coefficient of friction, "$\mu_{SB}$ level control" input to the excitation level 312 for external modulation of the sonic bearing's effective coefficient of friction $\mu_{SB}$.

Furthermore, as it will be discussed in detail later, because a bearing element can also act as a sensing means to determine the magnitude of the normal component of the force acting on that bearing element, the processing unit 310 further functions to generate a "force sensor output" signal, which is proportional to this magnitude of the force. This "force sensor output" signal can be used in a feedback mechanism in a multi-bearing element assembly to maintain the fidelity of the load sliding motion with respect to the desired slidable path and to control the force.

The second controlling means 206 can be employed to alter the cross section of a bearing element along one dimension thereof in a controlled fashion. For a direct-drive bearing element whose sliding surfaces are attached to a piezoelectric transducer, this cross section control consists of supplying a predetermined high voltage signal to the piezoelectric transducer itself. In the circuit of the controlling means 206, the processing unit 322 compares the value of an external servo input signal with a programmed reference level 320 such that an error signal representing a needed cross sectional change can be generated and then used to change the output level of the adjustable high voltage supply 326. This output level can then be summed in the summing unit 324 with the low voltage square wave from the excitation driver 316 of the excitation means 200 and transferred to the transducer accordingly.

Being able to controllably change the bearing element cross section, specifically along its length (i.e., being able to change in thickness and/or width dimension), in conjunction with the fact that each bearing element can act as a force sensing means, allows for servoed control of a sonic bearing assembly's stiffness.

In a multi-bearing element sonic bearing assembly wherein the bearing elements have an appropriate geometric relationship this stiffness servo is achieved by maintaining the force acting one of the bearing elements to be constant. One such relationship can be found in the simple case of two rigidly fixed and opposing bearing elements sandwiching the same load member. For this example, the external servo input signal for one bearing element is a "force servo input" signal which can be taken directly from the "force sensor output" of the processing unit 310 of a another bearing element electronics package 500. In this way, any change in force away from the bias force reference level 320 on one bearing element due to, for example, thermal expansion, wear, or an external force on the load member will be sensed and thereby cause the opposing bearing element to restore the force by altering its appropriate dimension.

Furthermore, if both feedback mechanisms are employed in the aforementioned relationship (i.e., the "force servo input" for one bearing element is the "force sensor output" of the other and vice versa), the dynamic range of servo adjustment can be substantially increased. In this type of assembly the processing unit 322 in each electronics package can additionally use the internally generated "force sensor output" signal from the processing unit 310 associated with the same bearing element in order to provide additional control features.

The reference level 320 of the controlling means 206 is also provided with an external control input which can be used for modulating the bearing cross section. More particularly, for the aforesaid multi-bearing element application, this external control input can be a "force control" signal which when used in conjunction with the "$\mu_{SB}$ level control" signal provides for the possibility of control over both input parameters of the frictional sliding force equation (i.e., $F_{FRIC} = \mu_{SB}[F_{APP}]_Z$). This complete control over friction sliding force translates directly into control over the applied sliding force needed to slide a load.

Lastly, an additional high voltage signal from the bias means 330 can be summed in the summing unit 324 with the signal from the excitation driver 316 in order to provide an electrical bias on the transducer in addition to the square wave output. This bias is useful for shifting the operating region of transducer devices with nonlinear displacement characteristics, such as those using electrostrictive material, to a region having higher linearity. This high voltage bias is also provided with an external control input for externally altering the level of the applied voltage bias if desired. This external level set can be a signal generated from an external sensor, such as those employed in the use of interferometry, strain detection, or capacitive sensing, Applying a high voltage to the piezoelectric transducer can produce changes in the dimensions of the transducer element itself as large as 0.02 percent and these changes are governed by the equations of displacement as defined in the literature for a piezoelectric material and are well known in the art. However, this ability of a sonic bearing element to simultaneously oscillate vigorously and controllably change, for example, its thickness between the bearing sliding surface and the bearing support region, both actions operating substantially independent of each other, is a primary feature of the invention. This unique property is made possible by the fact that: (1) for a high Q bearing element (e.g., Q greater than 1000), the maximum peak-to-peak, oscillation producing, excitation voltage that can be applied across the transducer before reaching material destruction pressure is only a small fraction (viz, less than three percent) of the electrical breakdown voltage and (2) the maximum piezoelectric material expansion when a voltage near the electrical breakdown voltage is applied is only a small fraction (viz, less than five percent) of the material expansion limit. Therefore, a bearing element excited to near its maximum oscillatory displacement condition can still change its thickness$_{13}$ between the bearing sliding surface and the bearing support region by the application of a very large quasi-DC voltage.

Figure 7B:
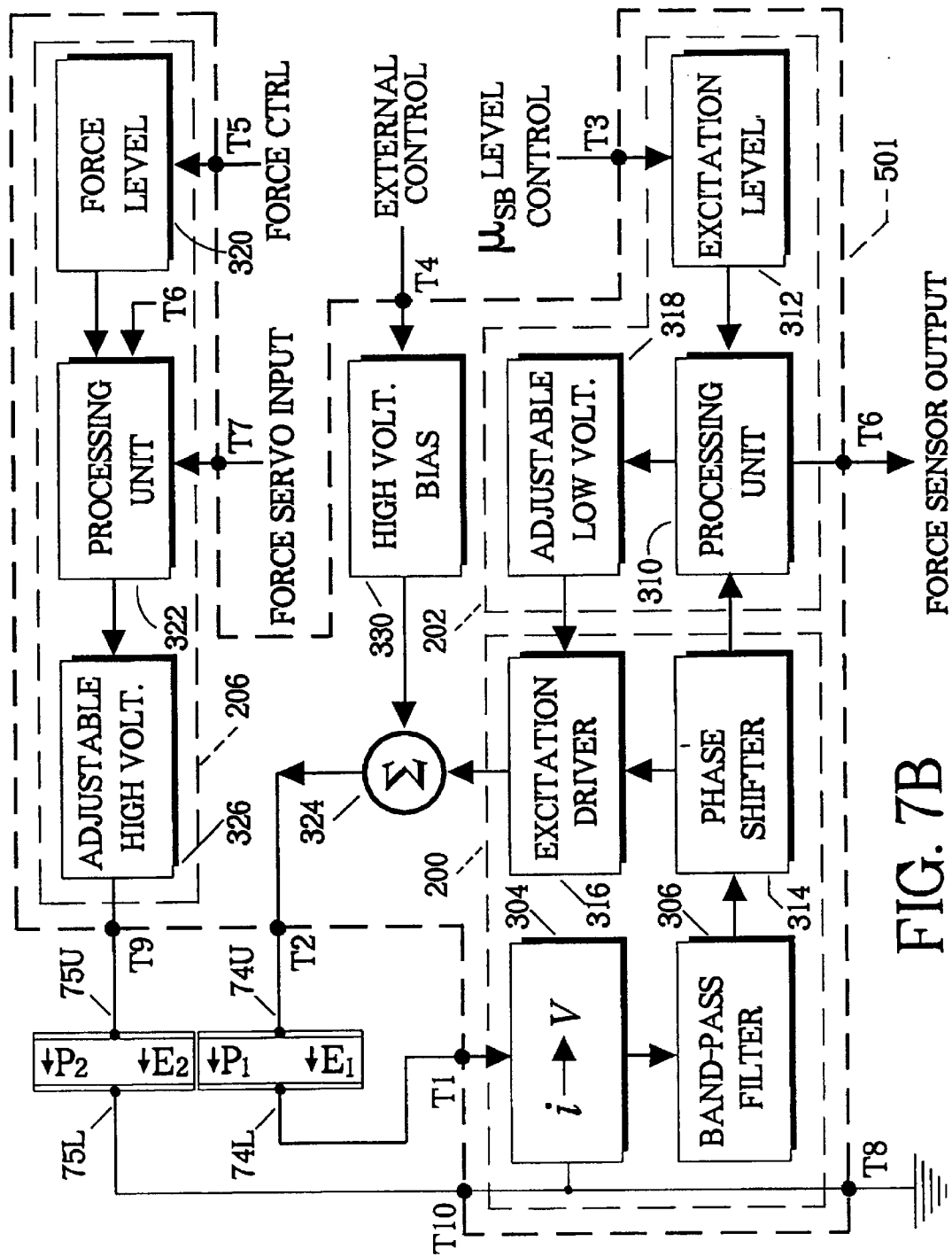
FIG. 7B is a simplified block diagram of an electronics package configuration for driving an ultrastiff bearing element having two piezoelectric transducers.
Figure 8:
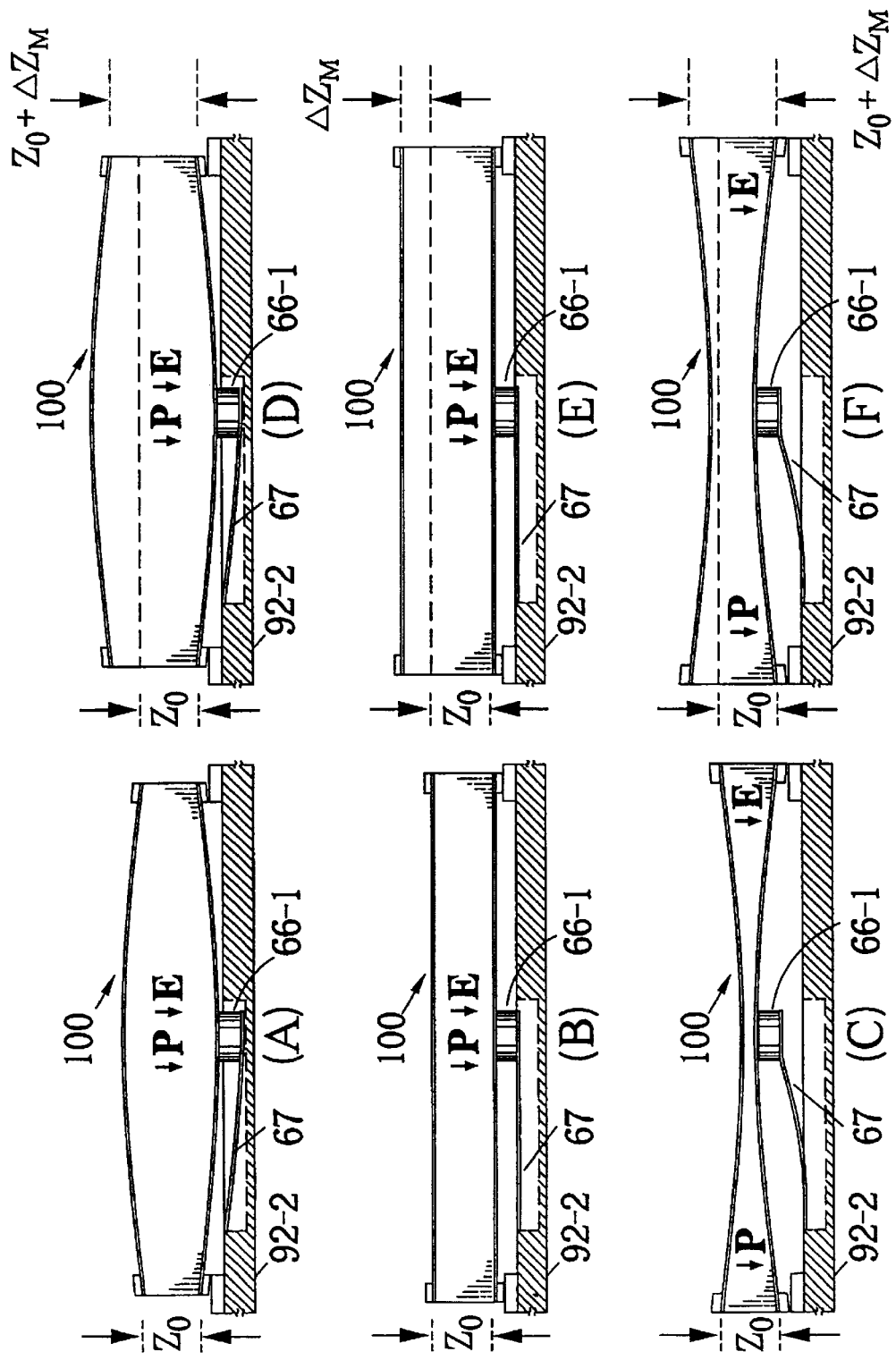
FIGS. 8A to 8C are side views of an ultrastiff direct-drive sonic bearing element oscillating at its fundamental longitudinal frequency and subjected to the free-free boundary conditions illustrating the extremes of thickness modulation along the length due only to the resonant oscillation.
FIGS. 8D to 8F are side views of an ultrastiff direct-drive sonic bearing element oscillating at its fundamental longitudinal frequency and subjected to the free-free boundary conditions illustrating the extremes of thickness modulation along the length due to oscillation and an independent increase in thickness due to an applied high voltage.

FIGS. 8A to 8F illustrate the effect on the bearing element thickness by applying an additional high voltage as used in the controlling means 206 option and the bias means 330 option and its independence from the oscillatory behavior of the bearing element. In FIGS. 8A to 8C a sectional view of thickness modulation along the length of the bearing element 100 due only to the induced longitudinal length resonant oscillation of the λ/2 mode is shown for individual phases of the oscillation. FIG. 8A corresponds to the extreme of the "−CYCLE" and FIG. 8C corresponds to the extreme of the "+CYCLE" while FIG. 8B shows the equilibrium position for this unbiased bearing element. In each of these figures, the bearing element 100 is comprised of a piezoelectric transducer of thickness $Z_0$ and is attached to a compliant base support member region 67 on the base member 92-2 with a cylindrical support member 66-1. FIGS. 8D to 8F however, show the same bearing element 100 with a high voltage applied from either the cross section controlling means or the bias (both not shown, but see FIG. 7A) which increases the thickness by $\Delta Z_{BE}$ along the length. With no force applied, as illustrated, $\Delta Z_{BE}$ has a value of $\Delta Z_M$. For clarity of illustration, the magnitude of these microscopic expansions and contractions in FIGS. 5A to 8F have been greatly exaggerated.

This drive electronics package is not just limited to driving direct-drive bearings, but can be reconfigured, as illustrated by FIG. 7B, to the electronics package 501 for the case of indirect-drive bearings which use a piezoelectric transducer as an extension member. When this configuration is used, the output of the adjustable high voltage supply 326 is connected directly to the upper extension member electrode surface 178U through the upper wire 75U instead of being summed with the signal from the excitation driver 316 and the lower wire 75L attached to the lower extension member electrode surface 178L is held at a fixed potential. This adjustable high voltage supply 326 will then produce its own electric field, $E_2$ to interact with the dipole moment, $P_2$ in the extension member while the field, $E_1$ is produced in the transducer by the signal from the summing unit 324 to interact with the dipole moment, $P_1$.

Figure 9A:
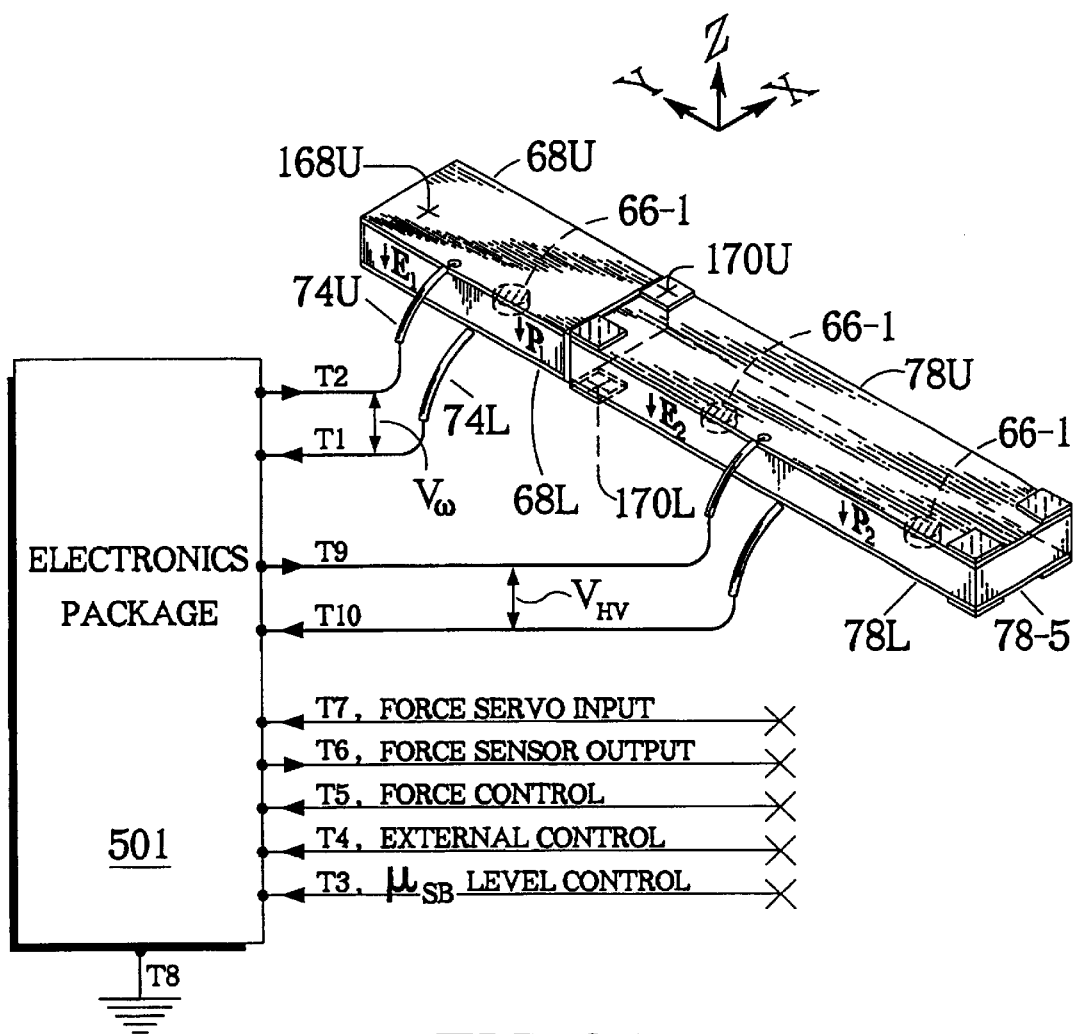
FIG. 9A is an isometric view of an ultrastiff indirect-drive sonic bearing element consisting of a single, fundamental, length resonant mode, piezoelectric transducer driving a single, two-half wavelength, longitudinal length resonant mode, extension member which is also a piezoelectric transducer, both connected to a single electronics package.

To further illustrate the use of the drive option of FIG. 7B, the bearing element embodiment of FIG. 9A has been provided which shows an additional piezoelectric device being used as a two-half wavelength extension member 78-5. This extension member 78-5 has an upper 78U and a lower 78L electrode connected to the electronics package 501 by the wires 75U and 75L respectively.

Figure 9B:
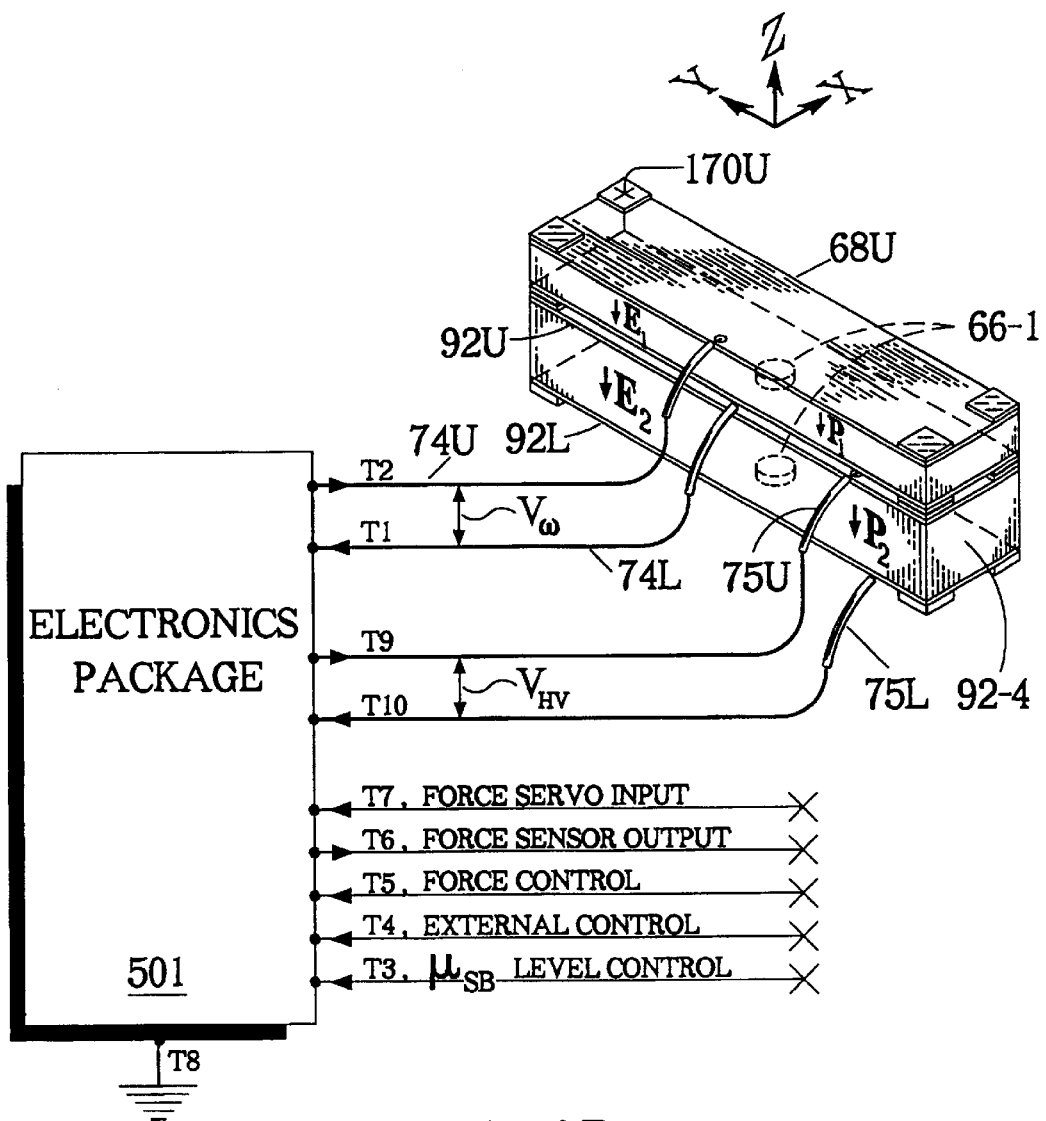
FIG. 9B is an isometric view of an ultrastiff direct-drive sonic bearing element consisting of a single piezoelectric transducer supported by a base member which is also a piezoelectric transducer, both connected to a single electronics package.

An alternative use for the drive option of FIG. 7B is the case where a direct-drive bearing element Q is not large enough to sustain the required oscillation level with a peak-to-peak oscillating voltage safely below the electrical breakdown voltage when driven with the electronics package of FIG. 7A. For this case, an alternative base member configuration, such as depicted in FIG. 9B, can be used. As illustrated, the base member 92-4 is a piezoelectric device whose upper 92U and lower 92L electrodes are connected to the electronics package 501 by the wires 75U and 75L respectively, so that the bearing's dimension in the Z-axis can be adjusted.

The electronics package 500 of FIG. 7A can also be transformed by one skilled in the art, to drive, in a similar fashion, a transducer comprising of a core of magnetostrictive material 69M (see FIGS. 4B and 5B). In this case, the output from the summing unit 324 would drive a magnetic excitation coil wound around the core so that a magnetic field B can be generated in the material to produce a mechanical dimensional change. Alternatively, because magnetic fields can be superimposed in the core material itself, the output from the excitation driver 316 can be summed with the adjustable high voltage supply 326 and connected directly to one side of an excitation coil with the other side of the excitation coil used as input to the converter 304 while the bias means 330 and its ground reference can connect directly to a separate polarization coil wound around the same core or placed externally to the device.

Figure 10:
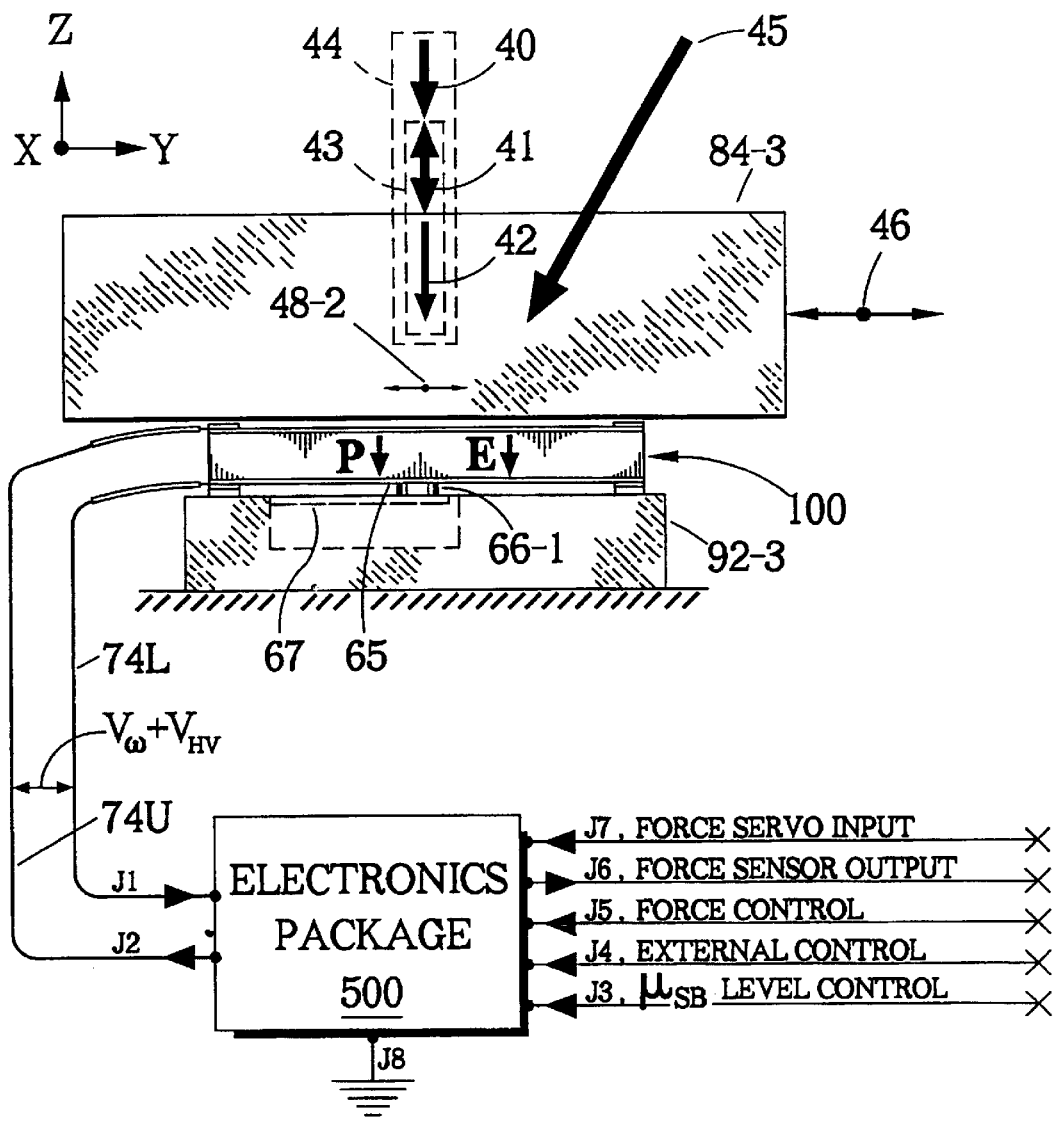
FIG. 10 is a side view of a simplified ultrastiff direct-drive, sonic bearing assembly with the associated forces acting on it and with connections to an electronics package.

FIG. 10 shows the general relationship between the various major mechanical components of a sonic bearing along with the forces acting thereon. The applied force or simply referred to as the force $F_{APP}$ 45, has a normal component $[F_{APP}]_Z$, 44 directed along the Z-axis, which is used to press the load member 84-3, the bearing element 100 and the base member 92-3 together such that all the appropriate sliding surfaces and regions of each component are in direct contact. It must be noted that the force used to press the load member 84-3, the bearing element 100 and the base member 9-23 together can be generated by compression, tension, shear, or any combination thereof. The bearing element 100 is mechanically connected to the base member 92-3 at the base support member region 67 by a cylindrical support member 66-1 at the nodal region on the bearing support region 65, using an adhesive means.

The force $F_{APP}$ 45, can be generated by any mechanism such as gravitational, electric, magnetic and electromagnetic fields, or other mechanical structures, but is typically a load force $F_{LOAD}$ containing a gravitational force $F_{MG}$ representing the weight of the load member and an external force $F_{EXT}$ generated by an external source. The Z-axis component $[F_{LOAD}]_Z$, 43 of the load force $F_{LOAD}$, therefore has the Z-axis components $[F_{MG}]_Z$, 42 and $[F_{EXT}]_Z$, 41 of the load force $F_{LOAD}$, force respectively. Later, the force $F_{APP}$ will be shown to include a bearing element generated force $F_{BE}$, having a Z-axis component $[F_{BE}]_Z$, 40 for use in a multi-bearing element force servo mechanism to alter the bearing's intrinsic stiffness.

Still in reference to FIG. 10, the resonant microscopic vibrational motion (not shown) of the bearing element 100 activated by the excitation driver of the electronics package 500 are parallel to the Y-axis. A applied sliding force 46 can be applied to the load member 84-3 to initiate and maintain a load sliding motion in the XY-plane along the directions 48-2. This sliding force is usually derived from a motor, an actuator, a piston, a gear train, a leadscrew, a manual means or some combination thereof, but can also be the result of the X-axial or Y-axial components of the force $F_{APP}$ 45.

Results

Figure 11A:
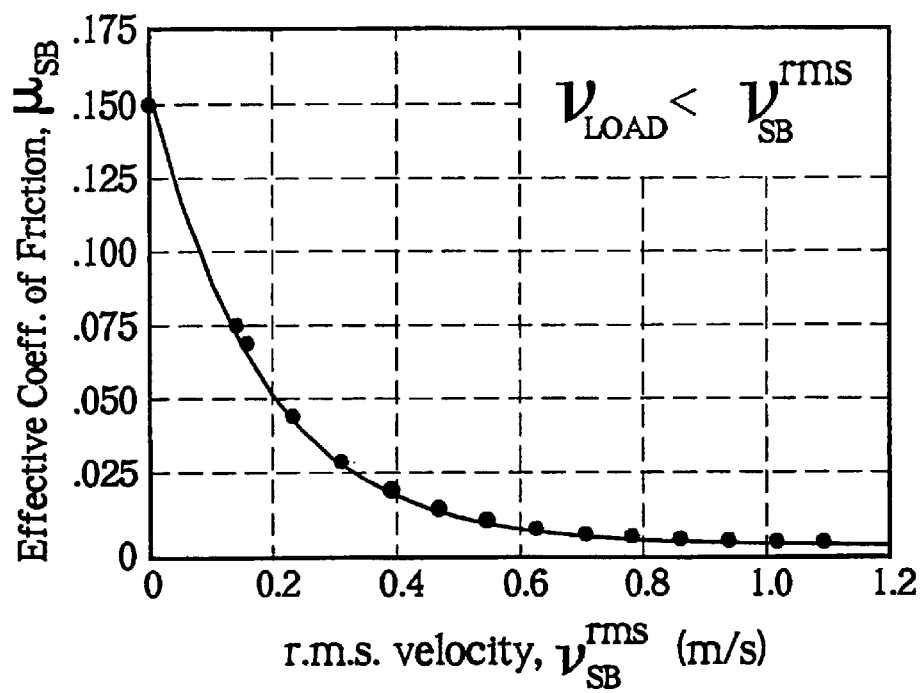
FIG. 11A is an experimental plot of the effective coefficient of friction $\mu_{SB}$ of a sonic bearing with tungsten carbide contact pad surfaces versus the root-mean-square (r.m.s.) velocity $v_{SB}^{rms}$ of its contact pad surfaces.

FIG. 11A shows the sonic bearing assembly's effective coefficient of friction, $\mu_{SB}$ as a function of the bearing element's contact pad r.m.s. velocity, $v_{SB}^{rms}$ for the case when the load sliding velocity, $v_{LOAD}$ is much less than $v_{SB}^{rms}$. All the measurements were taken using the sonic bearing assembly configuration shown in FIG. 10. For each velocity, $v_{SB}^{rms}$, the $\mu_{SB}$ is determined by measuring the magnitude of the minimum applied sliding force required to move the load divided by magnitude of the normally directed component $[F_{APP}]_Z$ of the force $F_{APP}$. The velocities of the oscillating contact pad surfaces are measured by using a focused HeNe laser beam bouncing off a very small and thin silicon cantilever onto an optical split detector. One end of the cantilever is attached to a fixed base while the other end is glued to the vibrating bearing element near a contact pad surface. The r.m.s. velocity at the contact pad surfaces is proportional to the measured vibrational amplitude divided by the oscillation period. A single point calibration of the proportionality constant is obtained by translating the bearing element by a known ten micron distance using a DM-13 submicron resolution differential micrometer from Newport Corp. Irvine, Calif., and measuring the resulting changes in the signal amplitude on the split detector.

Figure 11B:
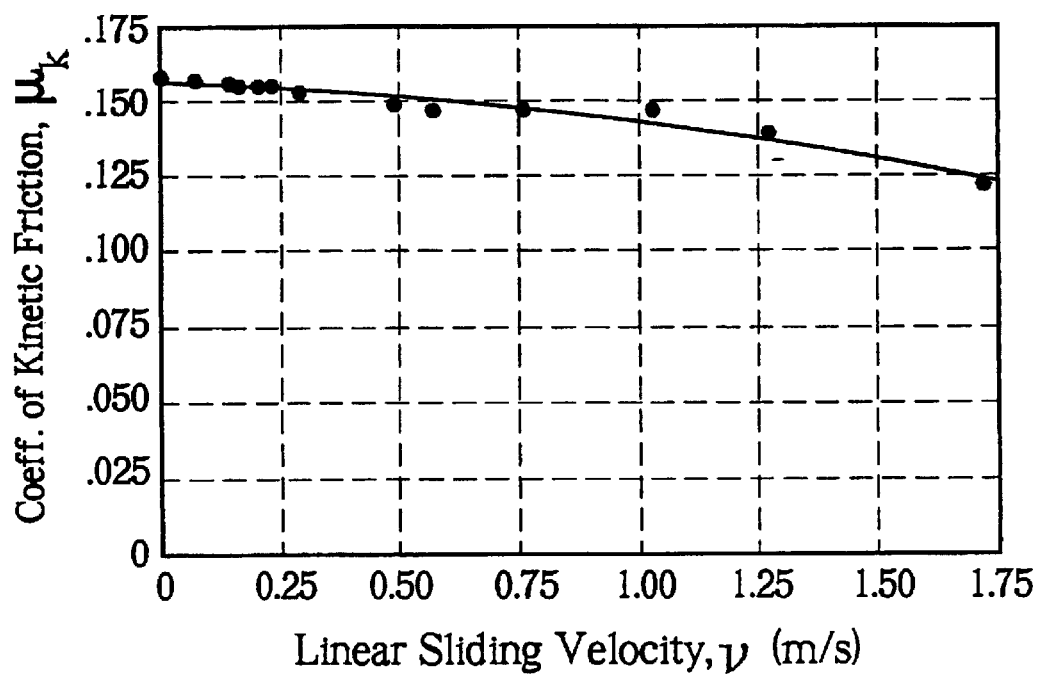
FIG. 11B is an experimental plot of the actual coefficient of kinetic friction $\mu_k$ of a cleaned and polished tungsten carbide rod sliding against a tungsten carbide plate as a function of its linear sliding velocity $v$.

Historically, it is well known from numerous brake, clutch and piston seal studies that for many materials, the coefficient of kinetic friction $\mu_k$ decreases with increasing sliding velocities in the 0 to 10 m/sec range. To demonstrate that the observed effect of the sonic bearing's apparent reduction of the effective coefficient of friction is not simply a reduction of the actual coefficient of kinetic friction due to the r.m.s. velocity of the contact pad members, the experimental $\mu_k$ for tungsten carbide sliding against an unlubricated tungsten carbide is obtained in the velocity range of interest. FIG. 11B shows the $\mu_k$ for an acetone cleaned and polished ISO M20 grade tungsten carbide rod sliding against a stationary, flat ISO M20 grade tungsten carbide plate. The $\mu_k$ value for a given sliding velocity is derived by dividing the measured magnitude of the friction generated tangential force on the flat plate by the magnitude of the normal component of the force $F_{APP}$. From the data presented in FIG. 11B, it is clear that for unlubricated tungsten carbide sliding on tungsten carbide, $\mu_k$ indeed decreases with increasing velocities, but not at the rate of approximately inverse velocity (i.e., $1/v_{SB}^{rms}$) of the sonic bearing effect as depicted in FIG. 11A. The accuracy of the coefficient of friction measurements for the sonic bearing and the direct sliding systems can be evaluated by comparing the $\mu_{SB}$ and $\mu_k$ values at zero sonic bearing oscillation level and at near zero rod/plate's linear sliding velocity respectively. The measured sonic bearing $\mu_{SB}$ (when $v_{SB}^{rms}=0$) value should theoretically be equal to the measured $\mu_k$ (at v=0) value under these two limiting conditions.

One of the key features of the sonic bearing effect according to our interpretation of the adhesion theory is the ability to change the effective coefficient of friction $\mu_{SB}$ of the bearing without actually changing the actual coefficient of kinetic friction $\mu_k$ of the sliding surfaces themselves. This is, of course done by externally supplying most of the energy which is dissipated by the frictional forces. FIG. 11A clearly shows this decrease in apparent friction over and above the small decrease in the kinetic friction $\mu_k$ (see FIG. 11B) due only to the velocity effect. By measuring the power consumption profile of the sonic bearing at various bearing r.m.s. velocities, it will be possible to determine if the observed decrease in bearing friction is due to (1) the sonic bearing effect where the actual coefficient of kinetic friction $\mu_k$ of the sliding surfaces is nearly independent of velocity, or (2) an actual inverse velocity-like decrease in the coefficient of kinetic friction $\mu_k$ of the sliding surfaces.

If the first hypothesis is valid, then the electrical power consumption profile of the sonic bearing due only to an external load should be initially linearly proportional to the bearing's r.m.s. velocity $v_{SB}^{rms}$. This is because the bearing's power dissipation is equal to the product Of $\mu_k$, the magnitude of the normal component of the force $F_{APP}$, and the velocity parameters. Since the $\mu_k$ for tungsten carbide sliding against tungsten carbide is nearly constant at low velocities (see FIG. 11B), the load power dissipation should therefore also be linear with velocity and as the bearing velocity increases, $\mu_k$ should decrease due to its slight velocity dependence, hence the expected power dissipation should deviate less than linear.

On the other hand, if the actual coefficient of kinetic friction $\mu_k$ of the sliding surfaces is decreasing and this is the "real" cause of the sonic bearing's observed decrease in effective coefficient of friction $\mu_{SB}$ as shown in FIG. 11A, then the power consumption due to a given external load will not increase linearly with increasing velocity $v_{SB}^{rms}$. Specifically, if the friction between the sliding surfaces is decreasing as the inverse of velocity $v_{SB}^{rms}$, as one may argue from the experimental effective coefficient of friction data of FIG. 11A, then the sonic bearing's power consumption profile should be approximately constant and independent of the velocity $v_{SB}^{rms}$. This is because the power consumption is the product of the magnitude of the normal component of the force $F_{APP}$, which is constant, $\mu^k$, which is now assumed to vary inversely with velocity, and the velocity $v^{SBrms}$.

Figure 12A:
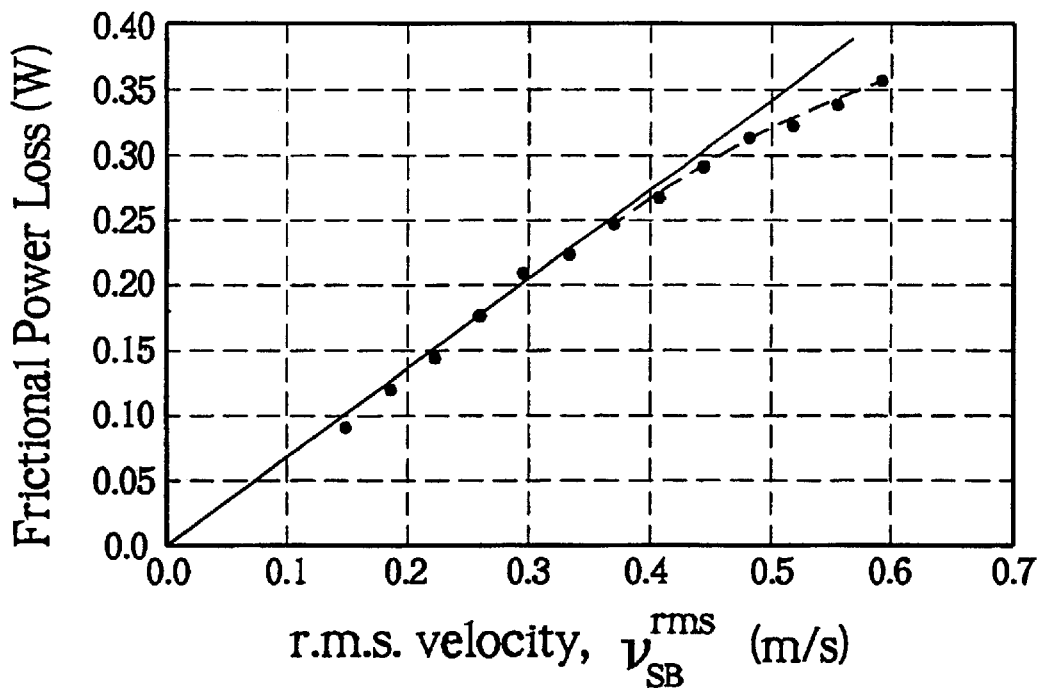
FIG. 12A is an experimental plot of the external r.m.s. load power dissipation due to frictional sliding of a sonic bearing versus the r.m.s. velocity $v_{SB}^{rms}$ of its contact pad surfaces.

FIG. 12A shows the experimental data of the sonic bearing's load r.m.s. power consumption, due to frictional sliding, as a function of the contact pad surfaces' r.m.s. velocity $v_{SB}^{rms}$ using a fixed 0.5 kgF force $[F_{APP}]_Z$. The sonic bearing used in these experiments employs a bearing element which is similar to the one shown in FIG. 5A but, the extension member and the contact pad members are entirely made from a single piece of tungsten carbide.

The data for the r.m.s. load power dissipation due to frictional sliding shown in FIG. 12A was obtained by measuring the differences in the sonic bearing's r.m.s. power consumption with and without the 0.5 kgF force $[F_{APP}]_Z$, on the bearing's load accepting surface. With the force, the power consumption is a combination of both internal and frictional dissipation and without the force, the power consumption is simply the internal bearing dissipation. The solid line is the linear least-square-fit to the experimental data in the low r.m.s. velocity $v_{SB}^{rms}$ domain while the dashed line shows the deviation of the raw data away from linearity in the higher velocity region. As expected, at the higher r.m.s. velocities of the contact pad surfaces, the power dissipation should be slightly less than linear due to the slight decrease in the $\mu_k$ value of the tungsten carbide sliding surfaces as shown in FIG. 11B.

In conclusion, the experimental power consumption data for the sonic bearing is fully consistent with the first hypothesis, where the actual coefficient of kinetic friction $\mu_k$ of the sliding surfaces of the bearing exhibits the normal unaltered characteristics shown in FIG. 11B while at the same time, the sonic bearing exhibits a marked decrease in its effective coefficient of friction $\mu_{SB}$ as illustrated in FIG. 11A.

Figure 12B:
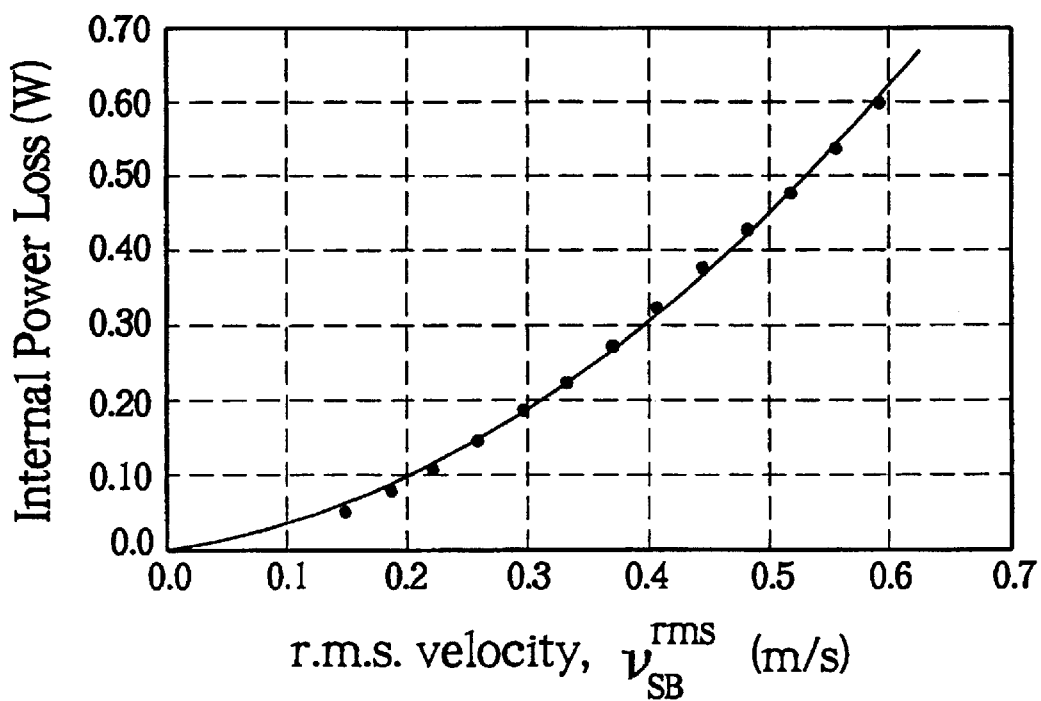
FIG. 12B is an experimental plot of the internal r.m.s. power dissipation of a piezoelectric transducer in a sonic bearing element versus the r.m.s. velocity $v_{SB}^{rms}$ of the contact pad surfaces.

FIG. 12B shows the experimental data of the sonic bearing's internal r.m.s. power dissipation as a function of the r.m.s. velocity $v_{SB}^{rms}$. The solid line is the quadratic nonlinear least-square-fit to the experimental data. Note that the internal power dissipation goes as the square of the velocity while the external load dissipation increases only linearly with velocity $v_{SB}^{rms}$. It is clear from the experimental data that the sonic bearing's ability to decrease the effective coefficient of friction $\mu_{SB}$ is most directly limited by the internal power dissipation of the piezoelectric transducer.

A unique method of improving the performance of the sonic bearing, as mentioned earlier, is to use an acoustic horn to convert the low velocity transducer oscillations into high velocity motions at the contact pad surfaces to achieve a low effective coefficient of friction $\mu_{SB}$. For example, if the horn can amplify the velocity of the transducer's displacement by only a factor of three, the internal power dissipation of the transducer can be reduced by nearly a factor of nine.

Figure 13A:
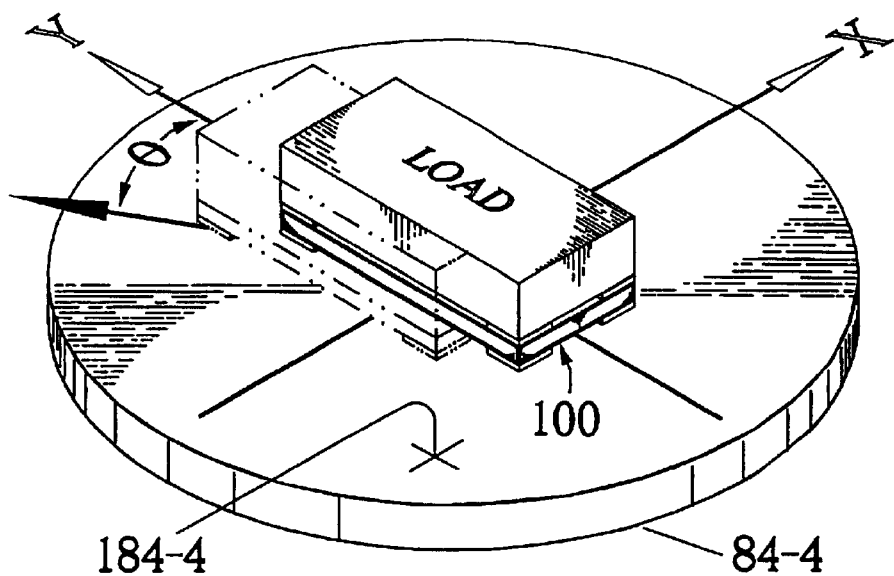
FIG. 13A is an experimental setup used to measure the dependence of the effective coefficient of friction $\mu_{SB}$ for an ultrastiff sonic bearing on the path of sliding as referenced against the axis of bearing element oscillation.

FIG. 13A shows the experimental setup used to measure the effective coefficient of friction $\mu_{SB}$ of a sonic bearing in both the active (i.e., ON, $v_{SB}^{rms}=1$ m/s) and inactive (i.e., OFF, $v_{SB}^{rms}=0$ m/s) states as a function of the bearing's sliding path angle θ. This experiment is designed to test the adhesion theory's prediction that the severance of the chemical bonds between the bearing element 100 and the load member 84-4 due to the microscopic oscillatory sliding motions of the bearing element's contact pad surfaces, releases the bearing element 100 and the nodally attached load to move as a single unit in any path that is slidable on the planar load sliding surface 184-4 of the load member 84-4. Mechanical constraints (not shown) have been implemented in this experiment to have the oscillatory sliding motion of the bearing element 100 always be parallel to the Y-axis, while the load member/bearing element unit can slidably translate at any angle θ with respect to the Y-axis.

Figure 13B:
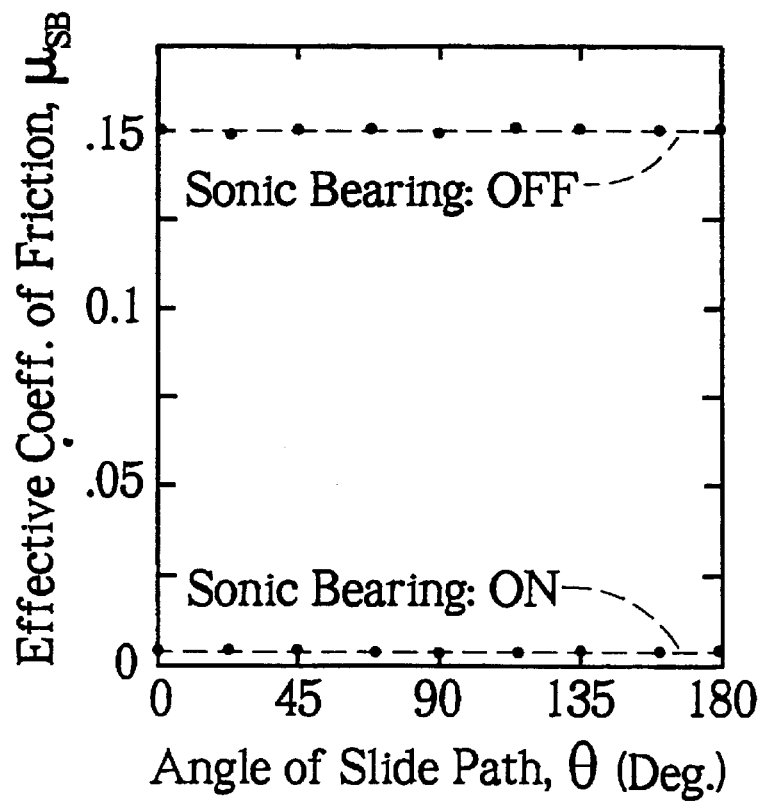
FIG. 13B is an experimental plot of the effective coefficient of friction $\mu_{SB}$ of an ultrastiff sonic bearing versus the sliding path angle θ of the bearing in the active (ON) and inactive (OFF) states.

FIG. 13B shows the experimental data of the effective coefficient of friction as a function of the sliding path angle θ with and without the bearing element oscillating (i.e., ON and OFF, respectively). As predicted by adhesion theory, the effective frictional properties of the sonic bearing are substantially independent of the sliding path angle θ.

Figure 14A:
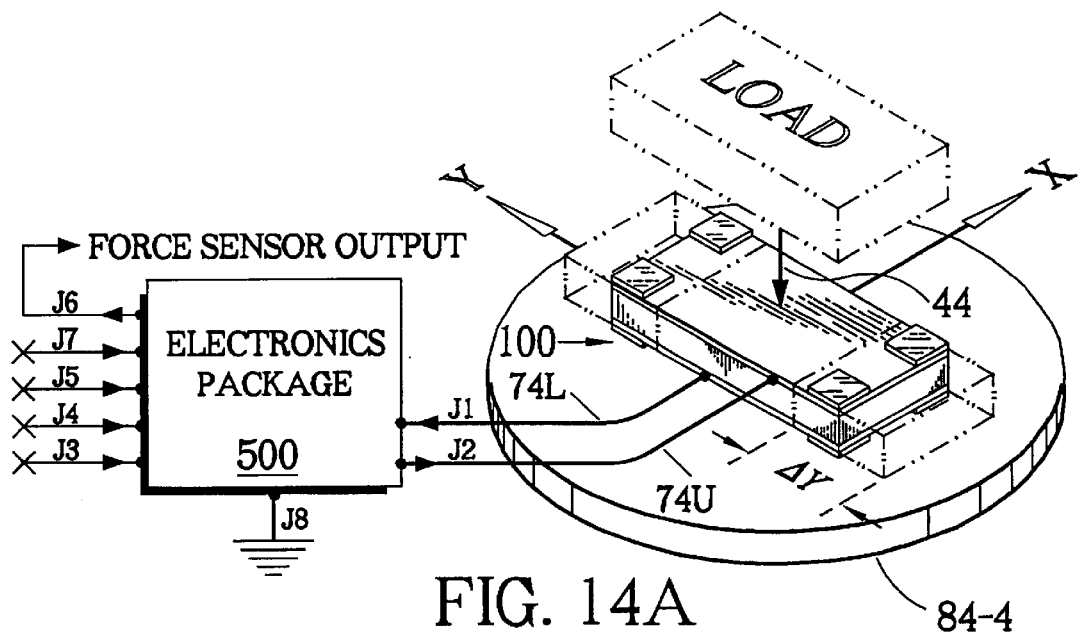
FIG. 14A is an experimental setup used to identify the relationship between the normal component $[F_{APP}]_Z$ of the force on a bearing element and the value of the force output signal.

FIG. 14A is the experimental setup used to determine the relationship between the Z-axial component $[F_{APP}]_Z$, 44 of the force $F_{APP}$ on an oscillating bearing element 100 and the value of the force output signal which represents the normal component of the force $F_{APP}$. As mentioned earlier, each sonic bearing element can also be used as an ultrastiff sensing means for the normal or vertical component $[F_{APP}]_Z$, 44 of the force, $F_{APP}$ 45 acting thereon. Most common force sensors operate according to the spring equation where the applied force on a spring-like device is equal to the measured deflection of that device times its spring constant. The force sensing mechanism of sonic bearings does not use compressive deflection for the sake of maintaining extremely high bearing compressive stiffness. Instead, sonic bearing devices use frictional power dissipation in conjunction with maintaining a constant oscillation level to determine the force $[F_{APP}]_Z$ and from that, generate a "force output signal."

To see how this ultrastiff force sensing mechanism operates, we need to calculate the frictional power loss in the contact pad surfaces of the bearing element 100 over one cycle of oscillation. The frictional power loss is given by the proportionality frictional power loss~$\mu_k[F_{APP}]_Z\Delta Y\omega_{SB}$;

where $\mu_k$ is the actual coefficient of friction of the two sliding surfaces, $[F_{APP}]_Z$ 44 is the Z-axis component of the force $F_{APP}$ 45, ΔY is the oscillation sliding distance over one-half cycle, and $\omega_{SB}$, is the oscillation angular frequency of sonic bearing. For clarity of illustration, the magnitude of these microscopic expansions and contractions ΔY, have been greatly exaggerated. An electrical method of determining the same frictional power loss in the contact pad surfaces is to calculate the r.m.s. value of the measured current, i and multiply it by the change in the peak square wave drive voltage $\Delta V_\omega$ on the piezoelectric transducer with and without the application of the force $F_{APP}$.

Therefore, equating the two power calculations, we have (i)$(\Delta V_\omega)$~$\mu_k[F_{APP}]_Z\Delta Y\omega_{SB}$;

$\Delta V_\omega$~$\mu_k[F_{APP}]_Z\Delta Y\omega_{SB}/i$.

For a given physical sonic bearing with a specific oscillation level setting in the electronics package 500, the parameters $\mu$k, ΔY, $\omega_{SB}$ and i are all fixed constants, we therefore have $\Delta V_\omega$=(some constant)$[F_{APP}]_Z$; or the inverse, $[F_{APP}]_Z$=(1/some constant)$(\Delta V_\omega)$.

And, since the control unit 310 of FIG. 7A is designed to produce a force output signal proportional to $\Delta V_\omega$, we can arrive at the expression $[F_{APP}]_Z$=(constant)(Force Output Signal).

Figure 14B:
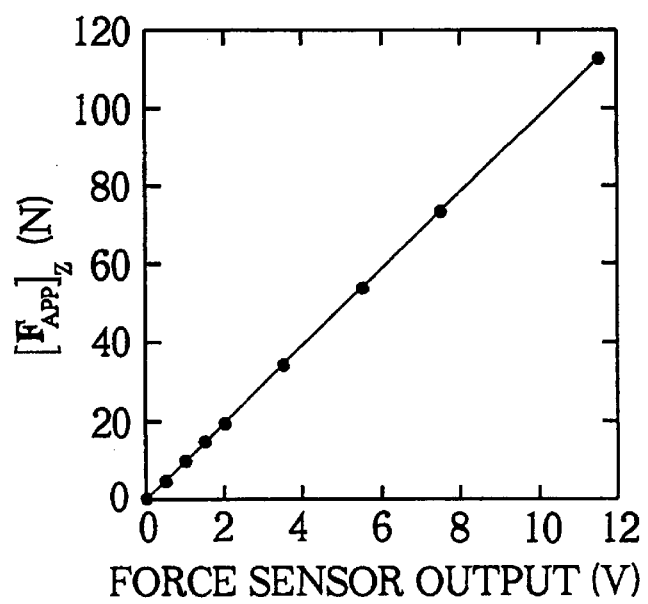
FIG. 14B is an experimental plot of the normal component $[F_{APP}]_Z$ of the force on the bearing element versus the force output signal.

FIG. 14B is an experimental plot of the Z-axis component $[F_{APP}]_Z$ of the force $F_{APP}$ on a specific bearing element 100 versus the "force output signal" generated by the electronics package 500 illustration of FIG. 14A. The "force output signal" data was taken in response to an increasing force Z-axis component $[F_{APP}]_Z$ on the bearing element. The slope of the linear least-square-fit curve is the calibration constant.

Additional Embodiments

An important and preferred practical characteristic of a sonic bearing is the ability to always operate it in the ultrasonic frequency range. This frequency criterion is important because ultrasonic frequencies are generally inaudible to humans. In the preferred embodiments described above, there is an inverse relationship between the bearing's length and its operating frequency. For example, if the bearing element's size increases by a factor of three, the corresponding lowest operating frequency for that bearing will decrease by the same factor of three. This reduction of the operating frequency may transform the original ultrasonic frequency down into the audio range.

Figure 15A:
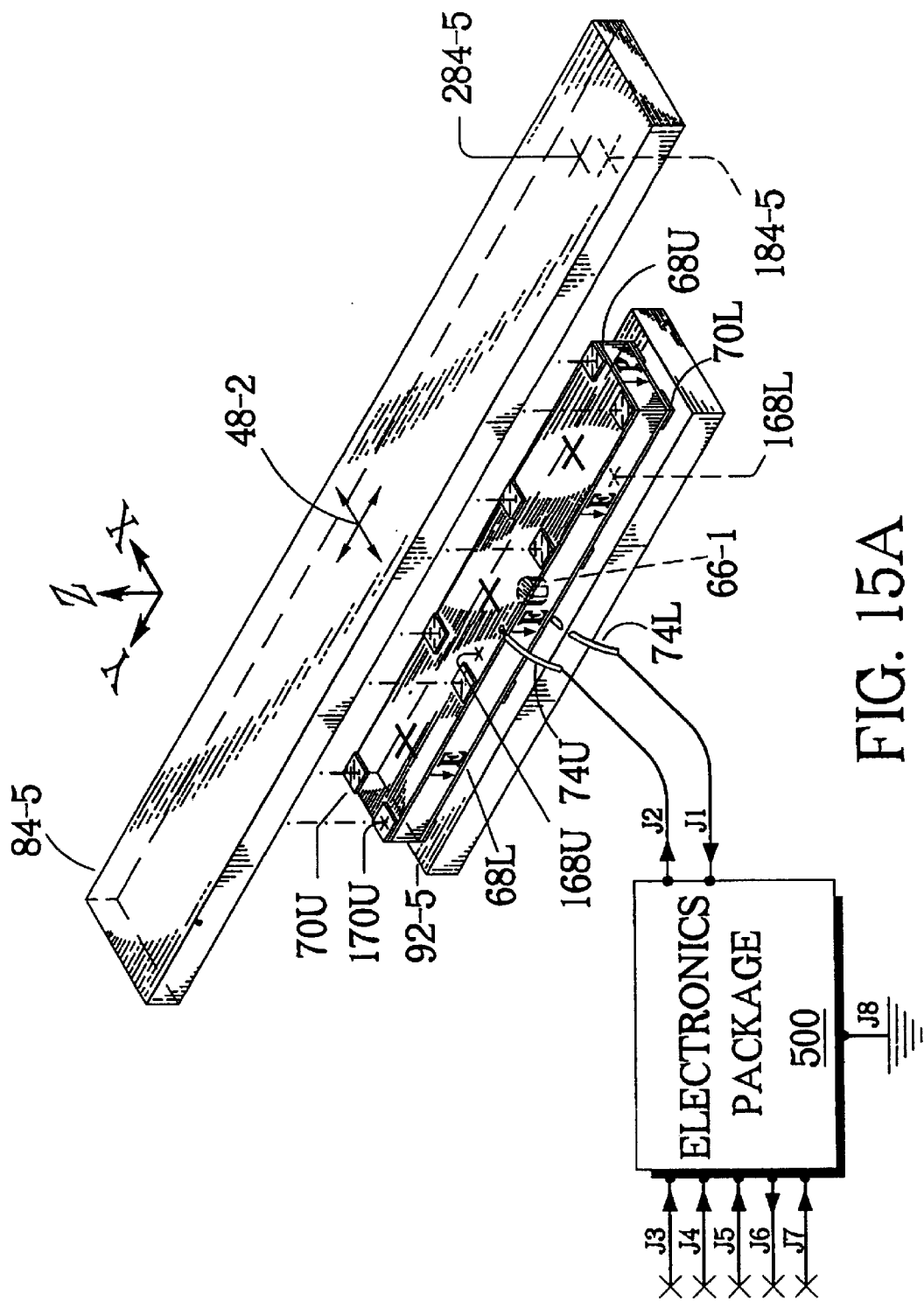
FIG. 15A is an isometric view of a simplified long length ultrastiff sonic bearing using a three-half wavelength, longitudinal length resonant mode direct-drive bearing element along with the electronics package for driving it.
Figure 15B:
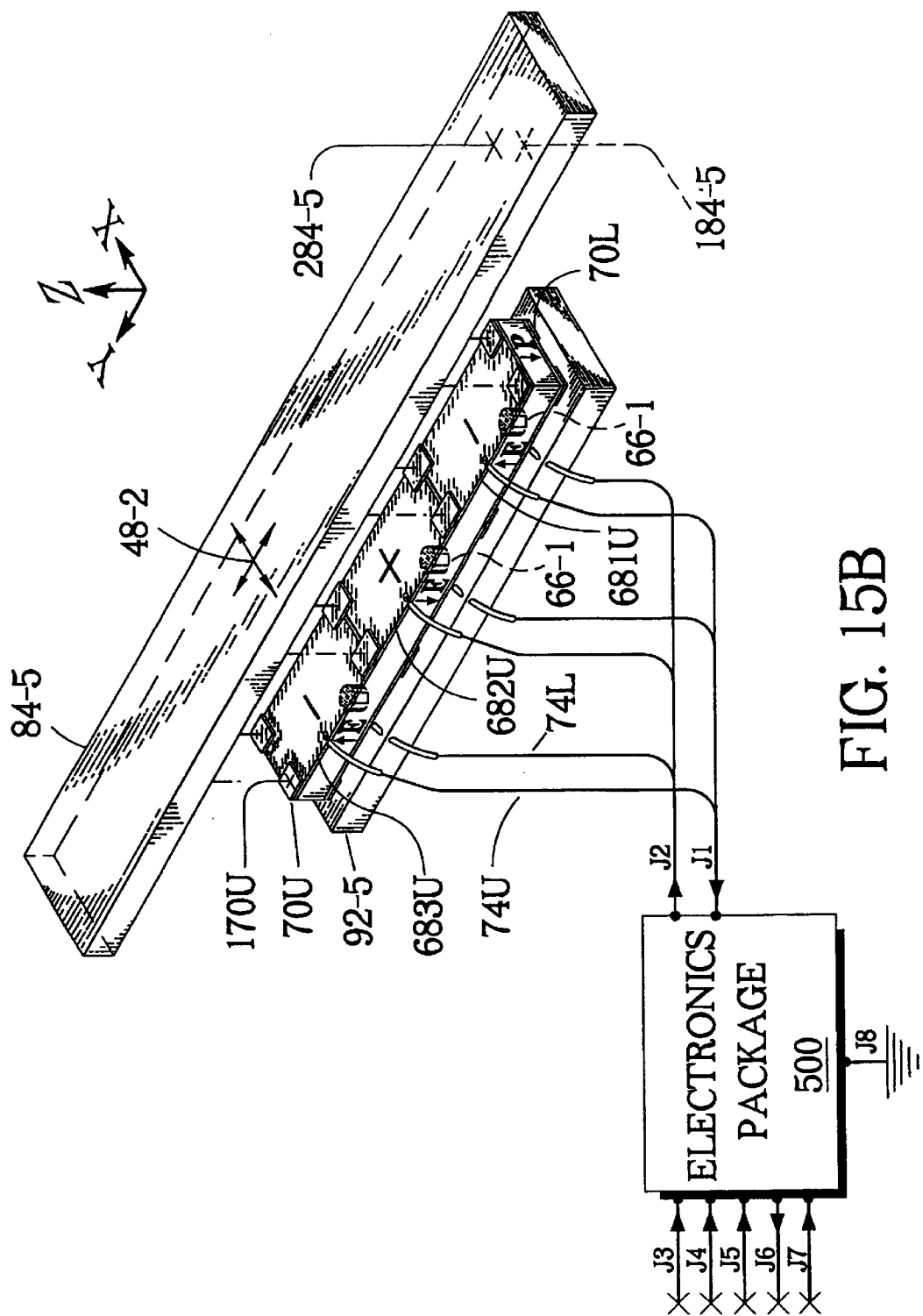
FIG. 15B is an isometric view of a simplified long length ultrastiff direct-drive sonic bearing having a bearing element with three, one-half wavelength, longitudinal length resonant mode transducer electrode segments in succession, each segment having alternating electric field polarity.
Figure 15C:
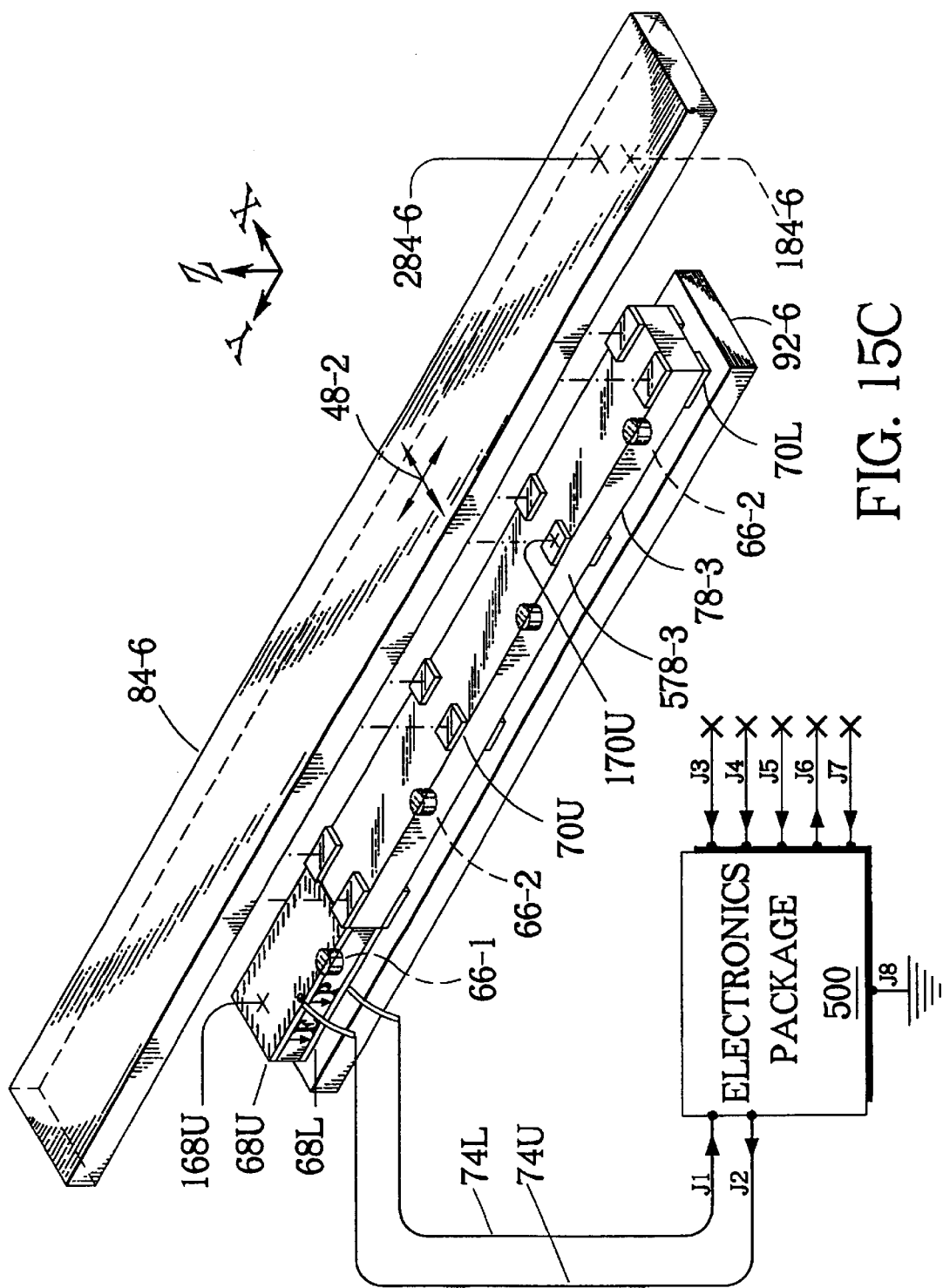
FIG. 15C is an isometric view of a simplified long length, ultrastiff indirect-drive sonic bearing using a one-half wavelength, longitudinal length resonant mode transducer coupled to a three-half wavelength, longitudinal length resonant mode, extension member having the same resonant frequency.

The embodiments shown in FIGS. 15A, 15B, and 15C are specifically designed to solve this lowering of the operating frequency problem associated with large sonic bearings. The simplest, and therefore the most straightforward solution to this problem is to oscillate the large bearing element, not at its fundamental frequency, but rather at one of its higher harmonic frequencies. In the example shown in FIG. 15A, a large direct-drive sonic bearing element is excited by the electronics package 500 to operate at three times its fundamental frequency or its third harmonic. In the embodiments shown in FIGS. 15A and 15B, the bearing element comprises 3 transducers aligned in succession. Under these conditions, there are a total of three, one-half wave segments (3λ/2) along the full length (i.e., parallel to the Y-axis) of the bearing element, containing a total of three nodal support regions (not shown) for attaching at least one cylindrical support member 66-1 thereto, on the lower electrode surface 168L. Each nodal support is used both to establish oscillation boundary conditions and to attach the bearing element to the fixed base member 92-5. On the upper and lower electrode surfaces, there are two sets of eight upper 70U and lower 70L contact pad members with their respective upper 170U and lower 170L (not shown) contact pad surfaces. The moveable load member 84-5 has a load accepting surface 284-5 and a sliding path direction 48-2, where the load sliding surface 184-5 slides against the eight upper contact pad surfaces 170U of the bearing sliding surface.

A major problem with the 3λ/2 oscillation mode when used in conjunction with the configuration shown in FIG.

15A, is that during resonance, the two end, one-third length sections of the bearing element are always moving in a direction opposite to the piezoelectric induced movements, resulting in a two-third reduction of the electromechanical coupling efficiency $\kappa_{31}$ for that bearing element.

A solution to the low $\kappa_{31}$ coupling efficiency problem is illustrated in FIG. 15B and is based upon the electrical segmentation of the original continuous transducer's upper and lower electrode surfaces into three equal electrode segment pairs labeled as: the upper 683U and lower 683L (not shown) left end-segment surfaces; the upper 682U and lower 682L (not shown) mid-segment surfaces; and the upper 681U and lower 681L (not shown) right end-segment surfaces. The electrical excitation polarity for the two newly formed end-segment electrode pairs (681U, 681L), (683U, 683L) can now be reversed with respect to the mid-segment (682U, 682L), so that for all three segments, the piezoelectric forces are now in phase with the resonant oscillatory movements. The changes in the two end-segment polarities are visually indicated in FIG. 15B by the two "-" signs and the direction of the electric field, E with respect to the piezoelectric material's uniform electric dipole moment direction, P. The wires connected to each of the three electrode segment surfaces of the modified transducer have been appropriately labeled so that all the excitation wires tagged as 74U are connected together and similarly, the three excitation wires labeled as 74L are connected together. The modified transducer is attached to the base member 92-5 using three cylindrical support members 66-1. The upper transducer face is now a collection of the three separate areas of electrodes 681U, 682U and 683U. Like the design in FIG. 15A, the moveable load member 84-5 has a load accepting surface 284-5 and a planar load sliding surface 184-5 for sliding along any path in the direction 48-2.

A totally different approach to extending the length of a sonic bearing without changing its operating frequency is illustrated in FIG. 15C. This technique uses the indirect-drive bearing element, where the piezoelectric transducer is always driven at its lowest longitudinal frequency mode, while the extension member is resonated at one of its higher harmonic frequencies. Because the transducer is operated at its fundamental mode, the electromechanical coupling coefficient $\kappa_{31}$ is already optimized without engaging in the labor intensive transducer electrode modifications used in FIG. 15B. Furthermore, if the material for the extension member is selected to have a high quality factor Q at high frequency, then resonating the extension member at one of its higher harmonics will exhibit no substantial loss in acoustic energies.

FIG. 15C shows a specific example of an embodiment where the bar-shaped $3\lambda/2$ extension member 78-3 is operated in the $3\lambda/2$ mode and the material is ISO M20 grade tungsten carbide measuring approximately 145 mm in length by 13.1 mm wide by 5.15 mm thick. The C5800 piezoelectric transducer from Channel Industries Inc., Santa Barbara Calif., is operated in the $\lambda/2$ mode and has dimensions of 25.3 mm long by 13.1 mm wide by 6.75 mm thick. Like the direct-drive bearing elements shown in FIGS. 15A and 15B, there are also three extension member nodal regions (not shown) and their three associated cylindrical support members 66-2 located geometrically at the same relative positions to the contact pad members as in the direct-drive cases. These cylindrical support members 66-2 are also used to establish the boundary conditions and to affix the $3\lambda/2$ extension member 78-3 to the base member 92-6. A single transducer nodal region on the lower electrode surface 168L (not shown), which is oppositely facing the upper electrode surface 168U is used to attach the transducer's cylindrical support member 66-1 to the same base member 92-6. The resonant frequencies for both the transducer and the third harmonic driven extension member are approximately equal to 67 kHz. The two extension member's surfaces parallel to the XY-plane of the extension member body 578-3 are upper and lower extension member faces. The precise resonant frequency of the extension member is of course, dependent on the sizes and placements of the eight upper 70U and eight lower 70L contact pad members on the extension member faces. The associated eight upper contact pad surfaces 170U of the bearing sliding surface are used to slide against a single planar load sliding surface 184-6. The long moveable load member 84-6, having a load accepting surface 284-6, for the sonic bearing in FIG. 15C is shown in two alternate positions to indicate a possible translational movements in the XY-plane along 48-2.

Figure 16:
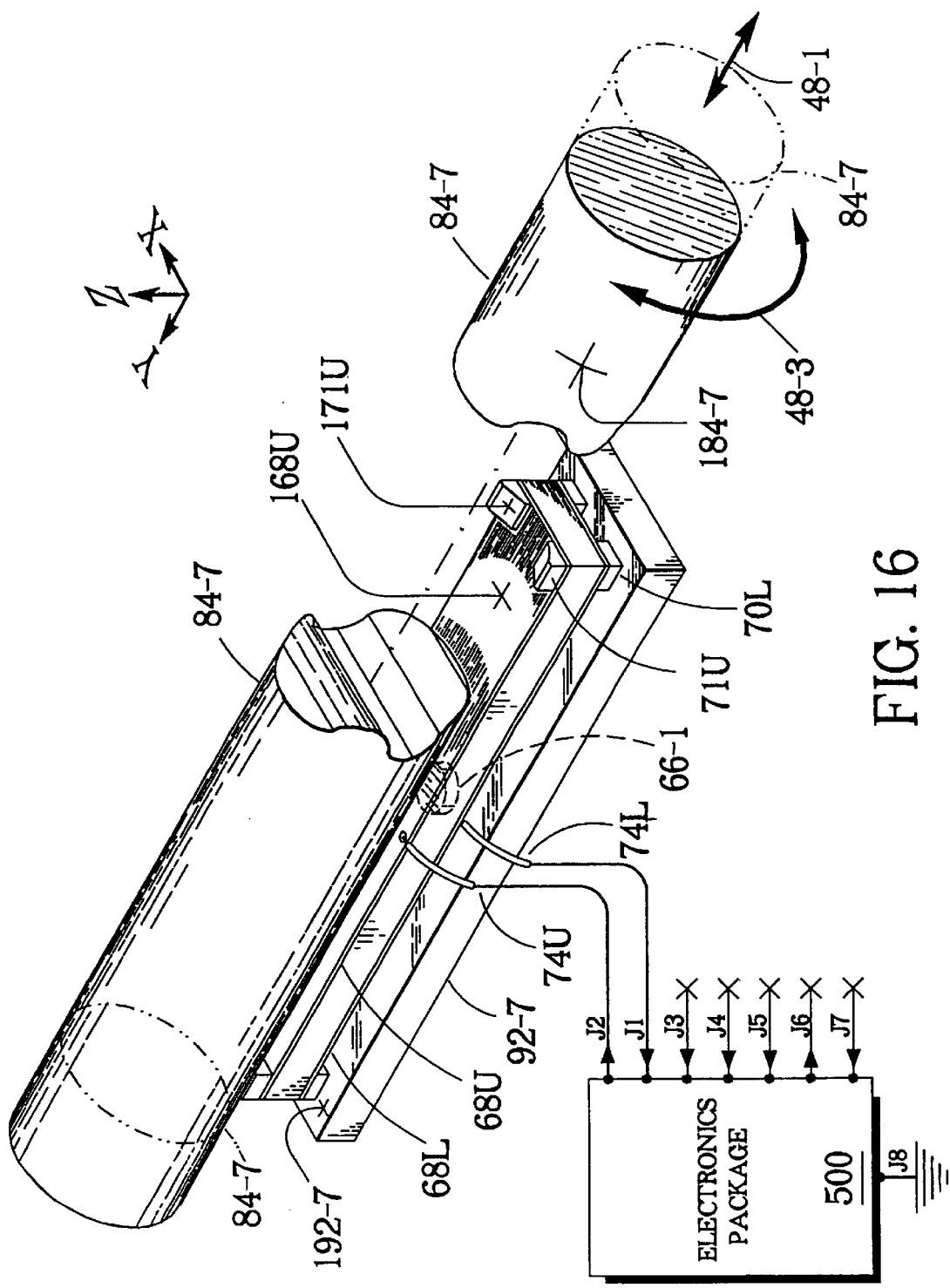
FIG. 16 is an isometric view of a simplified ultrastiff sonic bearing example equipped with upper contact pad members that have cylindrically concave contact pad surfaces to support a rod-like cylindrical load member.

The shape of the bearing sliding surface or bearing support region can also be altered to perform useful functions. For example, FIG. 16 shows a direct-drive, $\lambda/2$ mode, sonic bearing designed to support a rod-shaped, rather than a bar-shaped, load member 84-7 which is capable of both translational 48-1 and rotational 48-3 directions of motion. The four contact pad members 71U on the upper electrode surface 168U have been specially modified to have complementary mating surfaces to the load member's load sliding surface 184-7. The four contact pad surfaces 170L (not shown) of the bearing support region can still retain their original plate-shaped form and slide against the planar base sliding region 192-7 of the base member 92-7. For clarity of illustration reasons, the front part of the load member 84-7 has been sectioned and moved forward to reveal the cylindrically concave shape of the upper contact pad surfaces 171U on the upper contact pad members 71U.

An important extension is a multi-bearing element sonic bearing assembly using more than one sonic bearing element in contact with the load and base members. This sonic bearing assembly can have both direct and indirect-drive versions. FIGS. 17, 18, and 19 depict simplified ultrastiff direct-drive embodiments using two bearing elements. These embodiments share many similarities with the planar embodiment of FIG. 6A which uses only one bearing element. However, the embodiments of FIGS. 17, 18, and 19 take advantage of three major aspects of the invention, namely: (1) the sonic bearing effect, (2) the cross section controlling means, and (3) the force sensing mechanism.

Ordinarily, because the type of assembly depicted in FIGS. 17, 18, and 19, confines the load member 84-10 in one of the two axes (i.e., X-axis or Z-axis ) orthogonal to the axis of the load sliding motion (i.e., Y-axis), a zero tolerance condition in the manufacturing of the parts for the assembly must be maintained along this axis of confinement, which, for the examples of FIGS. 17, 18, and 19, is the Z-axis. Furthermore, when all contact pad surfaces are not parallel to the direction of the load sliding motion and are in continuous contact with the load member or if the load member should undergo some kind of dimensional change (e.g., thermal expansion), it is the force $F_{APP}$ as well as the slidable path that will be modified as the load member slides.

In order to avoid the undesirable effects of these aforesaid conditions the sonic bearing assemblies illustrated in FIGS. 17, 18, and 19, instead, take advantage of this fact of confinement. Because one bearing element in these embodiments is symmetrically positioned to be opposite the another and because conventional manufacturing tolerances as well as any thermal induced material changes just happen to be within the range of bearing element thickness control, a very simple "force servo mechanism" can be used to compensate for most mechanical or thermal variations. This force servo mechanism is accomplished in the embodiments of FIGS. 17 and 18 by using the "force sensor output" signal from one electronics package 500 generated from the force sensing mechanism of one bearing element as the "force servo input" signal to the cross section controlling means of another electronics package 500 for the opposite bearing element. The end result is that a constant force in the Z-axis $[F_{APP}]_Z$, 44 (not shown, but see FIG. 10) is maintained on one bearing element 100 as the load member 84-10 slides along the slidable path direction 48-1. This force, $[F_{APP}]_Z$ is held constant because the feedback produces a change in the value of $V_{HV}$ which, when conveyed by the wires to the opposite bearing element 100 along with the square wave excitation voltage $V_\omega$, will produce a thickness change therein.

For the embodiment of FIG. 19, the force servo mechanism is realized by connecting the "force servo input" for one bearing element to the "force sensor output" of the other and vice versa, so that, with some minor control loop modifications, the dynamic range of stiffness compensation for the bearing assembly can be substantially increased.

FIGS. 20 to 22 illustrate three different states of the bearing assembly of FIG. 17 reflecting a change in the thickness of the load member 84-10 brought on by thermal expansion and contraction while the dimensions of the base member 92-10 and the bearing elements 100 are here assumed to be independent of temperature. For clarity of illustration, the magnitude of these microscopic expansions and contractions have been greatly exaggerated. The state in FIG. 21 corresponds to the initial assembled state of the bearing assembly before the occurrence of any thermal expansion or contraction. In this state, a mechanical prebias from the C-shaped base member 92-10 in cooperation with the electronics package 500 designated by E.P. #2 supplying a voltage $V_{HV2}$ with a value of $V_0$ sets the initial thickness $(Z_0-\Delta Z_0)$ of the upper bearing element 100. This initial upper bearing element thickness generates a bearing element force $F_{BE2}$, having a Z-axis component $[F_{BE}]_Z$, 40 (not shown, but see FIG. 10) which when combined by vector addition with any load force $F_{LOAD}$ with a Z-axis component $[F_{LOAD}]_Z$, 43 (not shown, but see FIG. 10) on the load member 84-10, establishes a force $F_{APP}$ with a Z-axis component $[F_{APP}]_Z$ 44 (not shown, but see FIG. 10) on the lower bearing element 100 according to $$F_{APP}=F_{BE2}+F_{LOAD}.$$

Normally, the load force $F_{LOAD}$ is composed of two vector components; a gravitational force representing the mass of the load member under the pull of gravity $F_{MG}$ (having a Z-axis component $[F_{MG}]_Z$, 42 not shown here, but see FIG. 10) and any external force $F_{EXT}$ having a Z-axis component $[F_{EXT}]_Z$, 41 not shown here, but see FIG. 10) summed together again by vector addition to produce $$F_{LOAD}=F_{MG}+F_{EXT}.$$

However, in this simple illustration, the magnitude of the external force $F_{EXT}$ is set to zero and the force $F_{MG}$ is assumed to have a constant magnitude and is directed along the Z-axis.

At this point, if a dimensional change occurs to the load member 84-10 along the axis of confinement (i.e., Z-axis) which attempts to alter the force component $[F_{APP}]_Z$, as illustrated by the α state in FIG. 20 and β state in FIG. 22, the electronic force servo mechanism will change the value of $V_{HV2}$ to produce a corresponding thickness change $\Delta Z_{BE2}$ of either $\Delta Z_\alpha$ or $\Delta Z_\beta$ respectively, in the upper bearing element 100 in order to maintain the magnitude and direction of the force component $[F_{APP}]_Z$ to be the same constant value as in the initial state of FIG. 21. In this way, the slidable path along the lower bearing element is preserved.

The operational principle of the force servo mechanism is based on the graphs depicted in FIGS. 23A and 23B which describe the magnitude of the Z-axis component $[F_{BE}]_Z$ of the bearing element generated force $F_{BE2}$ as a function of both the bearing element thickness displacement $\Delta Z_{BE2}$ and the applied high voltage $V_{HV2}$. These particular graphs are for a piezoelectric transducer, but these types of functional relationships are well known in the art for most electromechanical transducers and are described by the equation $$[F_{BE}]_Z=(k_{BE})(d_{33})(V_{HV})-(k_{BE})(\Delta Z_{BE});$$

where the equivalent spring constant $k_{BE}$ of the bearing element 100 (not shown, but see FIG. 17) is given by $$k_{BE}=(A_{BE})(Y_{BE})/Z_0.$$

Here $A_{BE}$ is the total area at the interface of the bearing element, $Y_{BE}$ is the short circuit Young's modulus $Y_{33}^E$ of the piezoelectric transducer of the bearing element along the Z-axis, $d_{33}$ is the piezoelectric charge constant in the thickness direction and $Z_0$ is the initial thickness of the transducer before the application of any forces and/or voltages.

The purpose of the force servo mechanism, in reference to FIGS. 20 to 22, is to change the value of the quasi-DC high voltage $V_{HV2}$ applied to the upper bearing element 100 so as to change its thickness displacement value $\Delta Z_{BE2}$ in order to maintain a constant magnitude and direction of the force component $[F_{APP}]_Z$ on the lower bearing element 100. The particular value of $V_{HV2}$ required for each state (i.e., for $\Delta Z_\alpha$, $\Delta Z_0$, and $\Delta Z_\beta$) is obtained, in a graphic sense, according to FIG. 23A, by the trinary intersection of the horizontal line where $[F_{BE2}]_Z$ has a value equal to $F_0$, with the vertical line representing the required displacement value $\Delta Z_{BE2}$, with the diagonal line relating the behavior of $[F_{BE2}]_Z$ versus $\Delta Z$ for a given value of $V_{HV2}$. The horizontal line at $F_0$ has a value equal to the Z-axis magnitude value of $F_{APP}$ minus $F_{LOAD}$ and is used because the force component $[F_{BE2}]_Z$ generated by the upper bearing element 100 required to maintain a constant force component $[F_{APP}]_Z$ on the lower bearing element for the states shown in FIGS. 20, 21 and 22, is simply given by the Z-axis magnitude value of $F_{APP}$ minus $F_{LOAD}$. Here, also, as previously mentioned, the Z-axis magnitude value of $F_{LOAD}$ is assumed to only be the magnitude value of $F_{MG}$ (i.e., no external force $F_{EXT}$ on the load member). Therefore, to change $\Delta Z_{BE2}$ from $\Delta Z_\alpha$ to $\Delta Z_\beta$, the quasi-DC high voltage $V_{HV2}$ must change between $V_\alpha$ and $V_\beta$ respectively, in order to insure that, $[F_{APP}]_Z$ will remain constant.

Alternately, as illustrated in FIG. 23B, when an external force $F_{EXT}$ is applied to load member 84-10 (not shown, but see FIG. 17), while all the mechanical dimensions of the bearing system are now assumed to be fixed, the force servo mechanism must change the value of the quasi-DC high voltage $V_{HV2}$ applied to the upper bearing element 100 (not shown, but see FIG. 17) so that the bearing element generated force $[F_{BE2}]_Z$ from the upper bearing element 100 (not shown) will change in order to keep the force component $[F_{APP}]_Z$ constant. Graphically speaking, as an increasingly larger external force's normal component $[F_{EXT}]_Z$ is applied, the trinary intersection point will move down along the line of constant $\Delta Z_{BE2}$ (i.e., along $\Delta Z_0$) as the force servo mechanism drops the value of the quasi-DC high voltage $V_{HV2}$ from $V_0$ to $V_N$. This causes the bearing element generated force's normal component $[F_{BE2}]_Z$ to drop in value from $F_0$ to zero which compensates exactly for the applied external force's normal $[F_{EXT}]_Z$. For the purpose of illustration, at the point where the value of $[F_{EXT}]_Z$ is equal to one-half of $F_0$, the high voltage $V_{HV2}$ is shown to have an approximate value of one-half the quantity $(V_0-V_N)$. Below the value of $V_N$, the force servo mechanism will no longer function because this region represents a physical separation of the upper sliding surfaces of the upper bearing element 100 (not shown) from the load sliding surfaces of the load member 84-10 (not shown).

In actual operation, the exact value of the quasi-DC high voltage $V_{HV2}$ generated as a result of the force servo mechanism, and hence, the trinary intersection point, will be graphically determined by a combination of both graphs in FIGS. 23A and 23B because components of the bearing assembly will usually experience a thermally induced dimensional change when an external force $F_{EXT}$ is present.

A detailed graphic description of the operation of the force servo mechanism for the embodiment of FIG. 17 subject to an arbitrary applied external force is illustrated in FIGS. 24A to 24C. FIG. 24A shows how the force servo mechanism changes the values of $V_{HV2}$ and, consequently, $[F_{BE2}]_Z$ when an external force $F_{EXT}$ is applied with a component along the Z-axis. The value of $F_0$ is chosen as the value of the servo equilibrium bearing element force's normal component $[F_{BE2}]_Z$ as a result of the application of the voltage $V_{HV2}$ equal to $V_0$ for the upper bearing element (not shown, but see FIG. 17). From this point, a change in the external force's normal component $[F_{EXT}]_Z$ is directly compensated for by a change in $[F_{BE2}]_Z$ in order to maintain the normal component $[F_{APP}]_Z$ on the lower bearing element (not shown, but see FIG. 17) constant as shown in FIG. 24B. Because $[F_{APP}]_Z$ is held constant by the force servo mechanism, the lower bearing element thickness ($Z_0+\Delta Z_{BE1}$), and hence, the slidable path thereon will be preserved in the servo region as shown in FIG. 24C.

For this servo configuration of FIG. 17, the region of enhanced stiffness as depicted in FIG. 24C can be shifted by adjusting the value of $F_0$. In order to maximize the range of load carrying capability for an external force $F_{EXT}$ directed on the lower bearing element, the value of $F_0$ should be adjusted such that the magnitude of the normal force component $[F_{APP}]_Z$ without an external force $F_{EXT}$ is very near to the maximum allowable value $F_M$ for the force component $[F_{APP}]_Z$. The value $F_M$ represents the point where the velocity control servo is just barely able to maintain the set r.m.s. velocity of the bearing element, and hence, the set level for the effective coefficient of friction $\mu_{SB}$. At this point, the value $V_0$ is equal to the maximum servo value $V_M$ that $V_{HV2}$ is allowed to have. The important ramification of choosing such a large $F_0$, other than the lower bearing element being able to support a significant load without altering the slidable path thereon, is that each bearing element's Q can be lowered which will allow for an extremely short settling time and an extremely large locking force when the bearing elements are switched to the "OFF" state.

In a similar fashion, the force servo mechanism for the embodiment of FIG. 18 is graphically illustrated in FIGS. 25A to 25C. The main difference of this servo configuration, illustrated in FIG. 18, is that the upper bearing element's sliding surfaces define the slidable path and the lower bearing element adjusts the force component $[F_{APP}]_Z$ by changing the magnitude of the lower bearing element generated force component $[F_{BE1}]_Z$. For this configuration, $F_0$ can be chosen as shown in FIG. 25A to be very near zero in order to again maximize the range of load carrying capability for an external force $F_{EXT}$ directed on the lower bearing element. This results in the bearing elements maintaining their very high Q at low external force values and thus, reduces the power requirements needed to overcome the frictional power dissipation. Any degradation in settling time and locking force for this embodiment can also be eliminated by setting $V_{HV1}$ and $V_{HV2}$ to $V_M$ when the bearing assembly is switched to the "OFF" state. In this way, the bearing element also acts as an active brake.

For the embodiment of FIG. 19, each of the servo configurations employed in FIGS. 17 and 18 are used cooperatively to achieve a force servo mechanism with an extended servo range. As graphically depicted in FIGS. 26A and 26B, the force component $[F_{APP}]_Z$ on either bearing element in the embodiment of FIG. 19 is selected to be equal to $(F_0+F_{MG})$ when no load force $F_{LOAD}$ is applied and the magnitude of this force component $[F_{APP}]_Z$ is near the value of $F_M$. Selecting the magnitude value of $[F_{APP}]_Z$ near $F_M$ as the initial condition allows the portion of force servo mechanism configured like that of FIG. 17 to handle a load force $F_{LOAD}$ directed on the lower bearing element with maximum range while allowing the other portion of the force servo mechanism configured like that of FIG. 18 to handle the load force $F_{LOAD}$ directed on the upper bearing element with maximum range. In this way, each portion of this cooperative servo mechanism operates only on its own side of a switching point defined at the point when the magnitude of $F_{LOAD}$ equals zero. The graph of FIG. 26C shows this switching point and illustrates that the extended servo range is a combination of each range from each portion of this force servo mechanism.

A further and final illustration which also takes advantage of the three aforementioned major aspects of the invention is the embodiment of FIG. 27. In this example, four bearing elements 100 are mounted to the base member 92-9. Specifically, the bearing support regions, configured opposite of the bearing sliding surfaces, are juxtaposed to each other along the inner faces of the base member 92-9. Also, the load sliding surfaces 86-9 of the rectangularly shaped load member 84-9 are juxtaposed to each other and are in slidable contact with the bearing sliding surfaces along 48-1. This type of assembly further confines the load member in both of the two axes (i.e., X-axis and Z-axis) orthogonal to the axis of the load sliding motion (i.e., Y-axis) and can be implemented as an obvious extension using two orthogonal versions of the embodiment of FIG. 19. For clarity of illustration, the second set of two electronics packages and their interconnection to each other and their respective bearing elements are not shown.

An important consequence and major advantage resulting from the use of a force servo mechanism in a sonic bearing assembly is to enable that assembly to have, not only the ability to maintain constant stiffness overtime, but also to have an adjustable stiffness. This ability allows the assembly to possibly have a lower stiffness than the intrinsic bearing stiffness itself, but more importantly, the assembly can emulate a bearing having nearly infinite stiffness. According to the principles of control theory, precise knowledge of system characteristics are not required in order to achieve precise control. Therefore, simple servoed control over the force component $[F_{APP}]_Z$ can make a bearing assembly substantially less sensitive to the parameters that attempt to alter that force component and it is this servoed control that will directly manifest itself in a real increase in bearing stiffness over and above the intrinsic stiffness of a similar non-servoed assembly. As mentioned for the embodiment of FIG. 17, the force component $[F_{APP}]_Z$ is maintained by the force servo mechanism altering the value of $[F_{BE2}]_Z$ in order to compensate for any change in $F_{LOAD}$. Typical simple servo mechanisms can easily provide steady-state compensation control to within 0.1 percent which translates to a theoretical increase in bearing stiffness by 1000 times. And, if complete models of the components in the bearing assembly itself are considered in a servo mechanism design, a robust dynamic stiffness of the same order can also be achieved. Therefore, using conventional servo design methods, one skilled in the art can easily develop such a mechanism that will provide both steady-state and transient high stiffness solutions required for smooth and precise motion while at the same time, reject disturbances to the bearing stiffness.

Summary, Ramifications and Scope

Accordingly, the reader will see that a sonic bearing of the invention is ideal for use in a very high stiffness precision stage used for guiding rectilinear or rotational motion. Specifically, a sonic bearing equipped stage can move a load with high precision to the designated coordinate by using the bearings in their "active" or low frictional state. After reaching the target position, the velocity of both the load and the stage can be rapidly and controllably decreased to minimize the settling time at the target position by transitioning the bearings into their "inactive" or high frictional state. Furthermore, because the bearing possesses the attribute of being able to alter its thickness, any imprecision or change in mechanical tolerances that cause a degradation in stiffness at any time can be easily eliminated independent of the frictional state of the bearing. In this manner, a sonic bearing stage can simultaneously exhibit both high stiffness with low effective friction and high precision with short settling time. And, after reaching the desired location, the stage can then be "locked" in place with or without using any external power. It can also be appreciated that the sonic bearing has the additional advantages of:

providing high reliability;
providing excellent wear resistance;
providing low sensitivity to shock loading;
providing excellent off-axis error characteristics; and
providing for operation in many exotic environments.

Although the description above contains many specificities, these should not be construed as limiting the scope of the invention but merely providing illustrations of some of the presently preferred embodiments of this invention.

For example, other possibilities may include sonic bearings whose bearing elements are planar but round rather than bar-shaped, or even non-planar such as those having cylindrical, conical or spherical shaped geometries. Thus, the scope of the invention should be determined by the appended claims and their legal equivalents, rather than by the examples given.

We claim:

1. An ultrastiff precision sonic bearing assembly, comprising of:
    a. at least one load member having a load member mass, each load member having at least one load accepting surface and at least one load sliding surface;
    b. at least one bearing element having at least one bearing support region and at least one bearing sliding surface;
    c. the load sliding surface in slidable contact with the bearing sliding surface by a force, the surfaces in slidable contact along a slidable path relative to each other
    d. the sliding surfaces having a coefficient of friction therebetween; and
    e. energizing means for generating a substantially oscillatory sliding motion in the bearing element, the motion having an oscillation path tangent with the slidable path for at least one interacting point between the load sliding and the bearing sliding surfaces, wherein the oscillatory sliding motion alters an effective coefficient of friction between the load sliding surface and the bearing sliding surface without inducing the load member to move in the direction of the slidable path.

2. The sonic bearing assembly of claim 1 further comprising:
    a. the load accepting surface being juxtaposed to at least one other, the load accepting surface disposed to be oppositely facing the load sliding surfaces;
    b. the bearing support region being juxtaposed to at least one other, the bearing support region disposed to be oppositely facing the bearing sliding surface; and
    c. the force being substantially constant, whereby the force maintains the sliding contact between the sliding surfaces.

3. The sonic bearing assembly of claim 1 wherein the load sliding surface has a load sliding surface topography, the load sliding surface topography is selected from the group consisting of planar, cylindrical, and spherical topographics.

4. The sonic bearing assembly of claim 3 wherein the bearing sliding surface has a bearing sliding surface topography, the bearing sliding surface topography complementing the load sliding surface topography.

5. The sonic bearing assembly of claim 1 wherein the load sliding surface has a surface material with predetermined surface material properties.

6. The sonic bearing assembly of claim 5 wherein the surface material is selected from the group consisting of diamond, diamond-like carbon materials, steel alloys, steel, cubic carbon nitrides, cubic boron nitrides, zirconium carbon nitrides, titanium carbon nitrides, titanium aluminum nitrides, aluminum alloys, aluminum, alumina, sapphire, W, Ni, Nb, Ti, Si, Zr, Cr, Hf, Y, oxides of Nb, oxides of Ti, oxides of Si, oxides of Zr, oxides of Cr, oxides of Hf, oxides of Y, carbides of W, carbides of Nb, carbides of Ti, carbides of Si, carbides of Zr, carbides of Cr, carbides of Ta, carbides of Hf, nitrides of Ti, nitrides of Si, nitrides of B, nitrides of Zr, borides of W, borides of Zr, borides of Ti, borides of Hf, borides of Cr, PTFE polymer, HDPE polymer, and UHMWPE polymer.

7. The sonic bearing assembly of claim 1 wherein the bearing sliding surface has a surface material with predetermined surface material properties.

8. The sonic bearing assembly of claim 7 wherein the surface material is selected from the group consisting of diamond, diamond like carbon materials, steel alloys, steel, cubic carbon nitrides, cubic boron nitrides, zirconium carbon nitrides, titanium carbon nitrides, titanium aluminum nitrides, aluminum alloys, aluminum, alumina, sapphire, W, Ni, Nb, Ti, Si, Zr, Cr, Hf, Y, oxides of Nb, oxides of Ti, oxides of Si, oxides of Zr, oxides of Cr, oxides of Hf, oxides of Y, carbides of W, carbides of Nb, carbides of Ti, carbides of Si, carbides of Zr, carbides of Cr, carbides of Tn, carbides of Hf, nitrides or Ti, nitrides of Si, nitrides of B, nitrides of Zr, borides of W, borides of Zr, borides of Ti, borides of Hf, borides of Cr, PTFE polymer, HDPE polymer, and UHMWPE polymer.

9. The sonic bearing assembly of claim 5 wherein the surface material is a thin film with a predetermined thickness.

10. The sonic bearing assembly of claim 9 wherein the thin film is modified by ion implantation of a predetermined number of ions/cm$^2$, whereby the film is subjected to implantation of a depth greater than the thickness of the film.

11. The sonic bearing assembly of claim 7 wherein the surface material is a thin film with a predetermined thickness.

12. The sonic bearing assembly of claim 11 wherein the thin film is modified by ion implantation of a predetermined number of ions/cm$^2$, whereby the film is subjected to implantation of a depth greater than the thickness of the film.

13. The sonic bearing assembly of claim 1 wherein an actual coefficient of friction for at least two of the surfaces in slidable contact are substantially identical and substantially uniform along the slidable path.

14. The sonic bearing assembly of claim 1 wherein the load member further comprises at least one load guideway member.

15. The sonic bearing assembly of claim 14 wherein the load guideway member is attached to the load member by an adhesive means.

16. The sonic bearing assembly or claim 1 wherein at least one of the bearing element further comprises at least one contact pad member having a contact pad surface.

17. The sonic bearing assembly of claim 16 wherein the contact pad member is attached to the bearing element by an adhesive means.

18. The sonic bearing assembly of claim 16 wherein the contact pad member has a pad inertial moss which is substantially smaller than a mass of the bearing element.

19. The sonic bearing assembly of claim 1 wherein a frequency of the oscillatory sliding motion in the bearing element is substantially equivalent to an operating frequency of a substantially longitudinal acoustic resonant wave, such that a propagation direction of the wave is aligned substantially parallel to the bearing sliding surface to produce a resonance in the bearing element along the propagation direction.

20. The sonic bearing assembly of claim 19 wherein the bearing support region is located near a nodal region of the bearing element.

21. The sonic bearing assembly of claim 1 wherein the bearing element is comprised of a substantially bar shaped parallelepiped transducer element including:
   a. an upper surface;
   b. a lower surface; and
   c. a dimension parallel to the upper surface and lower surface.

22. The sonic bearing assembly of claim 21 wherein the transducer element has at least one controllable dimension for selecting a frequency of a longitudinal acoustic resonant wave therein.

23. The sonic bearing assembly of claim 21 wherein the transducer element further comprises:
   a. at least one piezoelectric transducer having a piezoelectric material;
   b. the piezoelectric transducer having an electric dipole moment direction in the piezoelectric material;
   c. an upper transducer electrode located on the upper surface of the piezoelectric transducer;
   d. a lower transducer electrode located on the lower surface of the piezoelectric transducer; and
   e. the electrodes disposed perpendicular to the electric dipole moment direction such that the energizing means produces an electric field having an electric field direction in the piezoelectric transducer such that the electric field direction is substantially aligned across the dimension of the transducer.

24. The sonic bearing assembly of claim 1 further comprising a base member, the base member having:
   a. at least one base platform region; and
   b. at least one base sliding region in slidable contact with the bearing support region.

25. The sonic bearing assembly of claim 24 further comprising at least one contact pad member coupled with the base sliding region, wherein the contact pad member has a contact pad surface.

26. The sonic bearing assembly of claim 24 further comprising at least one contact pad member coupled with the bearing support region, wherein the contact pad member has a contact pad surface.

27. The sonic bearing assembly of claim 24 further comprising:
   a. at least one contact pad member coupled with the base sliding region, wherein the contact pad member has a contact pad surface; and
   b. at least one contact pad member coupled with the bearing support region, wherein the contact pad member has a contact pad surface, whereby the base sliding region contact pad surface and the bearing support region contact pad surface are in slidable contact with one another.

28. The sonic bearing assembly of claim 24 wherein the base platform region is juxtaposed to another, the base platform region disposed to be oppositely facing the base sliding region.

29. The sonic bearing assembly of claim 24 wherein the base sliding region has a base sliding region topography, the base sliding region topography is selected from the group consisting of planar, cylindrical, and spherical topographies.

30. The sonic bearing assembly of claim 29 wherein the bearing support region has a bearing support region topography, the bearing support region topography complementing the topography of the base sliding region.

31. The sonic bearing assembly of claim 24 wherein the base sliding region has a surface material of predetermined surface material properties.

32. The sonic bearing assembly of claim 31 wherein the surface material is a thin film with a predetermined thickness.

33. The sonic bearing assembly of claim 32 wherein the thin film is modified by ion implantation of a predetermined number of ions/cm$^2$, whereby the film is subjected to implantation of a depth greater than the thickness of the film.

34. The sonic bearing assembly of claim 31 wherein the surface material is selected from the group consisting of diamond, diamond like carbon materials, steel alloys, steel, cubic carbon nitrides, cubic boron nitrides, zirconium carbon nitrides, titanium carbon nitrides, titanium aluminum nitrides, aluminum alloys, aluminum, alumina, sapphire, W, Ni, Nb, Ti, Si, Zr, Cr, Hf, Y, oxides of Nb, oxides of Ti, oxides of Si, oxides of Zr, oxides of Cr, oxides of Hf, oxides of Y, carbides of W, carbides of Nb, carbides of Ti, carbides of Si, carbides of Zr, carbides of Cr, carbides of Ta, carbides of Hf, nitrides of Ti, nitrides of Si, nitrides of B, nitrides of Zr, borides of W, borides of Zr, borides of Ti, borides of Hf, borides of Cr, PTFE polymer, HDPE polymer, and UHMWPE polymer.

35. The sonic bearing assembly of claim 24 wherein an actual coefficient of friction for at least two of the surfaces in slidable contact are substantially identical and substantially uniform along the slidable path.

36. The sonic bearing assembly of claim 24 wherein the base member further comprises at least one support member region disposed in the base sliding region.

37. The sonic bearing assembly of claim 36 further comprising at least one support member, the support member being attached between the bearing support region and the support member region by an adhesive means.

38. The sonic bearing assembly of claim 37 wherein the support member is comprised of an insulator material.

39. The sonic bearing assembly of claim 1 further comprising a lubricant disposed on any of the sliding surfaces.

40. The sonic bearing assembly of claim 39 wherein the lubricant is selected from the group consisting of molybdenum disulfide, mineral oil, saponified oils, greases, and any combination thereof.

41. The sonic bearing assembly of claim 1 wherein the energizing means comprises at least one excitation driver.

42. The sonic bearing assembly of claim 41 wherein at least a portion of the excitation driver is contained within an electronics package.

43. An ultrastiff sonic bearing system comprising:
a. a first element having a first surface;
b. a second element having a second surface, the first surface and the second surface in slidable contact with one another along an interface and having an effective coefficient of friction therebetween, wherein the first surface and the second surface maintain slidable contact by a substantially constant force; and
c. means for inducing a repetitive motion along the interface thereby altering the effective coefficient of friction, wherein the repetitive motion does not impart a directional motion onto the second element.

44. An ultrastiff sonic bearing system comprising:
a. a first element having a first surface;
b. a second element having a second surface, the first surface and the second surface in slidable contact with one another along an interface, wherein the first surface and the second surface maintain contact by a substantially constant force, the first surface and the second surface having an effective coefficient of friction therebetween; and
c. means for inducing a symmetrical motion along the interface thereby altering the effective coefficient of friction, wherein the symmetrical motion does not impart a directional motion onto the second element.

45. An ultrastiff sonic bearing system comprising:
a. a first element having a first surface, wherein the first surface includes at least two contact points;
b. a second element having a second surface, the second surface in slidable contact with the at least two contact points along an interface only at the anti-nodal regions, wherein the second surface and the at least two contact points maintain slidable contact by a force, the second surface and the at least two contact points having an effective coefficient of friction therebetween; and
c. energizing means for repetitively and alternately expanding and contracting a physical dimension of the first element such that the at least two contact points move away from and toward one another at a determined velocity and parallel to the interface, thereby altering the effective coefficient of friction without imparting a directional motion onto the second element.

46. A precision sonic bearing assembly comprising:
a. a first element having a first surface;
b. a second element having a second surface, wherein the first surface and the second surface are in slidable contact with one another only at an anti-nodal region and under a force; and
c. means for changing a dimension of the first element over a period of time such that an effective coefficient of friction between the first surface and the second surface at the anti-nodal region is altered.

* * * * *

UNITED STATES PATENT AND TRADEMARK OFFICE
CERTIFICATE OF CORRECTION

PATENT NO. : 6,724,128 B2
DATED : April 20, 2004
INVENTOR(S) : Jack Cheng et al.

It is certified that error appears in the above-identified patent and that said Letters Patent is hereby corrected as shown below:

Title page,
Item [75], Inventors, delete "Carruno" and insert -- Carrano --.

Signed and Sealed this

Twenty-second Day of February, 2005

JON W. DUDAS
*Director of the United States Patent and Trademark Office*